United States Patent
Nishioki et al.

(10) Patent No.: US 8,667,854 B2
(45) Date of Patent: Mar. 11, 2014

(54) TORQUE SENSOR

(75) Inventors: Nobuhisa Nishioki, Saitama (JP); Kazuhiro Okada, Saitama (JP)

(73) Assignee: Tri-Force Management Corporation, Saitama (JP)

( * ) Notice: Subject to any disclaimer, the term of this patent is extended or adjusted under 35 U.S.C. 154(b) by 0 days.

(21) Appl. No.: 13/813,869

(22) PCT Filed: Jul. 27, 2011

(86) PCT No.: PCT/JP2011/067713
§ 371 (c)(1),
(2), (4) Date: Feb. 1, 2013

(87) PCT Pub. No.: WO2012/018031
PCT Pub. Date: Feb. 9, 2012

(65) Prior Publication Data
US 2013/0167661 A1    Jul. 4, 2013

(30) Foreign Application Priority Data
Aug. 5, 2010   (JP) .................................. 2010-175914

(51) Int. Cl.
*G01L 3/02*     (2006.01)

(52) U.S. Cl.
USPC ...................................... 73/862.337; 73/780

(58) Field of Classification Search
USPC ................. 73/780, 862.041, 862.046, 862.08
See application file for complete search history.

(56) References Cited

U.S. PATENT DOCUMENTS

| | | | |
|---|---|---|---|
| 4,552,028 A | 11/1985 | Burckhardt et al. | |
| 4,785,675 A | 11/1988 | Takasu et al. | |
| 6,158,280 A * | 12/2000 | Nonomura et al. | 73/504.04 |
| 6,386,033 B1 * | 5/2002 | Negoro | 73/504.12 |
| 6,490,300 B1 * | 12/2002 | Nishioki et al. | 372/32 |
| 6,862,544 B1 * | 3/2005 | Merrill | 702/95 |
| 8,393,230 B2 * | 3/2013 | Jeon et al. | 73/862.193 |
| 2007/0272015 A1 * | 11/2007 | Kazama et al. | 73/504.08 |

FOREIGN PATENT DOCUMENTS

| | | |
|---|---|---|
| AU | 2483984 A | 8/1984 |
| AU | 568331 B | 12/1987 |
| CA | 1204299 A | 5/1986 |

(Continued)

OTHER PUBLICATIONS

International Preliminary Report on Patentability dated Mar. 21, 2013 for Application No. PCT/JP2011/067713.

(Continued)

*Primary Examiner* — Max Noori
(74) *Attorney, Agent, or Firm* — Ladas & Parry LLP

(57) ABSTRACT

A small, high-stiffness torque sensor. An annular deformable body is disposed between left and right side supports. Convex sections protruding from the left side support in a rightward direction are joined to the left side surface of the annular deformable body, and convex sections protruding from the right side support in a leftward direction are joined to the right side surface of the annular deformable body. When force is applied to the right side support and torque around the Z axis acts on the left side support, the annular deformable body is elliptically deformed and the long-axis position of the inner peripheral surface of the annular deformable body moves away from the Z axis while the short-axis position moves closer to the Z axis. The acting torque is detected as a variation in the capacitance value of capacitive elements formed by displacement electrodes and fixed electrodes.

27 Claims, 22 Drawing Sheets

(56) References Cited

FOREIGN PATENT DOCUMENTS

| | | | |
|---|---|---|---|
| CH | 651928 A | 10/1985 | |
| EP | 123646 A2 | 10/1984 | |
| JP | 60-085342 A | 5/1985 | |
| JP | 62-247222 A | 10/1987 | |
| JP | 63-075633 A | 4/1988 | |
| JP | 3-051732 A | 3/1991 | |
| JP | 5-312659 A | 11/1993 | |
| JP | 2000-19035 A | 1/2000 | |
| JP | 2006-292423 A | 10/2006 | |
| JP | 2007-24641 A | 2/2007 | |
| JP | 2008-216017 | 9/2008 | |
| JP | 2009-58388 A | 3/2009 | |
| JP | 2009-210441 A | 9/2009 | |
| JP | 2009-244134 A | 10/2009 | |

OTHER PUBLICATIONS espacenet English abstract of JP 2009-58388 A.
espacenet English abstract of JP 2007-24641A.
espacenet English abstract of JP 2009-244134 A.
espacenet English abstract of JP 2006-292423 A.
espacenet English abstract of JP 2000-19035 A.

\* cited by examiner

|    | Fx | Fy | Fz | Mx | My | Mz |
|----|----|----|----|----|----|----|
| C1 | −  | −  | 0  | 0  | 0  | +  |
| C2 | +  | −  | 0  | 0  | 0  | −  |
| C3 | +  | +  | 0  | 0  | 0  | +  |
| C4 | −  | +  | 0  | 0  | 0  | −  |

|  | Fx | Fy | Fz | Mx | My | Mz |
|---|---|---|---|---|---|---|
| C1-1 | − | − | 0 | 0 | 0 | + |
| C1-2 | + | + | 0 | 0 | 0 | + |
| C2-1 | + | − | 0 | 0 | 0 | − |
| C2-2 | − | + | 0 | 0 | 0 | − |
| C3-1 | + | + | 0 | 0 | 0 | + |
| C3-2 | − | − | 0 | 0 | 0 | + |
| C4-1 | − | + | 0 | 0 | 0 | − |
| C4-2 | + | − | 0 | 0 | 0 | − |

TORQUE SENSOR

RELATED APPLICATION INFORMATION

This application is a 371 of International Application PCT/JP2011/067713 filed 27 Jul. 2011 Entitled "Torque Sensor", which was published on 09 Feb. 2012, with International Publication Number WO 2012/018031 A1, and which claims priority from is incorporated herein by reference.

TECHNICAL FIELD

The present invention relates to a torque sensor, and particularly, to a sensor having a function of outputting torque exerted about a predetermined rotation axis as an electrical signal.

BACKGROUND ART

Torque sensors for detecting torque exerted about a predetermined rotation axis have been widely used for a variety of transport machinery and industrial machinery. For example, Japanese Unexamined Patent Publication No. 2009-058388 discloses a torque sensor of a type in which mechanical deformation caused by exertion of torque is detected by a strain gauge. Moreover, Japanese Unexamined Patent Publication No. 2007-024641 discloses a sensor for detecting torque exerted on a shaft by forming a magneto-strictive film through plating on the shaft surface and measuring a change in the magnetic properties of the magneto-strictive film. On the other hand, Japanese Unexamined Patent Publication No. 2009-244134 discloses a torque sensor of a type in which a magnetism generating section is provided at an end portion of a torsion bar, and a change in the magnetic flux density of magnetism generated by the magnetism generating section is detected by use of a magnetic flux collecting ring, and Japanese Unexamined Patent Publication No. 2006-292423 discloses a torque sensor of a type in which a large number of magnets are disposed in a cylindrical shape so that the N poles and S poles are lined up alternately in the circumferential direction, and magnetic fields generated by these magnets are detected. Further, Japanese Unexamined Patent Publication No. 2000-019035 discloses a torque sensor for which a link mechanism for deforming in the radial direction the shape of an annular member by exertion of torque is prepared, and a force applied in the radial direction of the annular member is detected based on deformation thereof by a load sensor.

In the industry, there is a demand for a small-sized torque sensor having high rigidity and a simple structure. In particular, in industrial equipment for performing automatic assembly by use of a robot arm, it is essential to monitor a force generated at a tip portion of the arm and control the same. For such a torque feedback-type robot arm, a small-sized torque sensor having high rigidity and a simple structure suitable for use integrated into a joint part of the arm is desired.

Generally, because the joint part of a robot arm has a short axial length, it is preferable that a torque sensor to be integrated into the joint part also has a small size with as short an axial length as possible. However, it is difficult to design the conventional type of torque sensor using a torsion bar with a short axial length. This is because, when torsion is produced in the torsion bar by exertion of torque, a change in axial length is caused by the torsion, and thus it is inevitable to set the overall length of the torsion bar so long that the change can be disregarded.

Usually, when the axial length of a torque sensor integrated into a joint part changes due to exertion of torque, a force in an axial direction is newly produced to induce eccentricity or an inclination of the axis and serve as a factor to hamper accurate torque detection. For coping with such a harmful effect, a unique mechanism for absorbing a change in axial length is required. But, provision of such a mechanism complicates the structure accordingly, which is not preferable. Ultimately, it is inevitable to set the overall length of the torsion bar so long that a change in axial length can be disregarded, so that it is difficult to design the conventional torque sensor with a short axial length.

Moreover, for performing stable torque feedback, it is necessary to secure high-speed response of signal processing from an electrical point of view as well as to secure high rigidity in a sensor structure from a mechanical point of view. There is a basic principle of a common torque sensor in which mechanical torsion is produced in some structure and the torsion is detected electrically. Therefore, as an object in which torsion is produced, of course, a perfectly rigid body cannot be used, and it is necessary to use a structure that produces some extent of elastic deformation. However, if a torsion angle produced as a result of torque detection is large, frequency characteristics of a control system deteriorate due to the hunting phenomenon, and high-speed response can no longer be secured.

Therefore, for performing stable torque feedback, it is necessary to minimize the torsion angle to be produced as a result of torque detection, and it is preferable to construct the torque sensor by a structure having as high a rigidity as possible. However, with the conventionally proposed magnetic methods for detecting torsion angles, it is difficult to detect a small torsion angle at high accuracy.

Further, from the point of view of industrial application, a cost reduction is of course required also for torque sensors. For that purpose, it is desirable to simplify the structure as much as possible. However, in the conventionally proposed torque sensors, it is necessary to adhere a strain gauge to a torsion bar, form a magneto-strictive film, or attach magnets or coils, so that the structure is inevitably considerably complicated.

It is therefore an object of the present invention to provide a small-sized torque sensor having high rigidity and a simple structure.

DISCLOSURE OF INVENTION (1) The first feature of the present invention resides in a torque sensor for detecting torque about a predetermined rotation axis, comprising:

an annular deformation body made of a material that produces elastic deformation due to exertion of torque to be detected, having a through-opening portion through which the rotation axis is inserted;

a left side support body disposed at a position adjacent to a left side of the annular deformation body, when viewed in such a reference observation direction that the rotation axis creates a horizontal line extending left and right;

a right side support body disposed at a position adjacent to a right side of the annular deformation body, when viewed in the reference observation direction;

a left side connection member for connecting a left side connection point on a left-hand side surface of the annular deformation body to the left side support body;

a right side connection member for connecting a right side connection point on a right-hand side surface of the annular deformation body to the right side support body;

a displacement electrode fixed to an inner peripheral surface or an outer peripheral surface of the annular deformation body, for producing displacement caused by elastic deformation of the annular deformation body;

a fixed electrode disposed at a position opposed to the displacement electrode, fixed to the left side support body or the right side support body; and a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode, wherein an orthogonal projection image of the left side connection point and an orthogonal projection image of the right side connection point with respect to a plane of projection orthogonal to the rotation axis are formed at different positions.

(2) The second feature of the present invention resides in a torque sensor according to the first feature, wherein a first left side connection point and a second left side connection point are provided on the left-hand side surface of the annular deformation body, the left side connection member includes a first left side connection member for connecting the first left side connection point to the left side support body and a second left side connection member for connecting the second left side connection point to the left side support body, a first right side connection point and a second right side connection point are provided on the right-hand side surface of the annular deformation body, the right side connection member includes a first right side connection member for connecting the first right side connection point to the right side support body and a second right side connection member for connecting the second right side connection point to the right side support body, and when orthogonal projection images are obtained by projecting the annular deformation body on a plane of projection orthogonal to the rotation axis, the orthogonal projection images of the connection points are disposed on an annular path along an outline of the annular deformation body in an order of the first left side connection point, the first right side connection point, the second left side connection point, and the second right side connection point.

(3) The third feature of the present invention resides in a torque sensor according to the second feature, when two mutually orthogonal straight lines to pass through a projection point of the rotation axis are drawn on the plane of projection orthogonal to the rotation axis, the orthogonal projection images of the first left side connection point and the second left side connection point are disposed on a first straight line, and the orthogonal projection images of the first right side connection point and the second right side connection point are disposed on a second straight line.

(4) The fourth feature of the present invention resides in a torque sensor according to any one of the first to third features, wherein as the left side support body and the right side support body, annular structures each having a through-opening portion at a center portion are used, and an insertion hole that penetrates through the through-opening portions of the left side support body, the annular deformation body, and the right side support body is secured along the rotation axis.

(5) The fifth feature of the present invention resides in a torque sensor according to any one of the first to fourth features, wherein the annular deformation body is made of a circular annular member that is obtained by forming, in a central portion of a disk disposed about the rotation axis as a central axis, a through-opening portion being in a shape of a concentric disk having a smaller diameter.

(6) The sixth feature of the present invention resides in a torque sensor according to any one of the first to fifth features, wherein the left side support body and the right side support body are made of circular annular members each of which is obtained by forming, in a central portion of a disk disposed about the rotation axis as a central axis, a through-opening portion being in a shape of a concentric disk having a smaller diameter.

(7) The seventh feature of the present invention resides in a torque sensor according to any one of the first to six features, wherein the displacement electrode is constructed by a conductive layer formed on an inner peripheral surface of the annular deformation body, and the fixed electrode is constructed by a conductive plate disposed at a position opposed to the conductive layer and projecting in a direction along the rotation axis from the left side support body or the right side support body.

(8) The eighth feature of the present invention resides in a torque sensor according to any one of the first to seventh features, including a first displacement electrode fixed to, out of respective parts of the annular deformation body, a first part that is displaced in a direction to approach the rotation axis when torque in a predetermined rotating direction is exerted, a second displacement electrode fixed to a second part that is displaced in a direction to separate from the rotation axis when torque in the predetermined rotating direction is exerted, a first fixed electrode disposed at a position opposed to the first displacement electrode, and a second fixed electrode disposed at a position opposed to the second displacement electrode, wherein the detector circuit outputs an electrical signal corresponding to a difference between a capacitance value of a first capacitive element composed of the first displacement electrode and the first fixed electrode and a capacitance value of a second capacitive element composed of the second displacement electrode and the second fixed electrode as an electrical signal indicating exerted torque.

(9) The ninth feature of the present invention resides in a torque sensor according to the eighth feature, wherein mutually opposed displacement electrodes and fixed electrodes are disposed offset from each other so that, when torque in a predetermined rotating direction is exerted, an effective opposing area of a pair of electrodes composing a capacitive element an electrode interval of which is reduced is increased, and an effective opposing area of a pair of electrodes composing a capacitive element an electrode interval of which is increased is reduced.

(10) The tenth feature of the present invention resides in a torque sensor according to any one of the first to eighth features, wherein an area of one of fixed electrode and displacement electrode is set larger than that of the other so that, even when a relative position of the displacement electrode to the fixed electrode changes as a result of exertion of torque in a predetermined rotating direction, an effective opposing area of a pair of electrodes composing a capacitive element does not change.

(11) The eleventh feature of the present invention resides in a torque sensor according to any one of the first to tenth features, further comprising:

an inner annular deformation body made of a material that produces elastic deformation due to exertion of torque to be detected, having a through-opening portion through which the rotation axis is inserted, disposed inside of the annular deformation body;

an inner left side connection member for connecting an inner left side connection point on a left-hand side surface of the inner annular deformation body to the left side support body;

an inner right side connection member for connecting an inner right side connection point on a right-hand side surface of the inner annular deformation body to the right side support body;

an inner displacement electrode fixed to an inner peripheral surface or an outer peripheral surface of the inner annular deformation body, for producing displacement caused by elastic deformation of the inner annular deformation body; and an inner fixed electrode disposed at a position opposed to the inner displacement electrode, fixed to the left side support body or the right side support body, wherein an orthogonal projection image of the inner left side connection point and an orthogonal projection image of the inner right side connection point with respect to a plane of projection orthogonal to the rotation axis are formed at different positions, and the detector circuit outputs an electrical signal indicating torque about the rotation axis by further using an amount of fluctuation in capacitance value of a capacitive element composed of the inner displacement electrode and the inner fixed electrode.

(12) The twelfth feature of the present invention resides in a torque sensor according to the first feature, wherein for detecting torque about a Z-axis in an XYZ three-dimensional coordinate system, the annular deformation body is disposed on an XY plane about an origin O, the left side support body is disposed in a negative Z-axis region, and the right side support body is disposed in a positive Z-axis region, a first left side connection point and a second left side connection point are provided on a negative Z-axis-side side surface of the annular deformation body, the left side connection member includes a first left side connection member for connecting the first left side connection point to the left side support body and a second left side connection member for connecting the second left side connection point to the left side support body, a first right side connection point and a second right side connection point are provided on a positive Z-axis-side side surface of the annular deformation body, the right side connection member includes a first right side connection member for connecting the first right side connection point to the right side support body and a second right side connection member for connecting the second right side connection point to the right side support body, and when orthogonal projection images are obtained by projecting both side surfaces of the annular deformation body on the XY plane, a projection image of the first right side connection point is disposed on a positive X-axis, a projection image of the second right side connection point is disposed on a negative X-axis, a projection image of the first left side connection point is disposed on a positive Y-axis, and a projection image of the second left side connection point is disposed on a negative Y-axis.

(13) The thirteenth feature of the present invention resides in a torque sensor according to the twelfth feature, wherein the annular deformation body is made of a circular annular member that is obtained by forming, in a central portion of a disk disposed about the Z-axis as a central axis, a through-opening portion being in a shape of a concentric disk having a smaller diameter.

(14) The fourteenth feature of the present invention resides in a torque sensor according to the thirteenth feature, including, when a V-axis and a W-axis that pass though the origin O and create 45 degrees with respect to the X-axis and Y-axis are defined on the XY plane, a first displacement electrode and a first fixed electrode disposed on the V-axis and a second displacement electrode and a second fixed electrode disposed on the W-axis, wherein the detector circuit outputs an electrical signal corresponding to a difference between a capacitance value of a first capacitive element composed of the first displacement electrode and the first fixed electrode and a capacitance value of a second capacitive element composed of the second displacement electrode and the second fixed electrode as an electrical signal indicating exerted torque.

(15) The fifteenth feature of the present invention resides in a torque sensor according to the fourteenth feature, wherein when an outline of an orthogonal projection image of the annular deformation body onto the XY plane changes from a circle to an ellipse due to exertion of torque in a predetermined rotating direction, the V-axis is set in a short-axis direction of the ellipse, and the W-axis is set in a long-axis direction thereof, and with no torque exerted, a position of the first fixed electrode is shifted by a predetermined offset amount in the predetermined rotating direction relative to a position of the first displacement electrode, and a position of the second fixed electrode is shifted by a predetermined offset amount in a direction opposite to the predetermined rotating direction relative to a position of the second displacement electrode.

(16) The sixteenth feature of the present invention resides in a torque sensor according to the thirteenth feature, including, when signed V- and W-axes that pass through the origin O and create 45 degrees with respect to the X-axis and Y-axis are defined on the XY plane, a first displacement electrode and a first fixed electrode disposed on the positive V-axis, a second displacement electrode and a second fixed electrode disposed on the positive W-axis, a third displacement electrode and a third fixed electrode disposed on the negative V-axis, and a fourth displacement electrode and a fourth fixed electrode disposed on the negative W-axis, wherein the detector circuit outputs an electrical signal corresponding to a difference between "a sum of a capacitance value of a first capacitive element composed of the first displacement electrode and the first fixed electrode and a capacitance value of a third capacitive element composed of the third displacement electrode and the third fixed electrode" and "a sum of a capacitance value of a second capacitive element composed of the second displacement electrode and the second fixed electrode and a capacitance value of a fourth capacitive element composed of the fourth displacement electrode and the fourth fixed electrode" as an electrical signal indicating exerted torque.

(17) The seventeenth feature of the present invention resides in a torque sensor according to the sixteenth feature, wherein when an outline of an orthogonal projection image of the annular deformation body onto the XY plane changes from a circle to an ellipse due to exertion of torque in a predetermined rotating direction, the V-axis is set in a short-axis direction of the ellipse, and the W-axis is set in a long-axis direction thereof, and with no torque exerted, a position of the first fixed electrode is shifted by a predetermined offset amount in the predetermined rotating direction relative to a position of the first displacement electrode, a position of the second fixed electrode is shifted by a predetermined offset amount in a direction opposite to the predetermined rotating direction relative to a position of the second displacement electrode, a position of the third fixed electrode is shifted by a predetermined offset amount in the predetermined rotating direction relative to a position of the third displacement electrode, and a position of the fourth fixed electrode is shifted by a predetermined offset amount in a direction opposite to the predetermined rotating direction relative to a position of the fourth displacement electrode.

(18) The eighteenth feature of the present invention resides in a torque sensor according to the fourteenth or sixteenth feature, wherein an area of one of the fixed electrode and displacement electrode is set larger than that of the other so that, even when a relative position of the displacement electrode to the fixed electrode changes as a result of exertion of torque in a predetermined rotating direction, an effective opposing area of a pair of electrodes composing a capacitive element does not change.

(19) The nineteenth feature of the present invention resides in a torque sensor according to the eighteenth feature, wherein displacement electrodes are constructed by a common conductive layer formed on an inner peripheral surface of the annular deformation body.

(20) The twentieth feature of the present invention resides in a torque sensor according to the nineteenth feature, wherein the annular deformation body is constructed by a conductive elastic material so as to use an inner peripheral surface itself of the annular deformation body as a common conductive layer.

(21) The twenty-first feature of the present invention resides in a torque sensor according to the twelfth feature, further comprising an inner annular deformation body made of a material that produces elastic deformation due to exertion of torque to be detected, having a through-opening portion through which the Z-axis is inserted, disposed on the XY plane about the origin O so as to be located inside of the annular deformation body, a first inner left side connection point and a second inner left side connection point being provided on a negative Z-axis-side side surface of the inner annular deformation body, a first inner right side connection point and a second inner right side connection point being provided on a positive Z-axis-side side surface of the inner annular deformation body, and further comprising:

a first inner left side connection member for connecting the first inner left side connection point to the left side support body, a second inner left side connection member for connecting the second inner left side connection point to the left side support body, a first inner right side connection member for connecting the first inner right side connection point to the right side support body, a second inner right side connection member for connecting the second inner right side connection point to the right side support body;

an inner displacement electrode fixed to an inner peripheral surface or an outer peripheral surface of the inner annular deformation body, for producing displacement caused by elastic deformation of the inner annular deformation body; and an inner fixed electrode disposed at a position opposed to the inner displacement electrode, fixed to the left side support body or the right side support body, wherein when orthogonal projection images are obtained by projecting both side surfaces of the inner annular deformation body on the XY plane, a projection image of the first inner right side connection point is disposed on a positive Y-axis, a projection image of the second inner right side connection point is disposed on a negative Y-axis, a projection image of the first inner left side connection point is disposed on a positive X-axis, and a projection image of the second inner left side connection point is disposed on a negative X-axis, and the detector circuit outputs an electrical signal indicating torque about the rotation axis by further using an amount of fluctuation in capacitance value of a capacitive element composed of the inner displacement electrode and the inner fixed electrode.

(22) The twenty-second feature of the present invention resides in a torque sensor for detecting torque about a predetermined rotation axis, comprising:

an outer annular deformation body made of a material that produces elastic deformation due to exertion of torque to be detected, having a through-opening portion through which the rotation axis is inserted;

an inner annular deformation body made of a material that produces elastic deformation due to exertion of torque to be detected, having a through-opening portion through which the rotation axis is inserted, disposed inside of the outer annular deformation body;

a left side support body disposed at a position adjacent to a left side of the outer annular deformation body and the inner annular deformation body, when viewed in such a reference observation direction that the rotation axis creates a horizontal line extending left and right;

a right side support body disposed at a position adjacent to a right side of the outer annular deformation body and the inner annular deformation body, when viewed in the reference observation direction;

an outer left side connection member or connecting an outer left side connection point on a left-hand side surface of the outer annular deformation body to the left side support body;

an outer right side connection member for connecting an outer right side connection point on a right-hand side surface of the outer annular deformation body to the right side support body;

an inner left side connection member for connecting an inner left side connection point on a left-hand side surface of the inner annular deformation body to the left side support body;

an inner right side connection member for connecting an inner right side connection point on a right-hand side surface of the inner annular deformation body to the right side support body;

an outer displacement electrode fixed to an inner peripheral surface of the outer annular deformation body, for producing displacement caused by elastic deformation of the outer annular deformation body;

an inner displacement electrode fixed to an outer peripheral surface of the inner annular deformation body so as to be opposed to the outer displacement electrode, for producing displacement caused by elastic deformation of the inner annular deformation body; and a detector circuit for outputting an electrical signal indicating torque about the rotation axis exerted on one of the right side support body and the left side support body with the other loaded, based on an amount of fluctuation in capacitance value of a capacitive element composed of the outer displacement electrode and the inner displacement electrode, wherein with respect to a plane of projection orthogonal to the rotation axis, an orthogonal projection image of the outer left side connection point and an orthogonal projection image of the outer right side connection point are formed at different positions, and an orthogonal projection image of the inner left side connection point and an orthogonal projection image of the inner right side connection point are formed at different positions.

(23) The twenty-third feature of the present invention resides in a torque sensor for detecting torque about a Z-axis in an XYZ three-dimensional coordinate system, comprising:

an outer annular deformation body made of a material that produces elastic deformation due to exertion of torque to be detected, having a through-opening portion through which the Z-axis is inserted, disposed on an XY plane about an origin O;

an inner annular deformation body made of a material that produces elastic deformation due to exertion of torque to be detected, having a through-opening portion through which the Z-axis is inserted, disposed on the XY plane about the origin O and disposed within the through-opening portion of the outer annular deformation body;

a left side support body disposed at a position adjacent to a negative Z-axis region side of the outer annular deformation body and the inner annular deformation body; and a right side support body disposed at a position adjacent to a positive Z-axis region side of the outer annular deformation body and the inner annular deformation body, a first outer left side connection point and a second outer left side connection point being provided on a negative Z-axis-side side surface of the outer annular deformation body, and a first outer right side connection point and a second outer right side connection point being provided on a positive Z-axis-side side surface of the outer annular deformation body, a first inner left side connection point and a second inner left side connection point being provided on a negative Z-axis-side side surface of the inner annular deformation body, and a first inner right side connection point and a second inner right side connection point being provided on a positive Z-axis-side side surface of the inner annular deformation body, and further comprising:

a first outer left side connection member for connecting the first outer left side connection point to the left side support body, a second outer left side connection member for connecting the second outer left side connection point to the left side support body, a first outer right side connection member for connecting the first outer right side connection point to the right side support body, a second outer right side connection member for connecting the second outer right side connection point to the right side support body;

a first inner left side connection member for connecting the first inner left side connection point to the left side support body, a second inner left side connection member for connecting the second inner left side connection point to the left side support body, a first inner right side connection member for connecting the first inner right side connection point to the right side support body, a second inner right side connection member for connecting the second inner right side connection point to the right side support body;

an outer displacement electrode fixed to an inner peripheral surface of the outer annular deformation body, for producing displacement caused by elastic deformation of the outer annular deformation body;

an inner displacement electrode fixed at a position opposed to the outer displacement electrode in an outer peripheral surface of the inner annular deformation body, for producing displacement caused by elastic deformation of the inner annular deformation body; and a detector circuit for outputting an electrical signal indicating torque about the Z-axis exerted on one of the right side support body and the left side support body with the other loaded, based on an amount of fluctuation in capacitance value of a capacitive element composed of the outer displacement electrode and the inner displacement electrode, wherein when orthogonal projection images are obtained by projecting both side surfaces of the outer annular deformation body and the inner annular deformation body on the XY plane, a projection image of the first outer right side connection point is disposed on a positive X-axis, a projection image of the second outer right side connection point is disposed on a negative X-axis, a projection image of the first outer left side connection point is disposed on a positive Y-axis, a projection image of the second outer left side connection point is disposed on a negative Y-axis, a projection image of the first inner right side connection point is disposed on a positive Y-axis, a projection image of the second inner right side connection point is disposed on a negative Y-axis, a projection image of the first inner left side connection point is disposed on a positive X-axis, and a projection image of the second inner left side connection point is disposed on a negative X-axis.

(24) The twenty-fourth feature of the present invention resides in a torque sensor according to the twenty-third feature, wherein the outer annular deformation body and the inner annular deformation body are made of circular annular members each of which is obtained by forming, in a central portion of a disk disposed about the Z-axis as a central axis, a through-opening portion being in a shape of a concentric disk having a smaller diameter.

(25) The twenty-fifty feature of the present invention resides in a torque sensor according to the twenty-fourth feature, wherein as the left side support body and the right side support body, annular structures each having a through-opening portion at a center portion are used, and an insertion hole that penetrates through through-opening portions of the left side support body, the inner annular deformation body, and the right side support body is secured along the Z-axis.

(26) The twenty-sixth feature of the present invention resides in a torque sensor according to the twenty-fourth or twenty-fifth feature, when a V-axis and a W-axis that pass though the origin O and create 45 degrees with respect to the X-axis and Y-axis are defined on the XY plane, a first outer displacement electrode and a first inner displacement electrode disposed on the V-axis and a second outer displacement electrode and a second inner displacement electrode disposed on the W-axis, wherein the detector circuit outputs an electrical signal corresponding to a difference between a capacitance value of a first capacitive element composed of the first outer displacement electrode and the first inner displacement electrode and a capacitance value of a second capacitive element composed of the second outer displacement electrode and the second inner displacement electrode as an electrical signal indicating exerted torque.

(27) The twenty-seventh feature of the present invention resides in a torque sensor according to the twenty-fourth or twenty-fifth feature, including, when signed V- and W-axes that pass through the origin O and create 45 degrees with respect to the X-axis and Y-axis are defined on the XY plane, a first outer displacement electrode and a first inner displacement electrode disposed on the positive V-axis, a second outer displacement electrode and a second inner displacement electrode disposed on the positive W-axis, a third outer displacement electrode and a third inner displacement electrode disposed on the negative V-axis, and a fourth outer displacement electrode and a fourth inner displacement electrode disposed on the negative W-axis, wherein the detector circuit outputs an electrical signal corresponding to a difference between "a sum of a capacitance value of a first capacitive element composed of the first outer displacement electrode and the first inner displacement electrode and a capacitance value of a third capacitive element composed of the third outer displacement electrode and the third inner displacement electrode" and "a sum of a capacitance value of a second capacitive element composed of the second outer displacement electrode and the second inner displacement electrode and a capacitance value of a fourth capacitive element composed of the fourth outer displacement electrode and the fourth inner displacement electrode" as an electrical signal indicating exerted torque.

(28) The twenty-eighth feature of the present invention resides in a torque sensor according to the twenty-sixth or twenty-seventh feature, wherein outer displacement electrodes are constructed by a common conductive layer formed on the inner peripheral surface of the outer annular deformation body, or inner displacement electrodes are constructed by a common conductive layer formed on the outer peripheral surface of the inner annular deformation body.

(29) The twenty-ninth feature of the present invention resides in a torque sensor according to the twenty-eighth feature, wherein the outer annular deformation body is constructed by a conductive elastic material so as to use the inner peripheral surface itself of the outer annular deformation body as the common conductive layer, or the inner annular deformation body is constructed by a conductive elastic material so as to use the outer peripheral surface itself of the inner annular deformation body as the common conductive layer.

(30) The thirtieth feature of the present invention resides in a torque sensor according to any one of the first to twenty-ninth features, wherein the left side connection member is constructed by a projecting portion projecting rightward from a right side surface of the left side support body, the right side connection member is constructed by a projecting portion projecting leftward from a left side surface of the right side support body, and top surfaces of the projecting portions are joined to the connection points of the annular deformation body.

In the torque sensor according to the present invention, torque detection is performed by using an annular deformation body having a through-opening portion through which a rotation axis is inserted. On both left and right sides of the annular deformation body, a left side support body and a right side support body are disposed, and these are respectively joined to different connection points. Therefore, when torque is applied to one support body with the other support body loaded, a distortion occurs in the annular deformation body, which causes a change in the distance from the rotation axis of the respective portions of the annular deformation body. In the present invention, the change in distance can be detected based on the capacitance value of a capacitive element. That is, the mode of deformation of the annular deformation body can be recognized based on the amount of fluctuation in a capacitance value of a capacitive element composed of a displacement electrode fixed to an inner peripheral surface or outer peripheral surface of the annular deformation body and a fixed electrode disposed at a position opposed to the displacement electrode and fixed to the left side support body or the right side support body, and the exerted torque can be detected.

The annular deformation body, the left side support body, and the right side support body can be constructed by flat structures having small axial thicknesses, which thus allows setting the axial length of the whole sensor short. Moreover, because torque detection is performed based on a distortion in the shape of the annular deformation body, it is necessary to use as the annular deformation body a material that produces elastic deformation, but even by using a material having a relatively high rigidity, high accuracy detection can be performed. Further, because a distortion in the shape of the annular deformation body can be detected by a capacitive element composed of a pair of electrodes, the structure is also simplified, which can contribute to a reduction in cost.

In particular, by joining the annular deformation body at its two upper and lower sites to the left side support body and joining at its two left and right sites to the right side support body so that the connection points shift by 90 degrees from each other, the annular deformation body can be efficiently deformed by exertion of torque. When a circular annular-shaped structure is used as the annular deformation body, it maintains a circular shape in an unloaded state where no torque is exerted, so that the respective portions are equal in distance from the rotation axis, but when it is deformed into an elliptical shape by exertion of torque, the distance from the rotation axis is extended at a long-axis position, and the distance from the rotation axis is reduced at a short-axis position. Therefore, if capacitive elements are provided at the long-axis position and short-axis position, respectively, when the same torque is applied, the capacitance value decreases as a result of an increase in electrode interval at the long-axis position, while the capacitance value increases as a result of a reduction in electrode interval at the short-axis position, and thus the exerted torque can be detected as a difference of both capacitance values.

Such difference detection is effective for stable torque detection in which common-mode noise and zero-point drift are suppressed, and contributes to canceling out the effect of expansion of the respective portions due to temperature to obtain a highly accurate detection value. Further, providing four capacitive elements at both end positions of the long axis and both end positions of the short axis allows difference detection using two capacitive elements whose capacitance values increase and two capacitive elements whose capacitance values decrease, and the detection accuracy is further improved.

In the torque sensor according to the present invention, a through-opening portion through which the rotation axis is inserted can be formed not only in the annular deformation body but also in the left side support body and the right side support body. Accordingly, an insertion hole that penetrates through the through-opening portions of the left side support body, the annular deformation body, and the right side support body can be secured along the rotation axis, and a structure to have a hollow interior can be adopted. Therefore, when a torque sensor according to the present invention is used integrated into a joint part of a robot arm, a decelerator or the like can be disposed in the hollow part, which allows designing a robot arm that is space saving on the whole.

Also, in the torque sensor according to the present invention, the torsion angle of the annular deformation body can be suppressed relatively small in a state where torque is exerted, however, the respective portions of the annular deformation body move in a rotating direction in which the torque is applied. Therefore, when torque is exerted, the position of the displacement electrode has offset relative to the position of the fixed electrode, variation in effective opposing area of the pair of electrodes composing a capacitive element occurs, and the variation in area has an effect on the capacitance value.

Therefore, by disposing in advance one of the electrodes with offset in a predetermined direction in an unloaded state where no torque is exerted, an adverse effect can be prevented from being exerted on the detection result due to variation in the effective area of the capacitive element when torque is exerted. Alternatively, by setting the area of one of the fixed electrode and displacement electrode larger than that of the other, even when the relative position of the displacement electrode to the fixed electrode changes, the effective area of the capacitive element can be maintained constant, which can prevent an adverse effect from being exerted on the detection result due to variation in area. Moreover, accurate torque detection free from the influence of disturbance components other than torque to be detected can be performed.

In the torque sensor according to the present invention, a configuration of integrating two annular deformation bodies can also be adopted. That is, by integrating an inner annular deformation body inside of an outer annular deformation body, separate detection results can be obtained from each of the two annular deformation bodies, so that the detection sensitivity and accuracy can be improved. Moreover, the rigidity of the sensor structure as a whole is also improved. In particular, by using circular annular structures as both annular deformation bodies so that both are deformed into elliptical shapes when torque is exerted and providing connection points shifted by 90 degrees from each other so that the long-axis direction of one ellipse serves as the short-axis direction of the other ellipse, the detection accuracy can be further improved.

Moreover, when the configuration of integrating two annular deformation bodies disposed at the outside and inside is adopted, in place of a capacitive element composed of a displacement electrode and a fixed electrode, a capacitive element composed of an outer displacement electrode formed on the inner peripheral surface of the outer annular deformation body and an inner displacement electrode formed on the outer peripheral surface of the inner annular deformation body can also be formed. Also in this case, by using circular annular structures as both annular deformation bodies so that both are deformed into elliptical shapes when torque is exerted and providing connection points shifted by 90 degrees from each other so that the long-axis direction of one ellipse serves as the short-axis direction of the other ellipse, the amount of variation in the electrode interval between the outer displacement electrode and the inner displacement electrode can be set large, and the detection sensitivity can be further improved.

BEST MODES FOR CARRYING OUT THE INVENTION

Hereinafter, the present invention will be described based on illustrated embodiments.

<<<Section 1. Basic Structural Section of Torque Sensor According to Present Invention>>>

Figure 1:
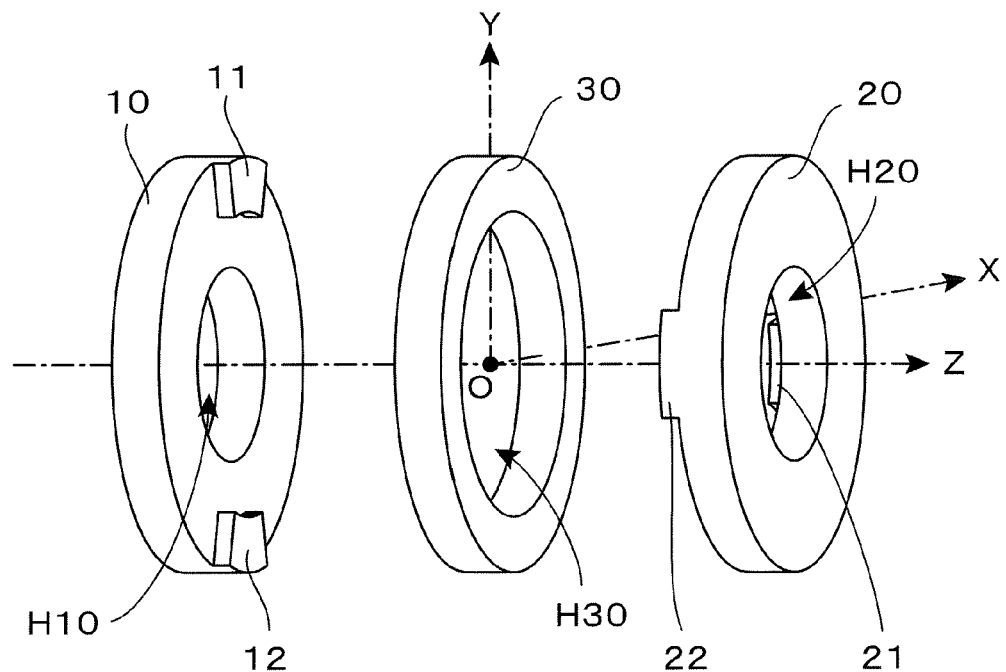
FIG. 1 is an exploded perspective view of a basic structural section of a torque sensor according to a basic embodiment of the present invention.

FIG. 1 is an exploded perspective view of a basic structural section of a torque sensor according to a basic embodiment of the present invention. As illustrated, the basic structural section is constructed by disposing an annular deformation body 30 between a left side support body 10 and a right side support body 20 and joining the three structural elements to each other. Here, for the sake of convenience, an XYZ three-dimensional coordinate system is defined as illustrated to give the following description. Here, the Z-axis drawn in the horizontal direction of the figure corresponds to a rotation axis of torque to be detected, and the torque sensor fulfills a function of detecting torque about the rotation axis (about the Z-axis).

The annular deformation body 30 disposed at the middle of the figure is made of a material that produces elastic deformation clue to exertion of torque to be detected, and inside of the same, a through-opening portion H30 through which the rotation axis (Z-axis) is inserted is formed. On the other hand, the left side support body 10 disposed at the left side of the figure is a member for supporting a left side surface of the annular deformation body 30, and the right side support body 20 disposed at the right side of the figure is a member for supporting a right side surface of the annular deformation body 30. In the case of the basic embodiment shown here, the left side support body 10 is an annular member formed with a through-opening portion H10 through which the rotation axis (Z-axis) is inserted, and the right side support body 20 is an annular member formed with a through-opening portion H20 through which the rotation axis (Z-axis) is inserted.

Generally, the concept of a right side and a left side carries a meaning only in the case of viewing in a specific observing direction, but here, for convenience of description, the support body disposed at a position adjacent to the left side of the annular deformation body 30 when viewed, as shown in FIG. 1, in such a reference observation direction that the rotation axis (Z-axis) creates a horizontal line extending left and right (such an observation direction that the right direction corresponds to a positive direction of the Z-axis) is called a left side support body 10, and the support body disposed at a position adjacent to the right side of the annular deformation body 30 is called a right side support body 20.

Here, the origin O of the XYZ three-dimensional coordinate system is defined at a center position of the annular deformation body 30, and the left side support body 10, the annular deformation body 30, and the right side support body 20 are all constructed by circular annular members having their central axes at the Z-axis. More specifically, the annular deformation body 30 is made of a circular annular member that is obtained by forming, in a central portion of a disk disposed about the Z-axis (rotation axis) as a central axis, the through-opening portion H30 being in a shape of a concentric disk having a smaller diameter. Similarly, the left side support body 10 and the right side support body 20 are also made of circular annular members each of which is obtained by forming, in a central portion of a disk disposed about the Z-axis (rotation axis) as a central axis, the through-opening portion H10, H20 being in a shape of a concentric disk having a smaller diameter.

On the other hand, on a right side surface of the left side support body 10, two fan-shaped projecting portions 11, 12 projecting rightward are provided, and top surfaces of the projecting portions 11, 12 are joined to the left side surface of the annular deformation body 30. As illustrated, the projecting portion 11 is joined to an upper portion (part located in a positive Y-axis direction) of the annular deformation body 30, and the projecting portion 12 is joined to a lower portion (part located in a negative Y-axis direction) of the annular deformation body 30. Similarly, on a left side surface of the right side support body 20, two fan-shaped projecting portions 21, 22 projecting leftward are provided, and top surfaces of the projecting portions 21, 22 are joined to the right side surface of the annular deformation body 30. As illustrated, the projecting portion 21 is joined to a far part (part located in a positive X-axis direction) of the annular deformation body 30, and the projecting portion 22 is joined to a near part (part located in a negative X-axis direction) of the annular deformation body 30.

Figure 2:
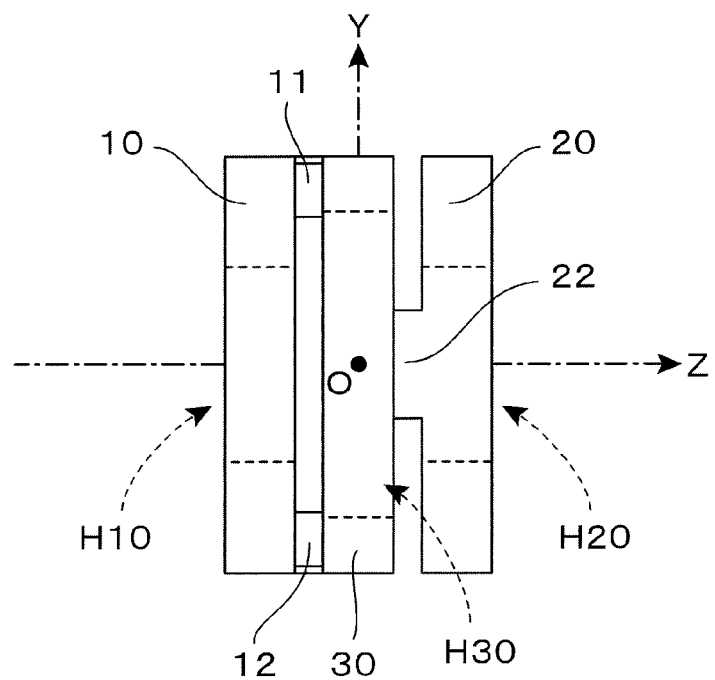
FIG. 2 is a side view of the basic structural section of the torque sensor obtained by joining the three structural elements shown in FIG. 1 to each other.
Figure 3:
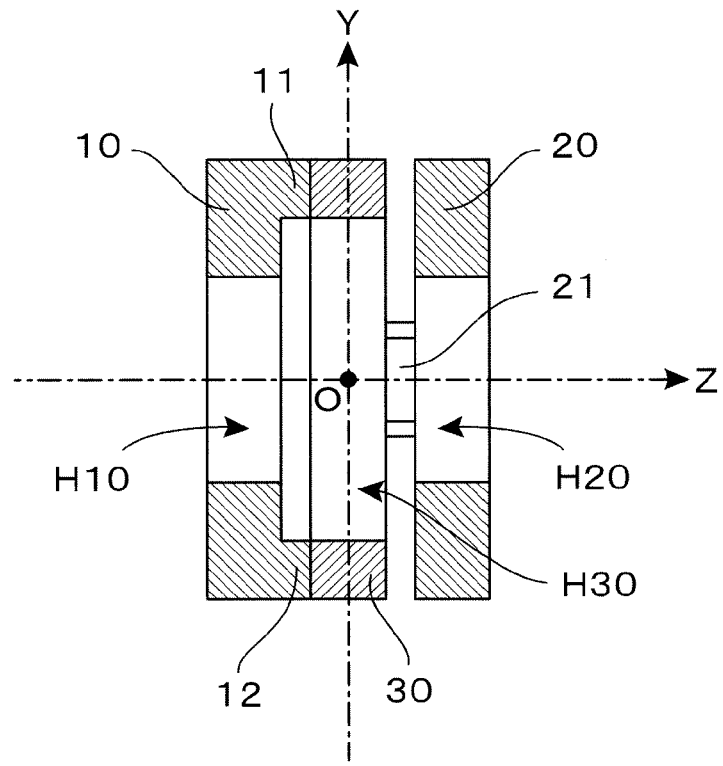
FIG. 3 is a side sectional view taken along a YZ plane of the basic structural section shown in FIG. 2.

FIG. 2 is a side view of a basic structural section of a torque sensor obtained by joining the three structural elements shown in FIG. 1 to each other, and FIG. 3 is a side sectional view taken along a YZ plane of the basic structural section. In the case of the example shown here, as shown in FIG. 3, the projecting portions 11, 12 are structures unified with the left side support body 10, and their top surfaces are joined to the left side surface of the annular deformation body 30. Similarly, the projecting portions 21, 22 are structures unified with the right side support body 20, and their top surfaces are joined to the right side surface of the annular deformation body 30.

Consequently, the projecting portions 11, 12 function as left side connection members for connecting left side connection points on the left-hand side surface, opposed to the left side support body 10, of the annular deformation body 30 to the left side support body 10, and the projecting portions 21, 22 function as right side connection members for connecting right side connection points on the right-hand side surface, opposed to the right side support body 20, of the annular deformation body 30 to the right side support body 20.

Figure 4:
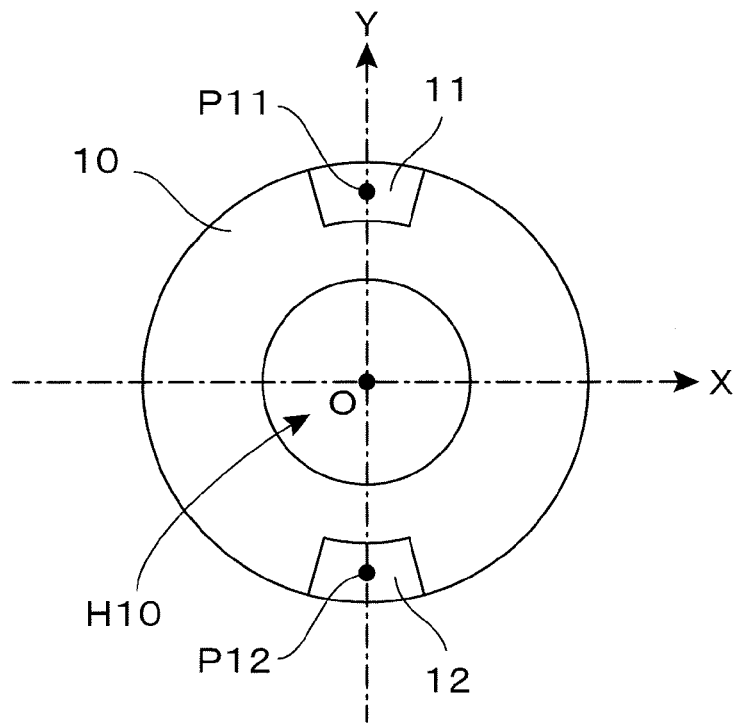
FIG. 4 is a front view of the left side support body 10 and projecting portions 11, 12 shown in FIG. 1, viewed from the right of FIG. 1.
Figure 5:
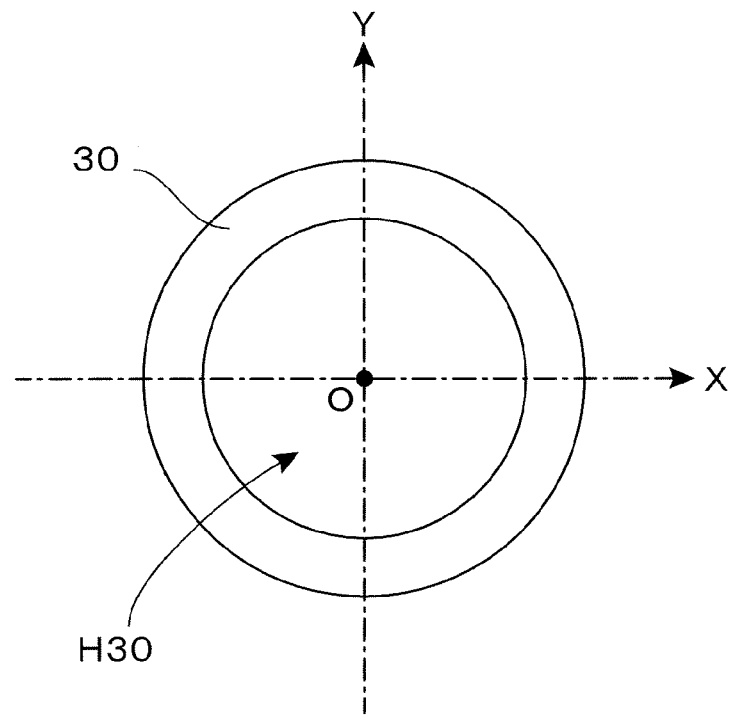
FIG. 5 is a front view of the annular deformation body 30 shown in FIG. 1 viewed from the right of FIG. 1.
Figure 6:
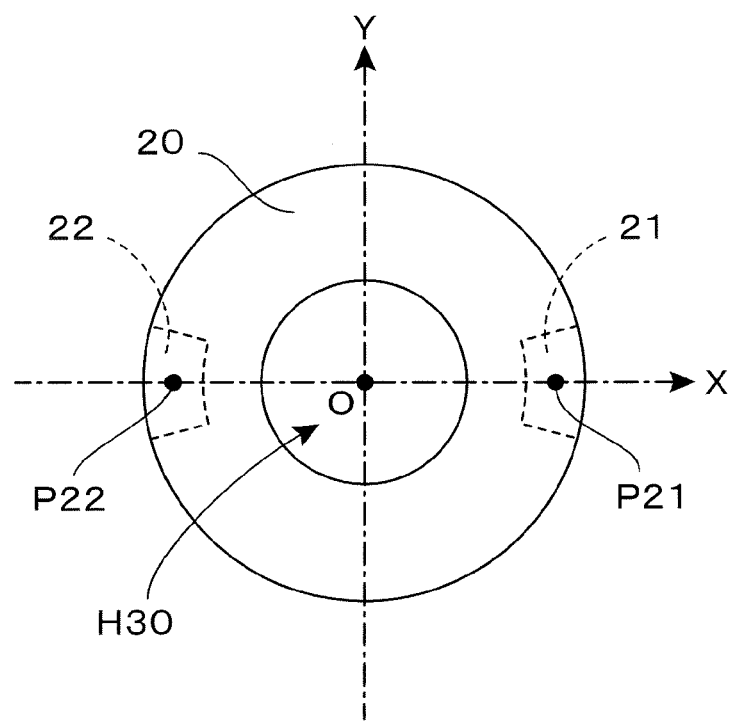
FIG. 6 is a front view of the right side support body 20 and projecting portions 21, 22 shown in FIG. 1, viewed from the right of FIG. 1.

FIG. 4 is a front view of the left side support body 10 and the projecting portions 11, 12 viewed from the right of FIG. 1. FIG. 5 is a front view of the annular deformation body 30 viewed from the right of FIG. 1. FIG. 6 is a front view of the right side support body 20 and the projecting portions 21, 22 viewed from the right of FIG. 1. In FIG. 4, the points P11, P12 shown at center positions of the projecting portions 11, 12 are left side connection points, and in Section 2 described later, these points are to be used for describing the connecting positions to the annular deformation body 30. Similarly, in FIG. 6, the points P21, P22 shown at center positions of the projecting portions 21, 22 are right side connection points, and also in Section 2, these points are to be used for describing the connecting positions to the annular deformation body 30.

In actuality, it is preferable that the components (left side support body 10 and projecting portions 11, 12) shown in FIG. 4 and the components (right side support body 20 and projecting portions 21, 22) shown in FIG. 6 are exactly the same. In this case, the components shown in FIG. 4 that are rotated 180 degrees about the Y-axis as a rotation axis to be reversed and are further rotated 90 degrees about the Z-axis as a rotation axis completely coincide with the components shown in FIG. 6. Therefore, in actuality, the basic structural section shown in FIG. 2 can be constructed by preparing two sets of the components shown in FIG. 4 and one set of the components shown in FIG. 5.

As shown in FIG. 5, in the annular deformation body 30, there is provided a circular through-opening portion H30, which is for causing elastic deformation necessary for detection. As to be described later, when torque to be detected is exerted on the basic structural section, the annular deformation body 30 needs to be deformed into an elliptical shape. Ease in such elastic deformation of the annular deformation body 30 serves as a parameter that affects the detection sensitivity of the sensor. If an annular deformation body 30 that is easily elastically deformed is used, a high-sensitivity sensor capable of detecting even minute torque can be realized, but the maximum value of detectable torque is moderated. Conversely, if an annular deformation body 30 that is hard to be elastically deformed is used, a large maximum value of detectable torque can be secured, but the sensitivity is lowered, so that minute torque can no longer be detected.

Ease in elastic deformation of the annular deformation body 30 depends on the thickness in the Z-axis direction (the thinner, the more easily elastically deformed) and the diameter of the through-opening portion H30 (the larger, the more easily elastically deformed), and further depends on the material thereof. Therefore, practically, it suffices to appropriately select the dimensions of the respective portions of the annular deformation body 30 and the material thereof according to the use of the torque sensor.

On the other hand, it is not necessary in the detection principle of the present invention that the left side support body 10 and the right side support body 20 are members that produce elastic deformation. It is rather preferable, for making exerted torque contribute 100% to deformation of the annular deformation body 30, that the left side support body 10 and the right side support body 20 are perfectly rigid bodies. In the illustrated example, the reason for using, as the left side support body 10 and the right side support body 20, annular structures having the through-opening portions H10, H20 at center portions, respectively, is not for easier elastic deformation, but for securing an insertion hole that penetrates through the through-opening portions H10, H30, H20 of the left side support body 10, the annular deformation body 30, and the right side support body 20 along the rotation axis (Z-axis).

As is apparent with reference to the side sectional view of FIG. 3, the basic structural portion adopts a structure to have a hollow interior. When a torque sensor having such a hollow part is used integrated into a joint part of a robot arm, a decelerator or the like can be disposed in the hollow part, which allows designing a robot arm that is space saving on the whole. This is one of the advantages that have been difficult to be realized by a conventional torque sensor that uses torsion of a torsion bar having a solid round bar shape.

Thus, in the torque sensor according to the present invention, the annular deformation body 30 needs to be constructed with a material that produces elastic deformation to an extent necessary for torque detection, while it is not necessary that the left side support body 10 and the right side support body 20 produce elastic deformation, and it is rather preferable to construct these by use of a highly rigid material. Practically, as the material of each of the left side support body 10, the right side support body 20, and the annular deformation body 30, if an insulating material is used, it suffices to use a synthetic resin such as plastic, and if a conductive material is used (in this case, it is necessary to apply insulation to necessary parts so as to prevent electrodes from short-circuiting, as to be described later), it suffices to use a metal such as stainless steel or aluminum. Of course, an insulating material and a conductive material may be used in combination.

The left side support body 10, the right side support body 20, and the annular deformation body 30 can all be constructed by flat structures having small axial thicknesses, which thus allows setting the axial length of the whole sensor short. Moreover, because torque detection is performed based on a distortion in the shape of the annular deformation body 30, it is necessary to use as the annular deformation body 30 a material that produces elastic deformation, but even by using a material having a relatively high rigidity, high accuracy detection can be performed.

<<<Section 2. Principle of Torque Detection in Present Invention>>>

Figure 7:
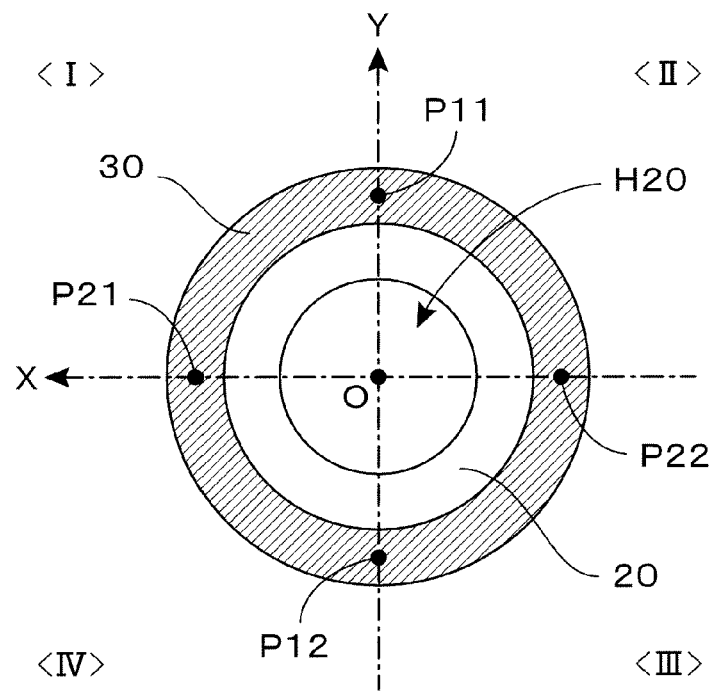
FIG. 7 is a sectional view taken along an XY plane of the basic structural section shown in FIG. 2, and viewed from the left of FIG. 2.

Next, how the respective portions of the basic structural section described in Section 1 are deformed when torque is exerted thereon is considered. FIG. 7 is a sectional view taken along an XY plane of the basic structural section shown in FIG. 2, and viewed from the left of FIG. 2. The XY coordinate system shown in FIG. 7 is a normal XY coordinate system that is viewed from the backside (having a positive X-axis direction corresponding to the left direction in the figure). Therefore, in the XY coordinate system, the upper left region serves as a first quadrant, the upper right region serves as a second quadrant, the lower right region serves as a third quadrant, and the lower left region serves as a fourth quadrant. The numerals I to IV shown in the figure indicate the quadrants of the coordinate system, respectively. The sectional part with hatching in the figure corresponds to the part of the annular deformation body 30, at the back of which the right side support body 20 can be observed. The points P11 to P22 in the figure are orthogonal projection images of the connection points P11 to P22 shown in FIG. 4 and FIG. 6 onto an XY plane.

That is, in FIG. 7, the points P11, P12 disposed on the Y-axis indicate joint positions (center points of joint surfaces) of the projecting portions 11, 12 of the left side support body 10, and the points P21, P22 disposed on the X-axis indicate joint positions (center points of joint surfaces) of the projecting portions 21, 22 of the right side support body 20. Consequently, the left side surface of the annular deformation body 30 is joined to the left side support body 10 at the two connection points P11, P12 along the Y-axis, and the right side surface of the annular deformation body 30 is joined to the right side support body 20 at the two connection points P21, P22 along the X-axis.

Thus, by joining the annular deformation body 30 at its two upper and lower sites to the left side support body 10 and joining at its two left and right sites to the right side support body 20 so that the connection points shift by 90 degrees from each other, the annular deformation body 30 can be efficiently deformed by exertion of torque.

In the case of the example shown in FIG. 7, when orthogonal projection images are obtained by projecting both side surfaces of the annular deformation body 30 on the XY plane, the projection image of the first right side connection point P21 is disposed on a positive X-axis, the projection image of the second right side connection point P22 is disposed on a negative X-axis, the projection image of the first left side connection point P11 is disposed on a positive Y-axis, and the projection image of the second left side connection point P12 is disposed on a negative Y-axis. By performing such an arrangement, the annular deformation body 30 can be deformed into an elliptical shape having axial symmetry, so that a detection value with axial symmetry can be obtained.

The torque sensor according to the present invention detects torque (a rotational moment) relatively applied between the left side support body 10 and the right side support body 20 in the basic structural section shown in FIG. 2, and the detection value indicates a force that is relatively applied between both support bodies 10, 20. Therefore, here, for convenience of description, a rotational moment applied to the left side support body 10 with the right side support body 20 loaded is considered as torque to be detected (Of course, it is also equally valid to consider as torque to be detected a rotational moment applied to the right side support body 20 with the left side support body 10 loaded.).

Suppose, for instance, as an example of usage of the torque sensor in a joint part of a robot arm, an example in which a drive source such as a motor is attached to the left side support body 10 and a robot hand is attached to the right side support body 20. If a rotational drive force is applied to the left side support body 10 from the drive source with a heavy object grasped by a robot hand, the rotational drive force is transmitted to the robot hand side via the basic structural section that constructs the joint part. In this case, torque to attempt to rotationally drive the right side support body 20 is exerted, and the torque corresponds to a rotational moment applied to the left side support body 10 with the right side support body 20 fixed.

Now, what kind of change such a rotational moment brings about in the structure shown in FIG. 7 is considered. When the right side support body 20 is fixed, the position of the connection points P21, P22 on the X-axis shown in FIG. 7 is brought into a fixed state. On the other hand, if a rotational moment is applied to the left side support body 10, for example, in the clockwise direction in FIG. 7, the connection points P11, P12 on the Y-axis attempt to move clockwise. Then, inevitably, the part of an arc P21-P11 located in the first quadrant I is caused to contract in the inside direction, the part of an arc P11-P22 located in the second quadrant II expands to the outside, the part of an arc P22-P12 located in the third quadrant III is caused to contract in the inside direction, and the part of an arc P12-P21 located in the fourth quadrant IV expands to the outside.

Figure 8:
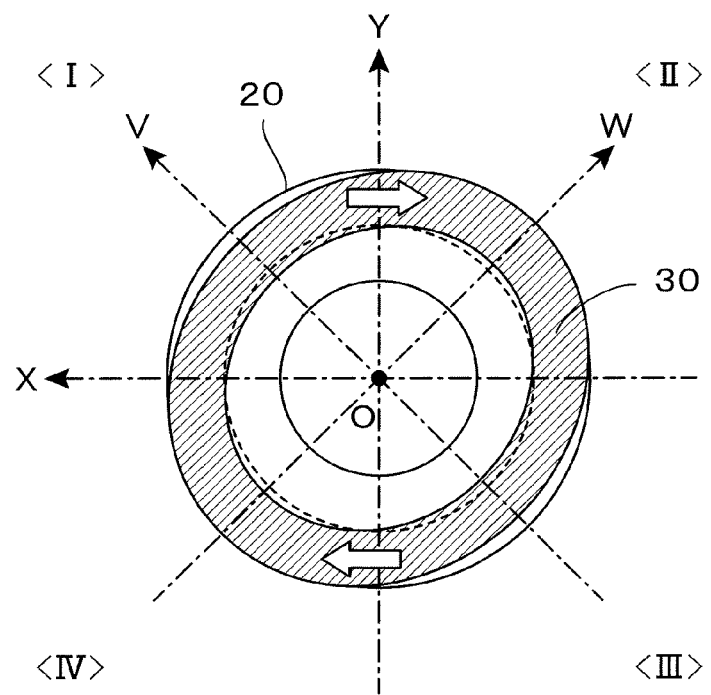
FIG. 8 is a sectional view along an XY plane showing a deformed state when forward torque about the Z-axis is exerted on the basic structural section shown in FIG. 2 (is a sectional view taken along an XY plane of the basic structural section shown in FIG. 2, and viewed from the left of FIG. 2. The broken line shows a state before deformation).

FIG. 8 is a sectional view showing a state where such deformation has occurred in the structure shown in FIG. 7. That is, FIG. 8 is a sectional view, when forward torque about the Z-axis is exerted on the basic structural section shown in FIG. 2, taken along an XY plane of the basic structural section, and viewed from the left of FIG. 2. In the present application, with regard to an arbitrary coordinate axis, a rotating direction to advance a right-handed thread in a positive direction of said coordinate axis is defined as a forward direction, and the rotating direction to advance a right-handed thread in a negative direction of said coordinate axis is defined as a reverse direction. Therefore, in FIG. 8, the forward torque about the Z-axis means torque that is exerted in the clockwise direction as shown by the outlined arrows in the figure.

The broken line drawn in FIG. 8 shows a state before deformation (state in FIG. 7) of the annular deformation body 30. It can be easily understood by reference to the broken line that the annular deformation body 30 has been deformed into an elliptical shape as a result of forward torque about the Z-axis having been exerted. Here, for convenience of description, a V-axis and a W-axis that pass through the origin O and create 45 degrees with respect to the X-axis and Y-axis are defined on the XY plane. The V-axis is a coordinate axis having a positive direction in the first quadrant I, and the W-axis is a coordinate axis having a positive direction in the second quadrant II. As illustrated, the annular deformation body 30 has been deformed into an ellipse having a short axis direction along the V-axis and a long-axis direction along the W-axis, and has axial symmetry with respect to the V-axis and W-axis. Such axial symmetry is favorable for obtaining a detection value of torque by a method to be described in Section 3.

In the illustrated embodiment, deformation with axial symmetry is produced because, as shown in FIG. 7, the annular deformation body 30 has a perfect circular shape with no load (when no torque is exerted), and when both side surfaces of the annular deformation body 30 are projected on the XY plane to obtain orthogonal projection images, the projection image of the first right side connection point P21 is disposed on the positive X-axis, the projection image of the second right side connection point P22 is disposed on the negative X-axis, the projection image of the first left side connection point P11 is disposed on the positive Y-axis, and the projection image of the second left side connection point P12 is disposed on the negative Y-axis.

The greater the exerted torque, the more flattened ellipse the annular deformation body 30 is deformed into. Therefore, in FIG. 8, if the distance of a part located on the V-axis of the annular deformation body 30 from the origin O and the distance of a part located on the W-axis of the annular deformation body 30 from the origin O can be measured (these distances serve as information indicating the amount of displacement from the position before deformation shown by the broken line), the magnitude of the exerted torque can be determined. In other words, it suffices to be able to measure radial displacement of an inner peripheral surface or outer peripheral surface of the annular deformation body 30.

On the other hand, when torque is exerted in an opposite direction, that is, when reverse torque about the Z-axis is exerted, a counterclockwise rotational force is exerted on (the connection points P11, P12 of) the annular deformation body 30 conversely to the example shown in FIG. 8, so that the annular deformation body 30 is deformed into an ellipse having a long axis direction along the V-axis and a short-axis direction along the W-axis. Therefore, the displacement direction of a part located on the V-axis or a part located on the W-axis of the annular deformation body 30 is a direction opposite to that in the example shown in FIG. 8.

Consequently, measuring displacement of a part located on the V-axis or a part located on the W-axis of the annular deformation body 30 allows detection of both the direction and magnitude of the exerted torque. For example, when the position of an intersection between the inner peripheral surface of the annular deformation body 30 and the V-axis is monitored, it can be judged that forward torque about the Z-axis is being applied in the case of displacement produced in the inside direction from the reference position shown by the broken line and that reverse torque about the Z-axis is being applied in the case of displacement produced in the outside direction. Alternatively, when the position of an intersection between the inner peripheral surface of the annular deformation body 30 and the W-axis is monitored, it can be judged that forward torque about the Z-axis is being applied in the case of displacement produced in the outside direction from the reference position shown by the broken line and that reverse torque about the Z-axis is being applied in the case of displacement produced in the inside direction. Of course, the absolute value of the amount of displacement indicates the magnitude of the exerted torque.

The radial displacement of the annular deformation body 30 to be produced in the torque sensor according to the present invention is relatively large depending on the radius of the annular deformation body even when the torsion angle produced on the annular deformation body 30 is small. Accordingly, even if an annular deformation body 30 with a relatively high rigidity is used, torque detection can be performed with sufficient sensitivity.

The above is the principle of torque detection in the present invention. In the present invention, capacitive elements and a detector circuit are added to the basic structural section having been described so far in order to perform torque detection based on such a principle.

<<<Section 3. Capacitive Elements and Detector Circuit>>>

As described above, in the present invention, capacitive elements and a detector circuit are added to the basic structural section shown in FIG. 2 to construct a torque sensor. As shown in FIG. 8, the annular deformation body 30 is deformed into an ellipse by exertion of torque. Because the part where the largest displacement is produced by such deformation is a part located on the V-axis or a part located on the W-axis, it is the most efficient, for measuring the amount of deformation (magnitude of exerted torque) of the annular deformation body 30 based on displacement of a specific part of the annular deformation body 30, to measure displacement of a part located on the V-axis or a part located on the W-axis.

Figure 9:
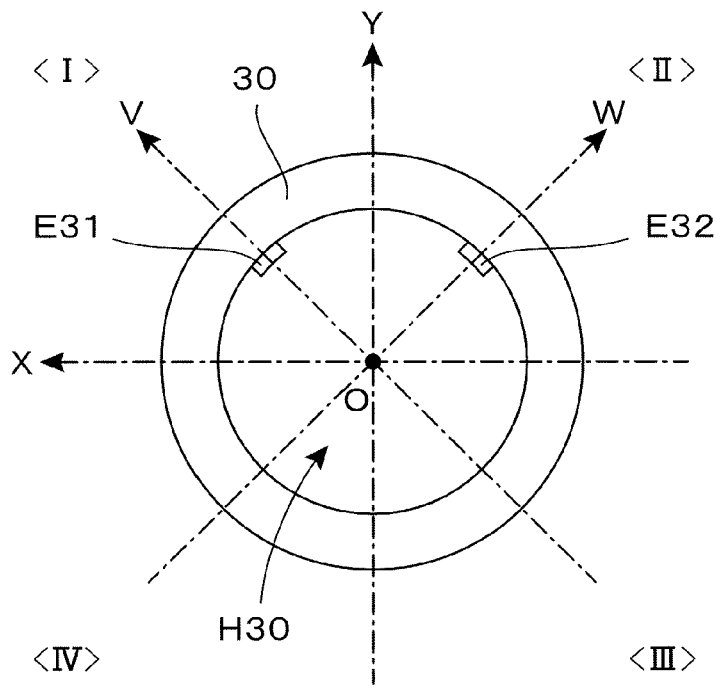
FIG. 9 is a plan view of the annular deformation body 30 with displacement electrodes E31, E32 formed at its inner peripheral surface, viewed from the left of FIG. 2.

Therefore, in the embodiment to be described here, displacement electrodes are formed at a part located on the V-axis and a part located on the W-axis of an inner peripheral surface of the annular deformation body 30. FIG. 9 is a plan view of the annular deformation body 30 with displacement electrodes E31, E32 formed at its inner peripheral surface, viewed from the left of FIG. 2. For convenience of description, the X-, Y-, V-, and W-axes are drawn in an overlapping manner. The displacement electrode E31 is an electrode formed at the intersection position between a positive region of the V-axis and the inner peripheral surface of the annular deformation body 30, and the displacement electrode E32 is an electrode formed at the intersection position between a positive region of the W-axis and the inner peripheral surface of the annular deformation body 30. The depth dimension (dimension in the direction vertical to the sheet plane of FIG. 9) of these displacement electrodes E31, E32 is equal to the depth dimension of the annular deformation body 30. In the case of this example, the displacement electrodes E31, E32 are constructed, on the inner peripheral surface of the annular deformation body 30, by a conductive layer such as a metal film formed by a method such as vapor deposition or plating. Of course, when the annular deformation body 30 is made of a metal such as aluminum or stainless steel, the annular deformation body 30 itself has electrical conductivity, and thus it is necessary to form the displacement electrodes E31, E32 via an insulating layer.

Figure 10:
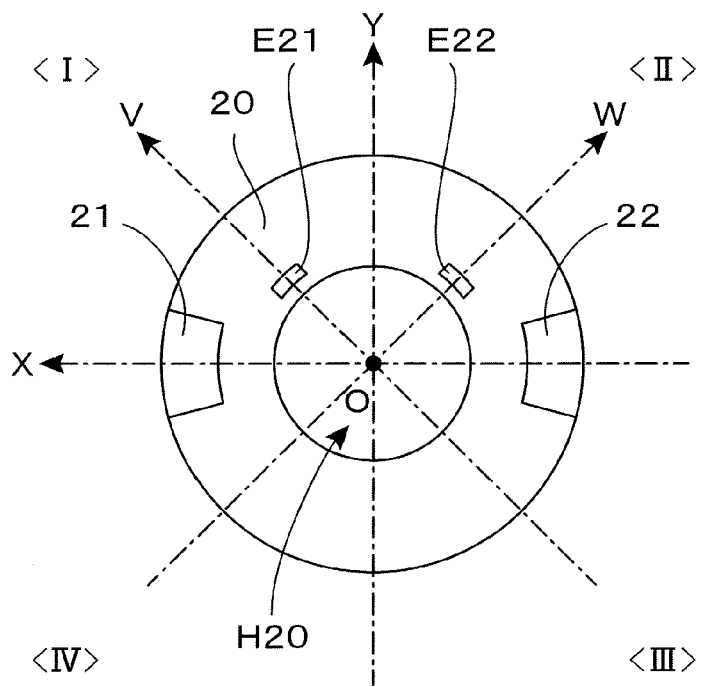
FIG. 10 is a plan view of the right side support body 20 with fixed electrodes E21, E22 attached, viewed from the left of FIG. 2.

On the other hand, at positions opposed to the displacement electrodes E31, E32, fixed electrodes E21, E22 are provided, respectively, and fixed to the right side support body 20. FIG. 10 is a plan view of the right side support body 20 with the fixed electrodes E21, E22 attached, viewed from the left of FIG. 2. Also here, for convenience of description, the X-, Y-, V-, and W-axes are drawn in an overlapping manner. The fixed electrode E21 is disposed in the positive region of the V-axis, and is opposed to the displacement electrode E31. The fixed electrode E22 is disposed in the positive region of the W-axis, and is opposed to the displacement electrode E32.

Figure 11:
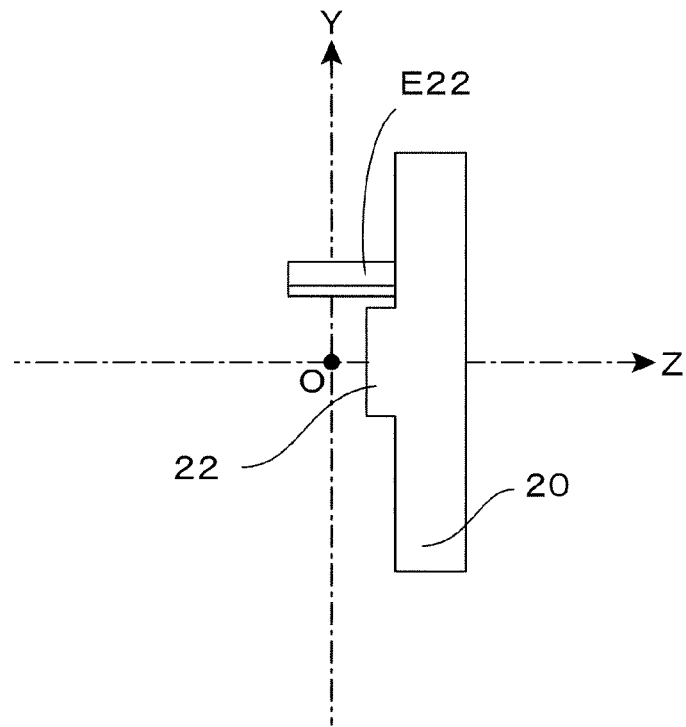
FIG. 11 is a side view of the right side support body 20 shown in FIG. 10.

FIG. 11 is a side view of the right side support body 20 shown in FIG. 10. As illustrated, the fixed electrode E22 is constructed by a conductive plate projecting in a direction (negative Z-axis direction) along the rotation axis from the left side surface of the right side support body 20. The fixed electrode E21 is hidden behind the fixed electrode E22, and thus does not appear in FIG. 11.

Figure 12:
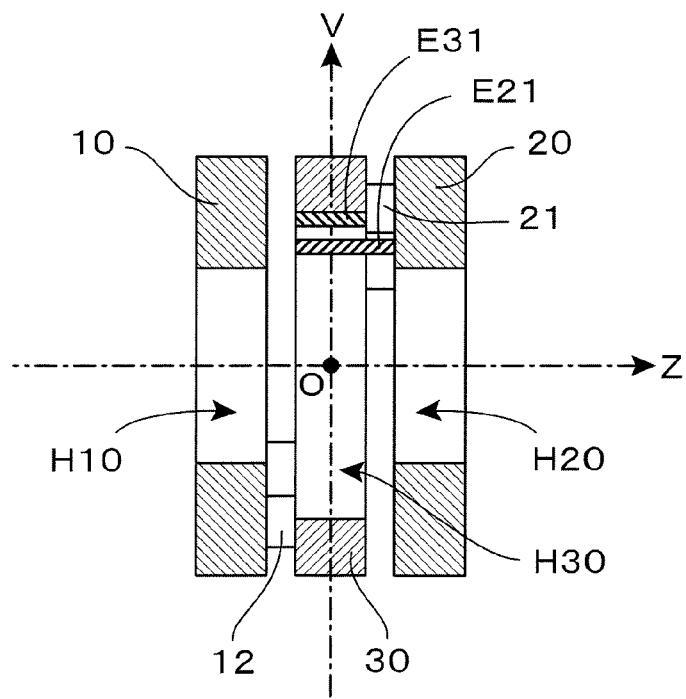
FIG. 12 is a side sectional view taken along a VZ plane of a structure for which displacement electrodes and fixed electrodes are added to the basic structural section shown in FIG. 3 (the upside of FIG. 12 is a V-axis direction shown in FIG. 9 and FIG. 10).

FIG. 12 is a side sectional view taken along a VZ plane of a structure for which displacement electrodes and fixed electrodes are added to the basic structural section shown in FIG. 3. FIG. 3 is a side sectional view taken along a YZ plane, while FIG. 12 is a side sectional view taken along a VZ plane, and thus the upside of FIG. 12 is not the Y-axis direction, but the V-axis direction shown in FIG. 9 and FIG. 10. In the side sectional view of FIG. 12, a state where the displacement electrode E31 and the fixed electrode E21 disposed on the V-axis are opposed to each other is clearly shown. The displacement electrode E31 is an electrode fixedly fitted to the inner peripheral surface of the annular deformation body 30, and is thus displaced depending on deformation of the annular deformation body 30. On the other hand, the fixed electrode E21 is fixed at its right end to the right side support body 20, and always keeps a constant position irrespective of deformation of the annular deformation body 30.

Consequently, the relative position of the displacement electrode E31 to the fixed electrode E21 changes depending on deformation of the annular deformation body 30. In other words, the inter-electrode distance between the displacement electrode E31 and the fixed electrode E21 changes depending on deformation of the annular deformation body 30. Although not shown in FIG. 12, the displacement electrode E32 and the fixed electrode E22 disposed on the W-axis also have exactly the same relationship.

Figure 13:
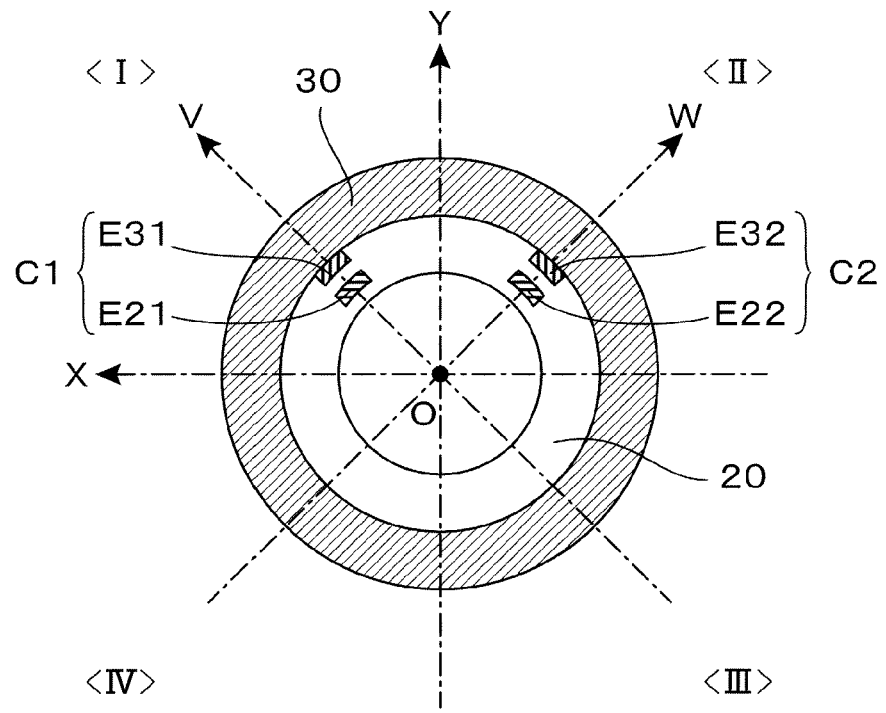
FIG. 13 is a sectional view taken along an XY plane of a structure for which the above-described displacement electrodes and fixed electrodes are added to the basic structural section shown in FIG. 2, and viewed from the left of FIG. 2.

FIG. 13 is a sectional view taken along an XY plane of a structure for which the above-described displacement electrodes and fixed electrodes are added to the basic structural section shown in FIG. 2, and viewed from the left of FIG. 2. In the sectional view, a state where the displacement electrode E31 and the fixed electrode E21 disposed on the V-axis are opposed to each other and the displacement electrode E32 and the fixed electrode E22 disposed on the W-axis are opposed to each other is clearly shown.

In the case of the embodiment shown here, because the displacement electrodes E31, E32 are constructed by the conductive layer formed on the inner peripheral surface of the annular deformation body 30, their surfaces are curved surfaces along the inner periphery of the annular deformation body 30. Therefore, the fixed electrodes E21, E22 opposed to these are also provided as curved surface-shaped electrodes. In other words, the surfaces of the displacement electrodes E31, E32 and the fixed electrodes E21, E22 are constructed by the surfaces of concentric columns having their central axes at the Z-axis. Of course, because the electrodes can have any surface shape as long as they can serve as constructing capacitive elements, flat plate-shaped electrodes having planar surfaces may be used.

In the drawings of the present application, for convenience of illustration, the displacement electrodes and the fixed electrodes are drawn regardless of their actual thickness dimensions. For example, when the displacement electrodes E31, E32 are constructed by a conductive layer (vapor deposition layer or plating layer) formed on the inner peripheral surface of the annular deformation body 30, their thickness can be set to the order of a few micrometers. On the other hand, when the fixed electrodes E21, E22 are constructed by a conductive plate (metal plate) projecting from the left side surface of the right side support body 20, it is preferable to secure their thickness on the order of a few millimeters in order to secure strength in practical use. Therefore, in FIG. 13 etc., for the sake of convenience, the thickness of the displacement electrodes and the thickness of the fixed electrodes are drawn with the same dimension, but the actual thickness dimensions of these electrodes need to be respectively set to appropriate values in consideration of the manufacturing process and the strength in practical use.

Figure 14:
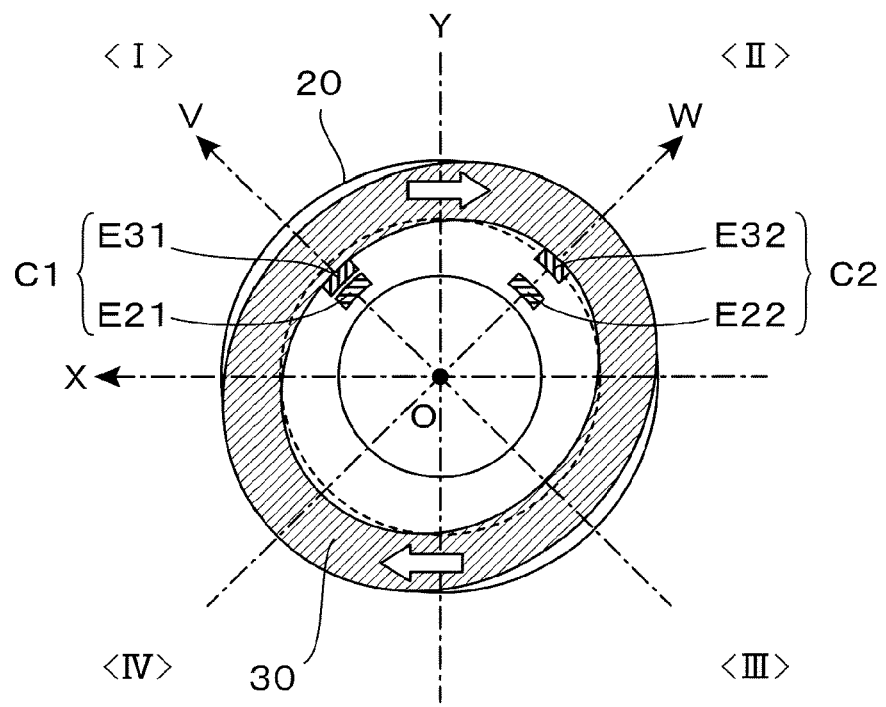
FIG. 14 is a sectional view showing a state when forward torque about the Z-axis is exerted on the basic structural section shown in FIG. 13 (the broken line shows a state before deformation).

FIG. 14 is an XY sectional view showing a state when forward torque about the Z-axis is exerted on the basic structural section shown in FIG. 13. As described in Section 2, when such torque is exerted, the annular deformation body 30 is deformed into an elliptical shape, and the V-axis is in a short-axis direction of the ellipse, and the W-axis is in a long-axis direction of the ellipse. As a result, the electrode interval between the pair of electrodes E21, E31 disposed on the V-axis is reduced, and the electrode interval between the pair of electrodes E22, E32 disposed on the W-axis is increased. Therefore, preparing a capacitive element C1 composed of the pair of electrodes E21, E31 and a capacitive element C2 composed of the pair of electrodes E22, E32 allows detection of the direction and magnitude of the exerted torque as the amount of fluctuations in the capacitance value of the capacitive elements C1, C2.

For example, when focusing on fluctuations in the capacitance value of the capacitive element C1 composed of the electrodes E21, E31 with reference to the unloaded state (state where no torque is exerted) shown in FIG. 13, the electrode interval is reduced as a result of forward torque about the Z-axis being exerted as shown in FIG. 14, so that the capacitance value increases, and the electrode interval is increased as a result of reverse torque about the Z-axis being exerted conversely, so that the capacitance value decreases. Therefore, an increasing fluctuation in capacitance value indicates that forward torque about the Z-axis is being exerted, and a decreasing fluctuation in capacitance value indicates that reverse torque about the Z-axis is being exerted. Of course, the absolute value of the amount of fluctuation indicates the magnitude of the exerted torque.

Similarly, when focusing on fluctuations in the capacitance value of the capacitive element C2 composed of the electrodes E22, E32, the electrode interval is increased as a result of forward torque about the Z-axis being exerted as shown in FIG. 14, so that the capacitance value decreases, and the electrode interval is reduced as a result of reverse torque about the Z-axis being exerted conversely, so that the capacitance value increases. Therefore, a decreasing fluctuation in capacitance value indicates that forward torque about the Z-axis is being exerted, and an increasing fluctuation in capacitance value indicates that a reverse torque about the Z-axis is being exerted. Of course, the absolute value of the amount of fluctuation indicates the magnitude of the exerted torque.

Consequently, either by use of the capacitive element C1 or by use of the capacitive element C2, torque about the Z-axis can be detected, and theoretically, it is sufficient to use only either one of the capacitive elements. However, practically, it is preferable to perform detection using both of the capacitive elements C1, C2. That is, if the capacitive elements C1, C2 are provided at a short-axis position (on the V-axis) and a long-axis position (on the W-axis) of an ellipse when the annular deformation body 30 is deformed, respectively, when the same torque is applied, the capacitance value increases as a result of a reduction in electrode interval at the short-axis position (on the V-axis), while the capacitance value decreases as a result of an increase in electrode interval at the long-axis position (on the W-axis), and thus the exerted torque can be detected as a difference of both capacitance values C1, C2. Such difference detection is effective for stable torque detection in which common-mode noise and zero-point drift are suppressed, and contributes to canceling out the effect of expansion of the respective portions due to temperature to obtain a highly accurate detection value.

In order to perform such difference detection, in short, it suffices to provide a first displacement electrode E31 fixed to, out of the respective parts of the annular deformation body 30, a first part (in this example, an intersecting part with the V-axis) that is displaced in a direction to approach the rotation axis when torque in a predetermined rotating direction is exerted, a second displacement electrode E32 fixed to a second part (in this example, an intersecting part with the W-axis) that is displaced in a direction to separate from the rotation axis, a first fixed electrode E21 disposed at a position opposed to the first displacement electrode E31, and the second fixed electrode E22 disposed at a position opposed to the second displacement electrode E32.

Further, as a detector circuit for performing such difference detection, it suffices to provide a circuit that outputs an electrical signal corresponding to a difference between the capacitance value of a first capacitive element C1 composed of the first displacement electrode E31 and the first fixed electrode E21 and the capacitance value of a second capacitive element C2 composed of the second displacement electrode E32 and the second fixed electrode E22 as an electrical signal indicating exerted torque.

Figure 15:
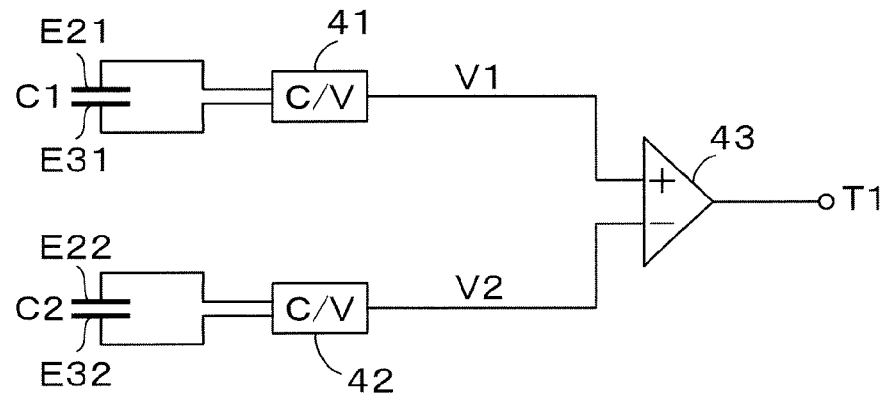
FIG. 15 is a circuit diagram showing an example of a detector circuit to be used for the torque sensor according to the basic embodiment of the present invention.

FIG. 15 is a circuit diagram showing an example of a detector circuit having a function of performing such difference detection. Reference symbols E21, E31, E22, E32 shown in the circuit diagram denote the electrodes shown in FIG. 13 and FIG. 14, and reference symbols C1, C2 denote capacitive elements composed of these electrodes. C/V converter circuits 41, 42 are circuits for converting the capacitance values of the capacitive elements C1, C2 to voltage values V1, V2, respectively, and the converted voltage values V1, V2 are values corresponding to the capacitance values, respectively. Difference operation unit 43 has a function of determining a difference "V1-V2" in voltage value and outputting the difference to an output terminal T1.

In the example shown in FIG. 13, by constructing the displacement electrodes E31, E32 by the same shape and sized electrodes, constructing the fixed electrodes E21, E22 by the same shape and sized electrodes, and setting the electrodes so that the positional relationship of the electrodes E31, E21 with respect to the V-axis becomes the same as the positional relationship of the electrodes E32, E22 with respect to the W-axis, the capacitance values of the capacitive elements C1, C2 are equalized in the unloaded state shown FIG. 13. Therefore, the voltage value to be output from the detector circuit shown in FIG. 15 to the output terminal T1 is 0.

In contrast thereto, when forward torque about the Z-axis is exerted as in the example shown in FIG. 14, the capacitive element C1 has a larger capacitance value and the capacitive element C2 has a smaller capacitance value, so that the voltage value to be output from the detector circuit shown in FIG. 15 to the output terminal T1 takes a positive value, and the greater the torque, the larger the absolute value thereof. Conversely, when reverse torque about the Z-axis is exerted, the capacitive element C1 has a smaller capacitance value and the capacitive element C2 has a larger capacitance value, so that the voltage value to be output from the detector circuit shown in FIG. 15 to the output terminal T1 takes a negative value, and the greater the torque, the larger the absolute value thereof. Thus, at the output terminal T1, torque detection values including signs are obtained.

In the embodiment shown here, the fixed electrode E21, E22 are fixed to the right side support body 20, but fixed electrodes may be fixed to the left side support body 10. For example, in the case of the example shown in FIG. 12, the fixed electrode E21 is constructed by a conductive plate projecting to the left side from the left side surface of the right side support body 20, but the fixed electrode E21 may be constructed by a conductive plate projecting to the right side from the right side surface of the left side support body 10. In short, it suffices that the fixed electrode E21 is provided so as to be maintained at a fixed position opposed to the displacement electrode E31 irrespective of deformation of the annular deformation body 30.

Moreover, in the embodiment shown here, the displacement electrodes E31, E32 are fixed to the inner peripheral surface of the annular deformation body 30, but displacement electrodes may be fixed to the outer peripheral surface of the annular deformation body 30. As is apparent with reference to FIG. 14, displacement is produced when the annular deformation body 30 is deformed into an ellipse not only at the inner peripheral surface of the annular deformation body 30, but displacement is produced also at the outer peripheral surface as well. Therefore, displacement electrodes may be formed on the outer peripheral surface of the annular deformation body 30. In this case, it suffices to dispose fixed electrodes to be opposed to the displacement electrodes further outside the displacement electrodes. However, adopting a structure of disposing the electrodes outside the annular deformation body 30 results in a large overall size of the sensor, and easily causes damage to the electrode parts, and thus, practically, it is preferable to provide displacement electrodes on the inner peripheral surface of the annular deformation body 30, as in the embodiment described so far.

Consequently, the torque sensor according to the present invention is a sensor that is constructed by adding, to the basic structural section (left side support body 10, right side support body 20, annular deformation body 30) described in Section 1, a displacement electrode that is fixed to the inner peripheral surface or outer peripheral surface of the annular deformation body 30 and produces displacement caused by elastic deformation of the annular deformation body 30, a fixed electrode that is disposed at a position opposed to the displacement electrode and fixed to the left side support body 10 or the right side support body 20, and a detector circuit for outputting an electrical signal indicating torque about the rotation axis exerted on the left side support body 10 with the right side support body 20 loaded, based on the amount of fluctuation in the capacitance value of a capacitive element composed of the displacement electrode and fixed electrode.

Because a capacitive element can be constructed by only providing a pair of electrodes of a displacement electrode and a fixed electrode, the structure of the torque sensor as a whole is simplified, which can contribute to a reduction in cost. Moreover, the C/V converter circuits 41, 42 and the difference operation unit 43 are of a simple circuit known for a long time, and can be realized at a low cost.

Although there may be one each of the displacement and fixed electrodes, but practically, in order to allow performing detection at a higher accuracy, it is preferable to provide a first displacement electrode E31 and a first fixed electrode E21 disposed on the V-axis and a second displacement electrode E32 and a second fixed electrode E22 disposed on the W-axis so that the detector circuit outputs an electrical signal corresponding to a difference between the capacitance value of the first capacitive element C1 composed of the first displacement electrode E31 and the first fixed electrode E21 and the capacitance value of the second capacitive element C2 composed of the second displacement electrode E32 and the second fixed electrode E22 as an electrical signal indicating exerted torque. In this case, when the capacitive elements C1, C2 are different in detection sensitivity, it suffices to perform correction of multiplying by a predetermined coefficient.

<<<Section 4. Modification in which Electrodes are Disposed Offset>>>

In Section 3, description has been given of a basic principle for detecting the deformed state shown in FIG. 14, to which the sensor in an unloaded state shown in FIG. 13 transits when forward torque about the Z-axis is exerted thereon, based on fluctuations in the capacitance value of the pair of capacitive elements C1, C2. However, FIG. 14 is a figure drawn, for convenience of description, without taking into consideration displacement with respect to the rotating direction of the displacement electrodes E31, E32. In actuality, the position of the displacement electrodes E31, E32 is slightly shifted clockwise to cause offset.

Figure 16:
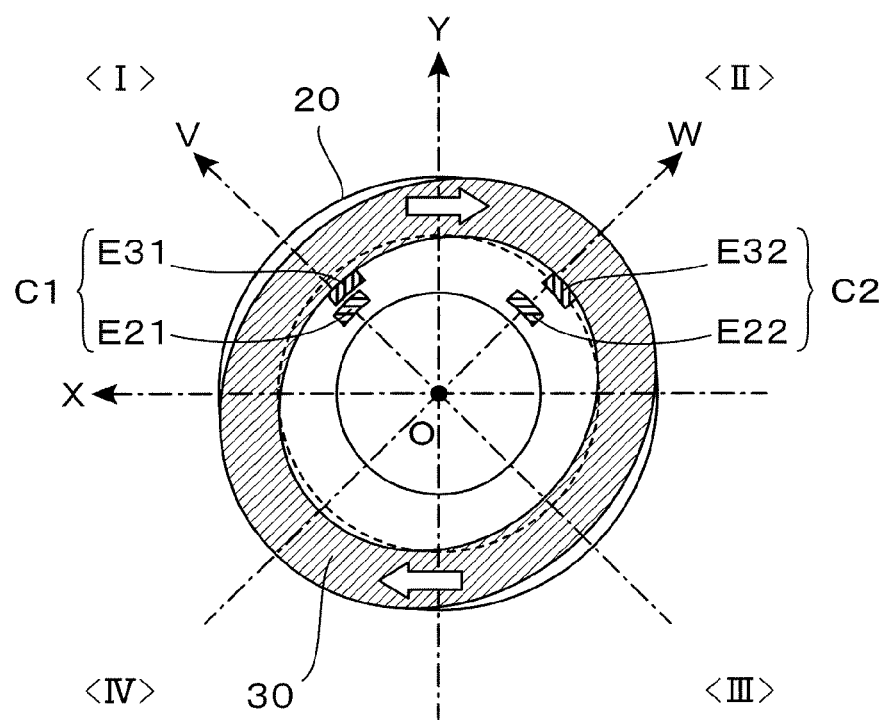
FIG. 16 is a sectional view showing a shift in a rotating direction of the displacement electrodes drawn in an emphasized manner when forward torque about the Z-axis is exerted on the basic structural section shown in FIG. 13 (the broken line shows a state before deformation).

FIG. 16 is a sectional view showing a shift in a rotating direction of the displacement electrodes E31, E32 drawn in an emphasized manner. As described in Section 3, when forward torque about the Z-axis is exerted, the annular deformation body 30 is elliptically deformed, so that the electrode interval between the pair of electrodes E21, E31 disposed on the V-axis is reduced, and the electrode interval between the pair of electrodes E22, E32 disposed on the W-axis is increased. However, in actuality, to the annular deformation body 30, a force to rotate the same clockwise is applied as shown by the outlined arrows in the figure, so that the displacement electrodes E31, E32 fixedly fitted to the inner peripheral surface of the annular deformation body 30 slightly move in the clockwise direction in the figure In FIG. 16, for convenience of description, the displacement electrodes E31, E32 are shown with a considerably large amount of offset in the rotating direction, but in actuality, if a material having a certain level of high rigidity, such as plastic or metal, is used as the annular deformation body 30, the offset amount in the rotating direction of the displacement electrodes is not so large as in the figure.

Consequently, in the deformed state as shown in FIG. 16, it can be understood in terms of the positional relationship of the pair of electrodes E21, E31 disposed on the V-axis that the electrode interval therebetween is reduced, and the position of the displacement electrode E31 is slightly shifted clockwise, so that the effective opposing area is reduced. Likewise, it can be understood in terms of the positional relationship of the pair of electrodes E22, E32 disposed on the W-axis that the electrode interval therebetween is increased, and the position of the displacement electrode E32 is slightly shifted clockwise, so that the effective opposing area is reduced.

Here, when changes in the capacitance value of a capacitive element composed of a pair of opposed electrodes are studied, the capacitance value of the capacitive element C1 composed of the electrodes E21, E31 increases because of a factor of a reduction in electrode interval, but decreases because of a factor of a reduction in effective opposing area. On the other hand, the capacitance value of the capacitive element C2 composed of the electrodes E22, E32 decreases because of a factor of an increase in electrode interval, and further decreases because of a factor of a reduction in effective opposing area.

Thus, the capacitance values of the capacitive elements C1, C2 change under the influence of both of the change factor in electrode interval and the change factor in effective opposing area. Here, in the mode of change shown in FIG. 16, with regard to the capacitive element C2, a sensitivity-enhancing effect is obtained, in which both of the change factor in electrode interval and the change factor in effective opposing area act toward decreasing the capacitance value. However, with regard to the capacitive element C1, the change factor in electrode interval acts toward increasing the capacitance value, while the change factor in effective opposing area conversely acts toward decreasing the capacitance value, so that both change factors act in opposite ways to each other, and the sensitivity is accordingly reduced. Moreover, when reverse torque about the Z-axis is exerted contrary to the mode of change shown in FIG. 16, with regard to the capacitive element C1, a sensitivity-enhancing effect is obtained, but with regard to the capacitive element C2, the sensitivity is reduced.

As in the foregoing, using a material having high rigidity as the annular deformation body 30 allows suppressing the torsion angle of the annular deformation body 30 relatively small in a state where torque is exerted, and the offset amount of the displacement electrode relative to the fixed electrode can be suppressed small. However, it is certain that the offset produced in the positional relationship of both electrodes has an adverse effect of reducing detection sensitivity.

Therefore, in this Section 4, description will be given of a device to cope with a reduction in detection sensitivity caused by a change in the effective opposing area of a pair of electrodes composing a capacitive element. The device has a basic concept of disposing in advance one of the electrodes with offset in a predetermined direction in an unloaded state where no torque is exerted. Such a device can prevent an adverse effect from being exerted on the detection result due to variation in effective area of the capacitive element when torque is exerted.

Figure 17:
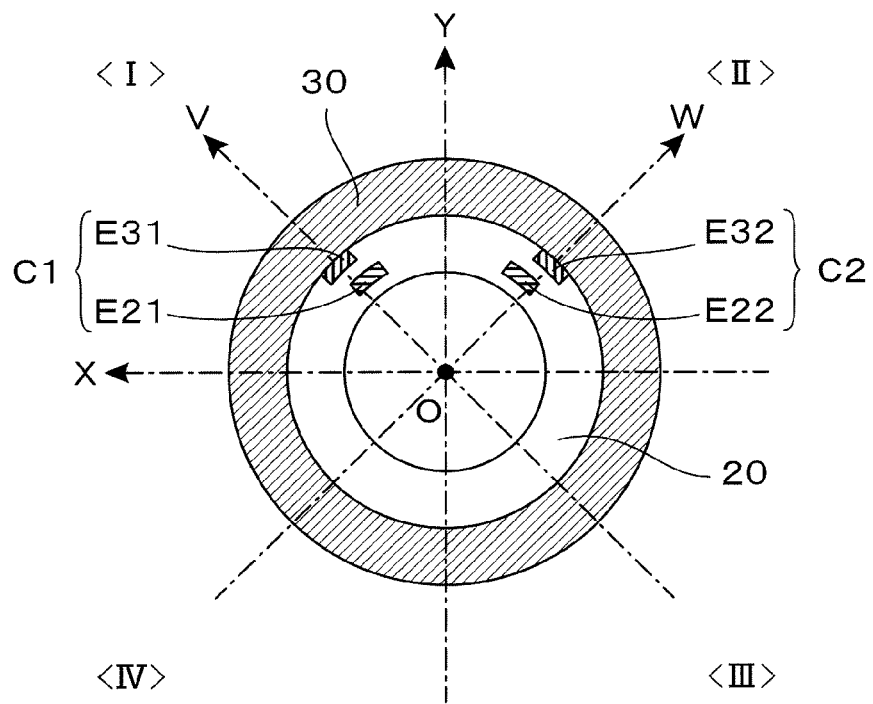
FIG. 17 is a sectional view along an XY plane showing a torque sensor according to a modification for which fixed electrodes are disposed offset.

Specifically, it suffices to adopt an electrode arrangement such that, for example, as shown in FIG. 17, in an unloaded state where no torque is exerted, the position of the first fixed electrode E21 is shifted by a predetermined offset amount in a predetermined rotating direction (in this example, the clockwise direction in the figure) relative to the position of the first displacement electrode E31, and the position of the second fixed electrode E22 is shifted by a predetermined offset amount in a direction opposite to the predetermined rotating direction (in this example, the counterclockwise direction in the figure) relative to the position of the second displacement electrode E32.

Figure 18:
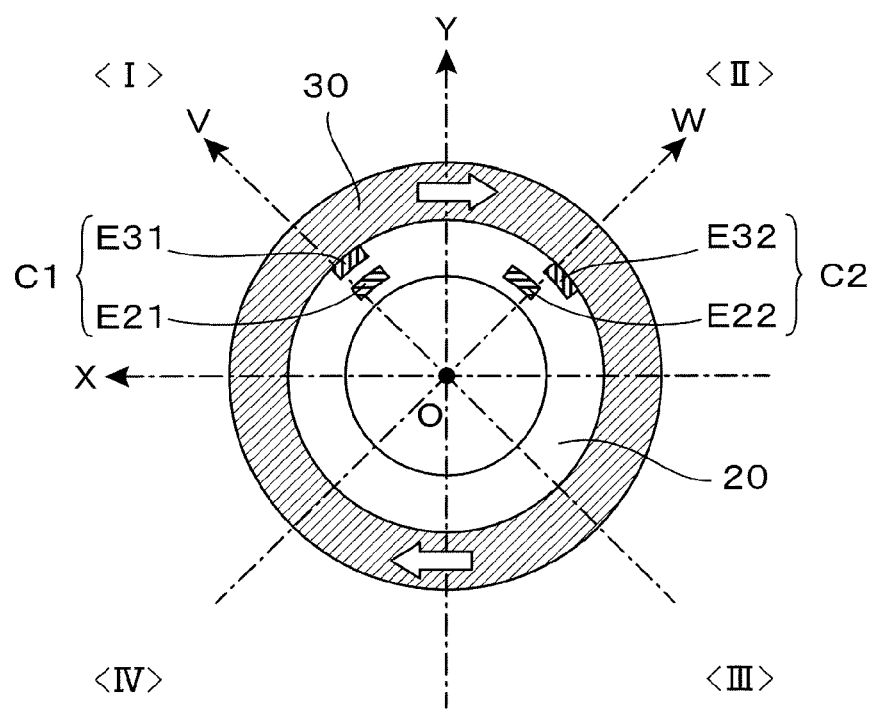
FIG. 18 is a sectional view showing a positional relationship of the electrodes when the annular deformation body 30 is slightly rotated clockwise with regard to the torque sensor shown in FIG. 17.

FIG. 18 is a sectional view showing a positional relationship of the electrodes when the annular deformation body 30 is slightly rotated clockwise with regard to the torque sensor shown in FIG. 17. In actuality, when forward torque about the Z-axis is exerted, the annular deformation body 30 is deformed into an elliptical shape, but in FIG. 18, the annular deformation body 30 is drawn maintained in a circular shape in order to show changes in the positional relationship with regard to the rotating direction of the electrodes (it may be considered to be a state where the projecting portions 21, 22 of the right side support body 20 are not joined to the annular deformation body 30, and the annular deformation body 30 has slipped clockwise).

Here, it can be understood in terms of the positional relationship of the pair of electrodes E21, E31 disposed on the V-axis that, as compared with the state shown in FIG. 17, the position of the displacement electrode E31 is slightly shifted clockwise in the state shown in FIG. 18, so that the effective opposing area is increased. On the other hand, it can be understood in terms of the positional relationship of the pair of electrodes E22, E32 disposed on the W-axis that, as compared with the state shown in FIG. 17, the position of the displacement electrode E32 is slightly shifted clockwise in the state shown in FIG. 18, so that the effective opposing area is reduced. Consequently, when only the factor of a change in effective opposing area is considered, the capacitance value of the capacitive element C1 increases and the capacitance value of the capacitive element C2 decreases as a result of the transition from the state shown in FIG. 17 into the state shown in FIG. 18.

On the other hand, when only the factor of a change in electrode interval is considered, as already described in Section 3, the capacitance value of the capacitive element C1 increases and the capacitance value of the capacitive element C2 decreases as a result of the transition from the state shown in FIG. 13 into the state shown in FIG. 14. In actuality, when forward torque about the Z-axis is exerted on the torque sensor shown in FIG. 17, it results not in the state shown in FIG. 18, but in a state for which elliptical deformation of the annular deformation body 30 is added to the state shown in FIG. 18, and thus the capacitance values of the capacitive elements C1, C2 change under the influence of two factors, the factor of a change in effective opposing area and the factor of a change in electrode interval.

Even in that case, if an offset arrangement as exemplified in FIG. 17 is adopted, both change factors always act in the same way as each other, and an effect of increasing sensitivity is obtained accordingly. For example, with regard to the capacitive element C1, when forward torque about the Z-axis is exerted, the factor of a change in electrode interval causes an effect that, as shown in FIG. 14, the capacitance value increases as a result of a reduction in electrode interval, and the factor of a change in effective opposing area causes an effect that, as shown in FIG. 18, the capacitance value also increases as a result of an increase in effective opposing area. That is, both change factors act in the direction of increasing the capacitance value.

On the other hand, with regard to the capacitive element C2, when forward torque about the Z-axis is exerted, the factor of a change in electrode interval causes an effect that, as shown in FIG. 14, the capacitance value decreases as a result of an increase in electrode interval, and the factor of a change in effective opposing area causes an effect that, as shown in FIG. 18, the capacitance value also decreases as a result of a reduction in effective opposing area. That is, both change factors act toward decreasing the capacitance value.

Moreover, when reverse torque about the Z-axis is exerted, with regard to the capacitive element C1, an effect that the capacitance value decreases as a result of an increase in electrode interval is caused, and an effect that the capacitance value also decreases as a result of a reduction in effective opposing area is caused. Likewise, with regard to the capacitive element C2, an effect that the capacitance value increases as a result of a reduction in electrode interval is caused, and an effect that the capacitance value also increases as a result of an increase in effective opposing area is caused.

Thus, if an offset arrangement as exemplified in FIG. 17 is adopted in an unloaded state, a change in capacitance value based on the factor of a change in electrode interval and a change in capacitance value based on the factor of a change in effective opposing area always act in the same way, so that an effect of always enhancing detection sensitivity is obtained.

In short, in the case of performing torque detection by using both of a first capacitive element disposed at a position where the electrode interval is reduced and a second capacitive element disposed at a position where the electrode interval is increased when torque in a predetermined rotating direction is exerted, it suffices to dispose in advance with offset the displacement electrode and fixed electrode opposed to each other in an unloaded state where no torque is exerted so that the effective opposing area of the pair of electrodes composing the first capacitive element is increased and the effective opposing area of the pair of electrodes composing the second capacitive element is reduced when the torque is exerted.

<<<Section 5. Modification using Four Capacitive Elements>>>

In Section 3, description has been given of an example using a basic structural section in which the circular annular-shaped annular deformation body 30 is deformed into an elliptical shape by exertion of torque, a V-axis and a W-axis are defined in the short-axis direction and long-axis direction of the ellipse, respectively, and capacitive elements are provided one each at each of the positions of the V-axis and W-axis to detect torque. Here, a modification in which detection accuracy is further improved by using a total of four capacitive elements will be described.

Similar to the embodiment described in Section 3, the torque sensor to be described in Section 5 also uses the basic structural section shown in FIG. 2. There is a difference from the embodiment described in Section 3 in that a total of four capacitive elements are used, and the detector circuit performs torque detection based on capacitance values of the four capacitive elements.

Figure 19:
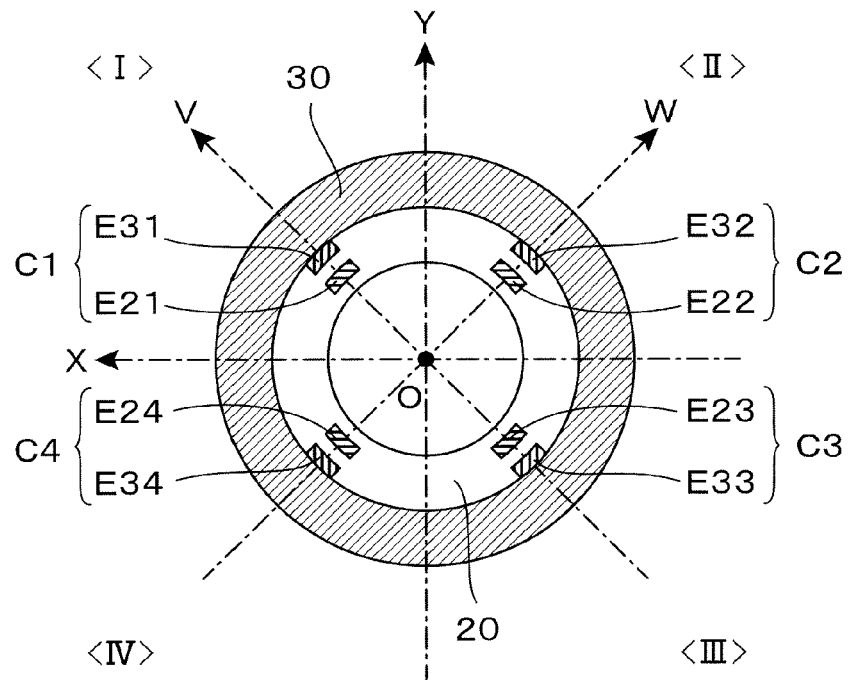
FIG. 19 is a sectional view along an XY plane of a torque sensor according to a modification using four capacitive elements.

FIG. 19 is a sectional view along an XY plane of the torque sensor according to a modification using four capacitive elements. As compared with the basic embodiment shown in FIG. 13, it can be understood that two displacement electrodes E33, E34 and two fixed electrodes E23, E24 are newly added. That is, on a positive V-axis, a first displacement electrode E31 and a first fixed electrode E21 are disposed, on a positive W-axis, a second displacement electrode E32 and a second fixed electrode E22 are disposed, on a negative V-axis, a third displacement electrode E33 and a third fixed electrode E23 are disposed, and on a negative W-axis, a fourth displacement electrode E34 and a fourth fixed electrode E24 are disposed.

Of course, the displacement electrodes E31 to E34 are all fixed to the inner peripheral surface of the annular deformation body 30, and the fixed electrodes E21 to E24 are fixed at their end portions to the right side support body 20 (may be the left side support body 10) so as to be located at positions opposed to the displacement electrodes E31 to E34, respectively.

Consequently, of an XY coordinate system, in the first quadrant I, a first capacitive element C1 composed of the first displacement electrode E31 and the first fixed electrode E21 is disposed, in the second quadrant II, a second capacitive element C2 composed of the second displacement electrode E32 and the second fixed electrode E22 is disposed, in the third quadrant III, a third capacitive element C3 composed of the third displacement electrode E33 and the third fixed electrode E23 is disposed, and in the fourth quadrant IV, a fourth capacitive element C4 composed of the fourth displacement electrode E34 and the fourth fixed electrode E24 is disposed.

Figure 20:
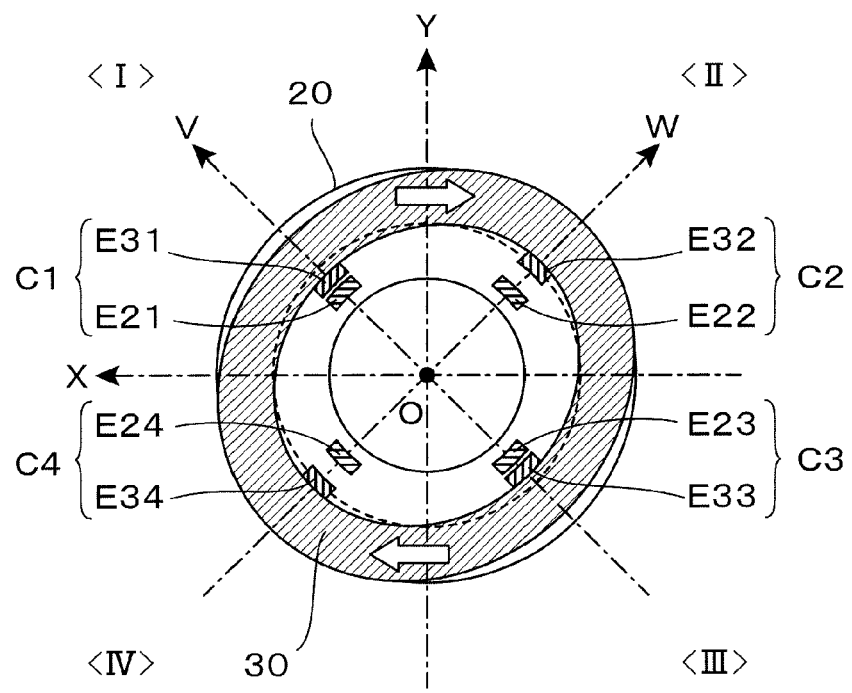
FIG. 20 is a sectional view showing a state when forward torque about the Z-axis is exerted with regard to the torque sensor shown in FIG. 19 (the broken line shows a state before deformation).

Here, regarding torque detection based on the foregoing basic principle, behavior of the third capacitive element C3 is the same as that of the first capacitive element C1, and behavior of the fourth capacitive element C4 is the same as that of the second capacitive element C2. For example, when forward torque about the Z-axis is exerted on the sensor in an unloaded state shown in FIG. 19, it transits into a deformed state shown in FIG. 20, and the capacitance values of the capacitive elements C1, C3 increase because the electrode interval thereof is reduced, and the capacitance values of the capacitive elements C2, C4 decrease because the electrode interval thereof is increased. A phenomenon opposite to this occurs when reverse torque about the Z-axis is exerted.

Figure 21:
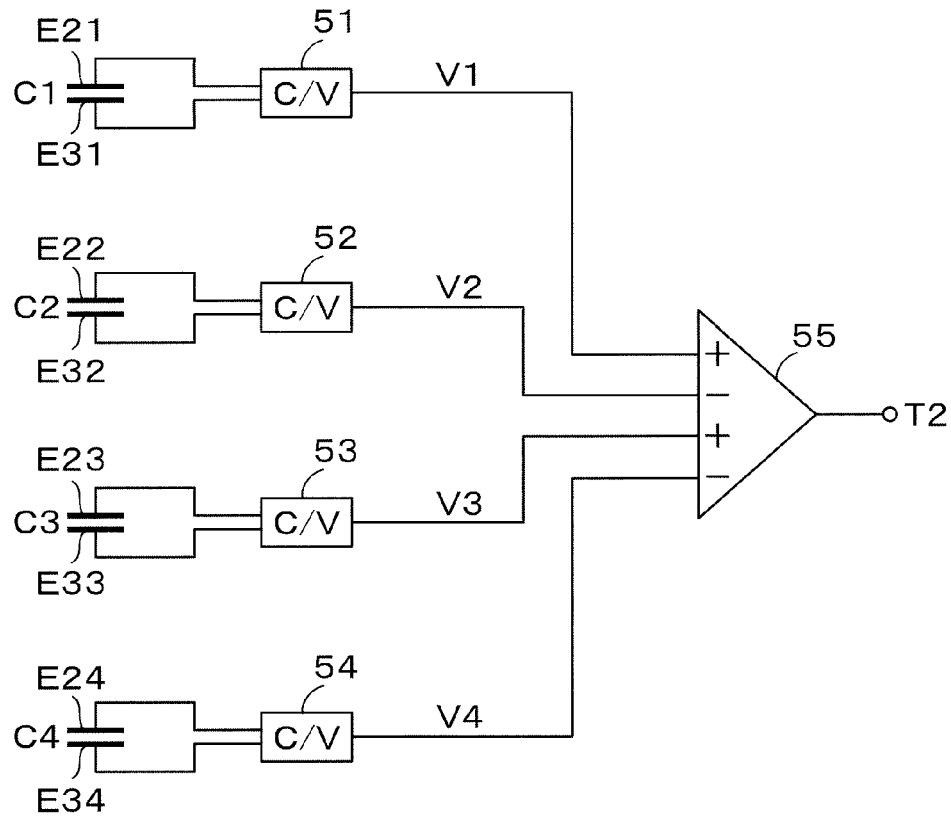
FIG. 21 is a circuit diagram showing an example of a detector circuit to be used for the torque sensor shown in FIG. 19.

Therefore, in the case of this modification, torque about the Z-axis can be detected by using a detector circuit as shown in the circuit diagram of FIG. 21. Reference symbols E21 to E34 shown in the circuit diagram denote the electrodes shown in FIG. 19 and FIG. 20, and reference symbols C1 to C4 denote capacitive elements composed of these electrodes. C/V converter circuits 51 to 54 are circuits for converting the capacitance values of the capacitive elements C1 to C4 to voltage values V1 to V4, respectively, and the converted voltage values V1 to V4 are values corresponding to the capacitance values, respectively. An operation unit 55 has a function of carrying out an operation of "V1-V2+V3-V4" and outputting the result to an output terminal T2. Said operation corresponds to an operation to determine a difference between a sum of the voltage values "V1+V3" and a sum of the voltage values "V2+V4."

Consequently, the detector circuit shown in FIG. 21 has a function of outputting an electrical signal corresponding to a difference between "a sum of the capacitance value of the first capacitive element C1 composed of the first displacement electrode E31 and the first fixed electrode E21 and the capacitance value of the third capacitive element C3 composed of the third displacement electrode E33 and the third fixed electrode E23" and "a sum of the capacitance value of the second capacitive element C2 composed of the second displacement electrode E32 and the second fixed electrode E22 and the capacitance value of the fourth capacitive element C4 composed of the fourth displacement electrode E34 and the fourth fixed electrode E24" as an electrical signal indicating exerted torque.

Thus, providing a total of four capacitive elements on both positive and negative sides of the V-axis and W-axis allows difference detection using two capacitive elements whose capacitance values increase and two capacitive elements whose capacitance values decrease, and the detection accuracy is further improved.

Of course, also for the modification using four capacitive elements, by performing the offset arrangement of electrodes described in Section 4, a reduction in detection sensitivity based on the factor of a change in the effective opposing area of the capacitive element can be prevented. That is, when an outline of an orthogonal projection image of the annular deformation body 30 onto the XY plane changes from a circle to an ellipse due to exertion of torque in a predetermined rotating direction, it suffices to adopt a configuration of setting a V-axis in the short-axis direction of the ellipse, and a W-axis, in the long-axis direction, and disposing the capacitive elements C1 to C4 on both positive and negative sides of the V-axis and W-axis, respectively, so that in a state where no torque is exerted, the position of the first fixed electrode E21 is shifted by a predetermined offset amount in the predetermined rotating direction relative to the position of the first displacement electrode E31, the position of the second fixed electrode E22 is shifted by a predetermined offset amount in a direction opposite to the predetermined rotating direction relative to the position of the second displacement electrode E32, the position of the third fixed electrode E23 is shifted by a predetermined offset amount in the predetermined rotating direction relative to the position of the third displacement electrode E33, and the position of the fourth fixed electrode E24 is shifted by a predetermined offset amount in a direction opposite to the predetermined rotating direction relative to the position of the fourth displacement electrode E34.

<<<Section 6. Modification in which Effective Area of Capacitive Element is Maintained Constant>>>

In Section 4, it has been described that, when torque is exerted, the displacement electrode is slightly shifted in the rotating direction, so that a phenomenon that offset occurs between a pair of opposed displacement and fixed electrodes to change the effective area of the capacitive element occurs, and described that consequently, a reduction in detection sensitivity is brought about. Then, description has been given, as a device to prevent such a reduction in sensitivity, of the method in which electrodes are in advance disposed offset in an unloaded state. Here, description will be given of a device to prevent a change in the effective area of a capacitive element from occurring even when the displacement electrode is slightly shifted in the rotating direction, that is, even when the relative position of the displacement electrode to the fixed electrode changes.

Figure 22A:
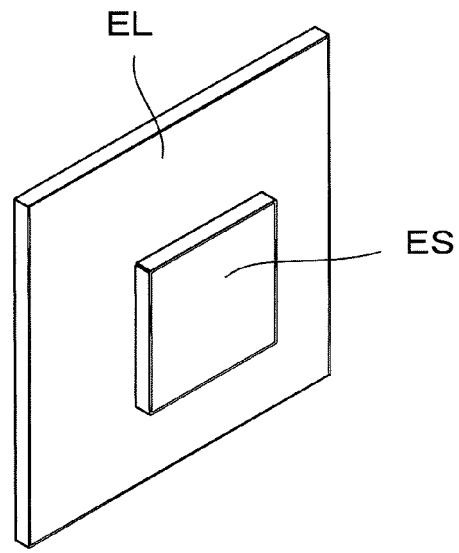
FIGS. 22A and 22B are views showing a principle for maintaining the effective area of a capacitive element constant even when the relative position of a displacement electrode to a fixed electrode changes.
Figure 22B:
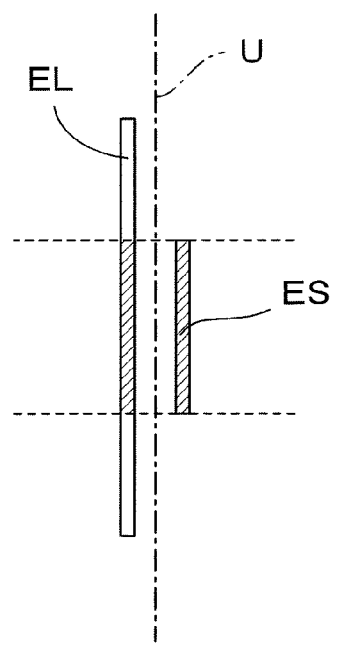

FIGS. 22A and 22B are views showing a principle for maintaining the effective area of a capacitive element constant even when the relative position of a displacement electrode to a fixed electrode changes. Now, a case for which, as shown in FIG. 22A, a pair of electrodes EL, ES are disposed so as to be opposed to each other is considered. Both electrodes EL, ES are disposed so as to be parallel to each other at a predetermined interval, and compose a capacitive element. However, the electrode EL is larger in area than the electrode ES, and when an orthogonal projection image is formed by projecting an outline of the electrode ES on the surface of the electrode EL, the projection image of the electrode ES is completely contained in the surface of the electrode EL. In this case, the effective area of the capacitive element is the area of the electrode ES.

FIG. 22B is a side view of the pair of electrodes EL, ES shown in FIG. 22A. The regions with hatching in the figure are parts that fulfill a function as a substantial capacitive element. The effective area of the capacitive element is the area of the electrode with hatching (that is, the area of the electrode ES).

Now, a vertical plane U as shown by the alternate long and short dashed line in the figure is considered. The electrodes EL, ES are both disposed so as to be parallel to the vertical plane U. Here, if the electrode ES is moved vertically upward along the vertical plane U, an opposing part on the side of the electrode EL moves upward, but the opposing part does not change in area. Even if the electrode ES is either moved downward or moved in the far-side direction or near-side direction of the sheet plane, an opposing part on the side of the electrode EL still does not change in area.

In short, if it is a state where an orthogonal projection image of the electrode ES formed on the surface of the electrode EL is completely contained in the surface of the electrode EL (that is, a state where the orthogonal projection image does not stick out even in part), the effective area of the capacitive element is always coincident with the area of the electrode ES. That is, the effective area of the capacitive element is maintained constant irrespective of movement of the electrode ES. The same applies to a case where the electrode EL is moved.

Therefore, by setting the area of one of the fixed electrode and displacement electrode larger than that of the other so that the effective opposing area of the pair of electrodes composing a capacitive element does not change even when the relative position of the displacement electrode to the fixed electrode changes as a result of exertion of torque in a predetermined rotating direction, the effective area of the capacitive element is maintained constant even when torque is exerted. More strictly, when an orthogonal projection image is formed by projecting an outline of the electrode ES having a smaller area on the surface of the electrode EL having a larger area, as long as a state where the projection image of the electrode ES is completely contained in the surface of the electrode EL is maintained, the effective area of a capacitive element composed of both electrodes is equal to the area of the electrode ES, and is always constant.

Figure 23:
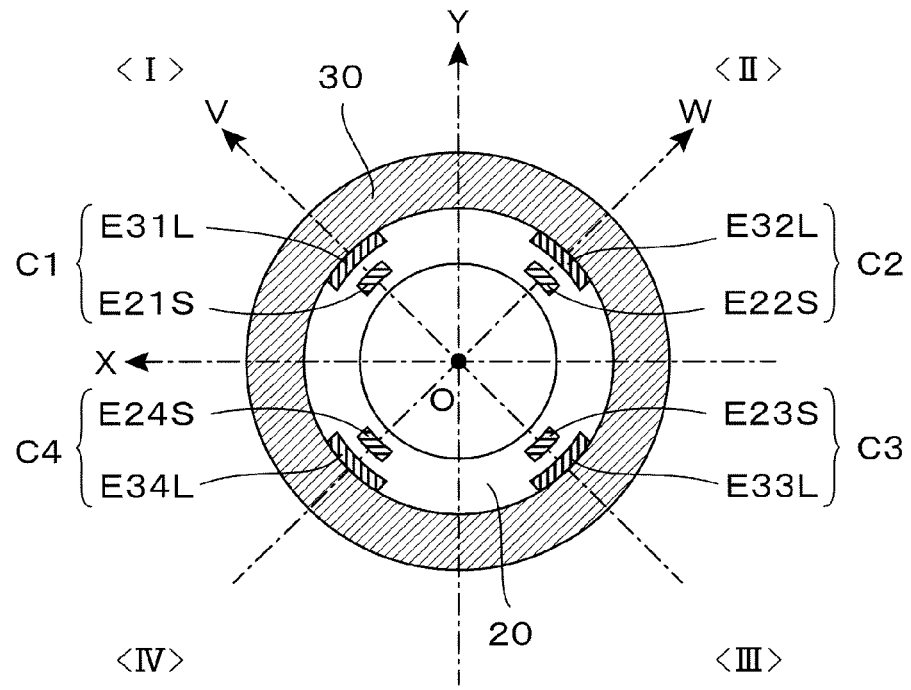
FIG. 23 is a sectional view along an XY plane showing a modification for which the principle shown in FIG. 22 is applied to the torque sensor shown in FIG. 19.

FIG. 23 is a sectional view along an XY plane showing a modification for which the principle shown in FIG. 22 is applied to the torque sensor shown in FIG. 19 described in Section 5. There is only a difference from the sensor shown in FIG. 19 in that the four displacement electrodes E31 to E34 are replaced by displacement electrodes E31L to E34L having larger areas, and the four fixed electrodes E21 to E24 are replaced by fixed electrodes E21S to E24S having smaller areas. As is apparent with reference to FIG. 23, when the widths of the electrodes with regard to the circumferential direction are compared in the sectional view along an XY plane, the width of the displacement electrodes E31L to E34L is always wider than the width of the fixed electrodes E21S to E24S.

Figure 24:
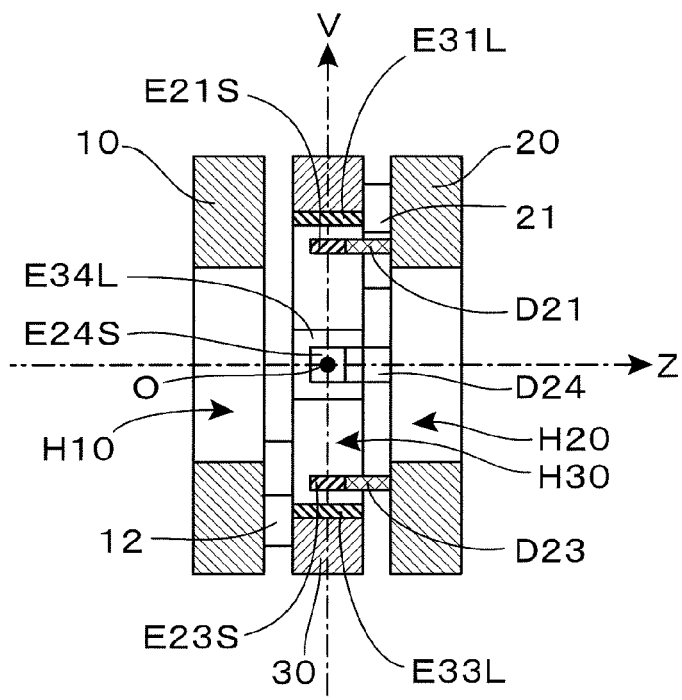
FIG. 24 is a side sectional view taken along a VZ plane of the torque sensor shown in FIG. 23 (the upside of FIG. 24 is a V-axis direction shown in FIG. 23).

FIG. 24 is a side sectional view taken along a VZ plane of the torque sensor shown in FIG. 23. The upside of FIG. 24 is not the Y-axis direction, but the V-axis direction shown in FIG. 23. Near the origin O in the figure, a positional relationship between the displacement electrode E34L and the fixed electrode E24S is clearly shown. In this example, the fixed electrode E24S is fixed to the right side support body 20 via an insulating plate D24. A part to serve as an electrode of a component of the capacitive element C4 is only the part of the fixed electrode E24S disposed near the origin O, and the insulating plate D24 only serves as a mere base for supporting the fixed electrode E24S.

Similarly, in the upper side of FIG. 24, a positional relationship between the displacement electrode E31L and the fixed electrode E21S is clearly shown. Also here, the insulating plate D21 serves as a base for supporting the fixed electrode E21S. Moreover, in the lower side of FIG. 24, a positional relationship between the displacement electrode E33L and the fixed electrode E23S is clearly shown. Also here, the insulating plate D23 serves as a base for supporting the fixed electrode E23S.

Consequently, in the case of this example, even if the displacement electrodes E31L to E34L are either displaced in the circumferential direction in FIG. 23 or displaced in the Z-axis direction in FIG. 24, as long as the amount of displacement does not exceed a predetermined allowable range (that is, as long as a projection image of the fixed electrode does not stick out of the surface of the displacement electrode), the effective area of the capacitive elements C1 to C4 is maintained constant. Therefore, fluctuations in the capacitance value of the capacitive elements C1 to C4 are caused solely by the factor of a change in electrode interval, and fluctuations in capacitance value caused by the factor of a change in effective opposing area do not occur. This means that a reduction in detection sensitivity due to the reason described in Section 4 does not occur.

In addition, the example shown in FIG. 23 has an additional feature that, even when extra force components (hereinafter, referred to as disturbance components) other than torque to be detected are exerted, accurate torque detection free from the influence of the disturbance components can be performed, which is practically very useful. In the following, the additional feature will be described in detail.

Generally, a force to be exerted on an XYZ three-dimensional coordinate system is divided into force components to be exerted in the respective coordinate axis directions of a force Fx in the X-axis direction, a force Fy in the Y-axis direction, and a force Fz in the Z-axis direction and moment components to be exerted about the respective coordinate axes of a moment Mx about the X-axis, a moment My about the Y-axis, and a moment Mz about the Z-axis, a total of six components. It is preferable for a sensor for detecting a specific component out of the six components to have a function of independently detecting only the specific component without the influence of other components.

It is therefore studied what kind of detection result will be obtained when the above-described six components are exerted on the torque sensor shown in FIG. 23. Here, for the sake of convenience, separate cases where each individual force component is exerted on the annular deformation body 30 with the right side support body 20 loaded (with the right side support body 20 fixed) are considered.

Figure 25:
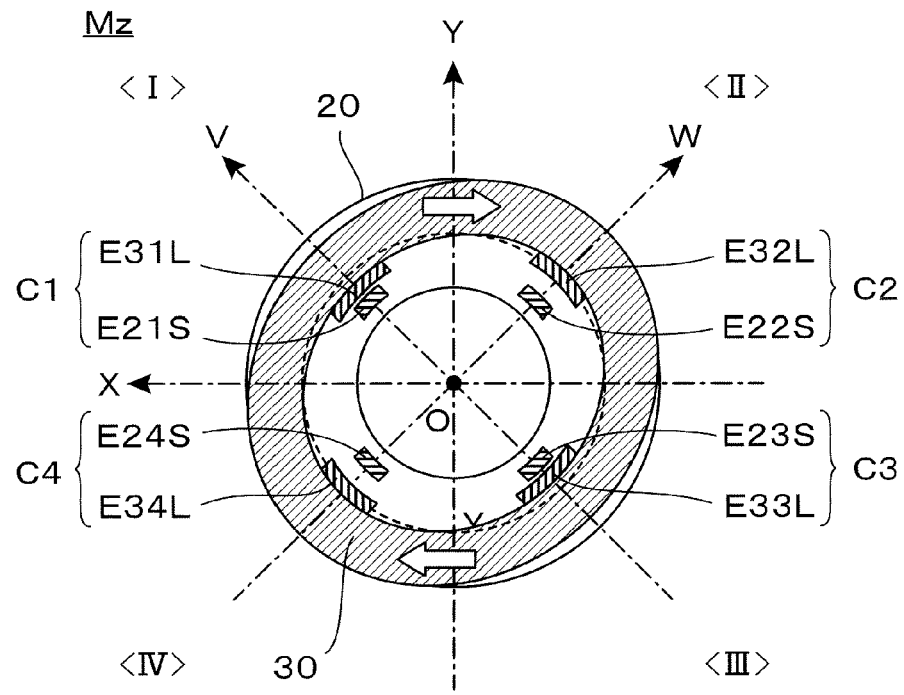
FIG. 25 is a sectional view along an XY plane showing a state when a forward moment Mz (torque to be detected) about the Z-axis is exerted with regard to the torque sensor shown in FIG. 23 (the broken line shows a state before deformation).

First, FIG. 25 is a sectional view along an XY plane showing a state when a forward moment Mz about the Z-axis is exerted with regard to the torque sensor shown in FIG. 23. This forward moment Mz about the Z-axis is the very torque to be detected in the torque sensor. When the forward moment Mz (torque to be detected) about the Z-axis is exerted on the sensor in an unloaded state shown in FIG. 23, it transits into a deformed state shown in FIG. 25, and the capacitance values of the capacitive elements C1, C3 increase because the electrode interval thereof is reduced, and the capacitance values of the capacitive elements C2, C4 decrease because the electrode interval thereof is increased. Therefore, as already described in Section 5, a detection value of the moment Mz (torque to be detected) can be obtained at the output terminal T2 by using a detector circuit as shown in FIG. 21.

Figure 26:
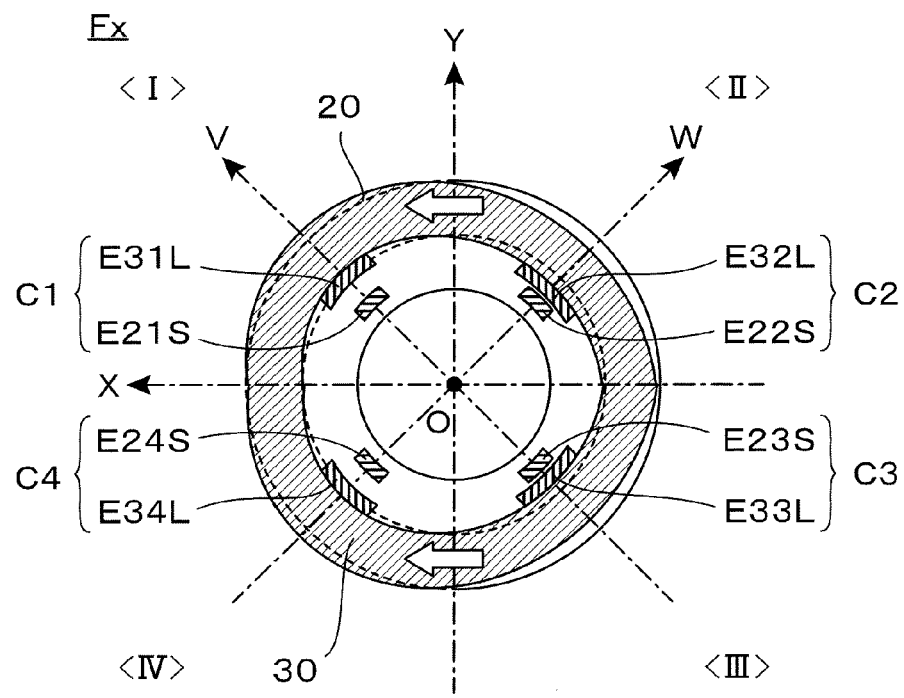
FIG. 26 is a sectional view along an XY plane showing a state when a force Fx in the X-axis direction is exerted with regard to the torque sensor shown in FIG. 23 (the broken lines show a state before deformation).

On the other hand, FIG. 26 is a sectional view along an XY plane showing a state when a force Fx in the X-axis direction is exerted with regard to the torque sensor shown in FIG. 23. In this case, not only to an upper arc part but also a lower arc part to construct the annular deformation body 30, a force to attempt movement in the left direction of the figure is applied, as shown by outlined arrows, so that the annular deformation body 30 is deformed into the illustrated state. Consequently, the capacitance values of the capacitive elements C2, C3 increase because the electrode interval thereof is reduced, and the capacitance values of the capacitive elements C1, C4 decrease because the electrode interval thereof is increased. However, in the detector circuit shown in FIG. 21, fluctuations in the capacitance value of the capacitive elements C2, C3 are mutually canceled out, and fluctuations in the capacitance value of the capacitive elements C1, C4 are also mutually canceled out, so that the detection value to be output to the output terminal T2 is 0. Consequently, even when a force Fx in the X-axis direction is exerted, its value is not detected.

The same applies when a force Fy in the Y-axis direction is exerted. In this case, the capacitance values of the capacitive elements C1, C2 decrease because the electrode interval thereof is increased, and the capacitance values of the capacitive elements C3, C4 increase because the electrode interval thereof is reduced. However, in the detector circuit shown in FIG. 21, fluctuations in the capacitance value of the capacitive elements C1, C2 are mutually canceled out, and fluctuations in the capacitance value of the capacitive elements C3, C4 are also mutually canceled out, so that the detection value to be output to the output terminal T2 is 0. Consequently, even when a force Fy in the Y-axis direction is exerted, its value is not detected.

Moreover, when a force Fz in the Z-axis is exerted, in FIG. 24, the annular deformation body 30 translates rightward in the figure, but the electrode interval of the capacitive elements is maintained at constant values without change, and as long as the amount of variation is within the predetermined allowable range described above, the effective area of the capacitive elements also remains constant. Therefore, fluctuations in capacitance value do not occur in the capacitive elements, and even when a force Fz in the Z-axis direction is exerted, its value is not detected.

Figures 27, 28:
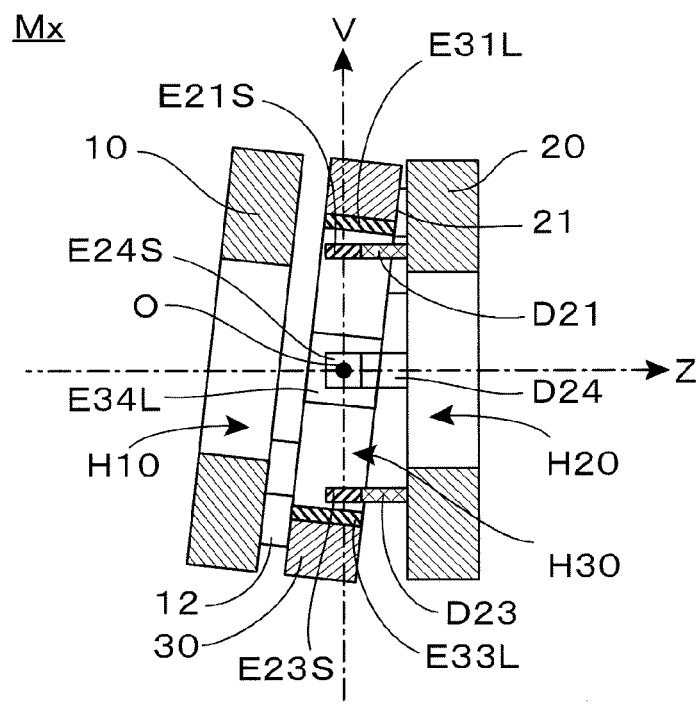
FIG. 27 is a sectional view along a ZV plane showing a state when a forward moment Mx about the X-axis is exerted with regard to the torque sensor shown in FIG. 23.
FIG. 28 is a table showing the mode of changes in the capacitance value of the four capacitive elements when forces in the coordinate axis directions and moments about the coordinate axes are exerted on the annular deformation body 30 from the left side support body 10, with the right side support body 20 loaded, with regard to the torque sensor shown in FIG. 23.

On the other hand, FIG. 27 is a sectional view along a ZV plane showing a state when a forward moment Mx about the X-axis is exerted with regard to the torque sensor shown in FIG. 23. As illustrated, because the annular deformation body 30 is rotationally displaced clockwise on the drawing, the positional relationship between the displacement electrodes and fixed electrodes changes. However, no change occurs in the capacitance value of the capacitive elements. For example, the displacement electrode E34L and the fixed electrode E24S drawn near the origin O change in mutual orientation, but do not change in electrode interval and effective area, so that no fluctuation occurs in the capacitance value of the capacitive element C4. The same applies to the capacitive element C2.

Moreover, the displacement electrode E31L and the fixed electrode E21S drawn in the upper side of the figure change in mutual positional relationship because of an inclination of the displacement electrode E31L, but do not change in effective area. Furthermore, in terms of the electrode interval, the displacement electrode E31L and the fixed electrode E21S have such a relationship that it is reduced in the right half and is increased in the left half, so that in total, this is equivalent to a case where the electrode interval is constant. Therefore, no fluctuation in capacitance value occurs also in the capacitive elements C1, C3.

Consequently, even when a moment Mx about the X-axis is exerted, its value is not detected. Exactly the same applies to a moment My about the Y-axis.

FIG. 28 is a table showing the mode of changes in the capacitance value of the four capacitive elements C1 to C4 when forces in the coordinate axis directions and moments about the coordinate axes are exerted on the annular deformation body 30 from the left side support body 10, with the right side support body 20 loaded, with regard to the torque sensor shown in FIG. 23. In the figure, the cells with "+" indicate that the capacitance value increases, the cells with "−" indicate that the capacitance value decreases, and the cells with "0" indicate that the capacitance value does not change. The reason that such results are obtained is as already described with reference to FIG. 25 to FIG. 27. By considering the operation of the detector circuit shown in FIG. 21 while referring to the table of FIG. 28, it will be understood that a detection value is obtained at the output terminal T2 only when a moment Mz (torque to be detected) about the Z-axis is exerted, and a detection value is not obtained at the output terminal T2 even when the five other disturbance components Fx, Fy, Fz, Mx, My are exerted. Consequently, in the torque sensor according to the example shown in FIG. 23, even when extra force components (disturbance components) other than torque to be detected are exerted, accurate torque detection free from the influence of the disturbance components can be performed.

In the torque sensor according to the example shown in FIG. 23, the force Fx in the X-axis direction and the force Fy in the Y-axis direction can also be determined by the following operations:

$$Fx=(C2+C3)-(C1+C4)$$

$$Fy=(C3+C4)-(C1+C2)$$

Here, C1 to C4 mean capacitance values of the capacitive elements C1 to C4, respectively. The reason that the forces Fx, Fy are determined by such operations will be easily understood by taking into consideration the results shown in the table of FIG. 28.

In actuality, as shown in the detector circuit of FIG. 21, the capacitance values C1 to C4 are converted by the C/V converters 51 to 54 to the voltage values V1 to V4, and these voltage values are used to carry out operations. In that case, it suffices to provide an operation unit to carry out the following operations:

$$Fx=(V2+V3)-(V1+V4)$$

$$Fy=(V3+V4)-(V1+V2)$$

Thus, the sensor according to the example shown in FIG. 23 can fulfill a function as a torque sensor for detecting torque about the Z-axis as well as fulfill a function as a force sensor for detecting a force Fx in the X-axis direction and a force Fy in the Y-axis direction.

<<<Section 7. Modification Using Common Conductive Layer>>>

In the embodiment described so far, the individual displacement electrodes and the individual fixed electrodes are formed as separate and physically independent electrodes, respectively, but a plurality of displacement electrodes or a plurality of fixed electrodes can be constructed by a single common electrode. In particular, by constructing the displacement electrodes by a common conductive layer formed on the inner peripheral surface of the annular deformation body 30, the structure can be simplified, and the manufacturing cost can be reduced.

For example, in the case of the embodiment shown in FIG. 23 described in Section 6, the four displacement electrodes E31L to E34L and the four fixed electrodes E21S to E24S are formed as physically independent electrodes, respectively, and in manufacturing, a process for forming eight separate and independent electrodes is required. Therefore, by constructing the four displacement electrodes E31L to E34L by a single electrode, the structure is simplified, and the manufacturing process is also simplified.

Figure 29:
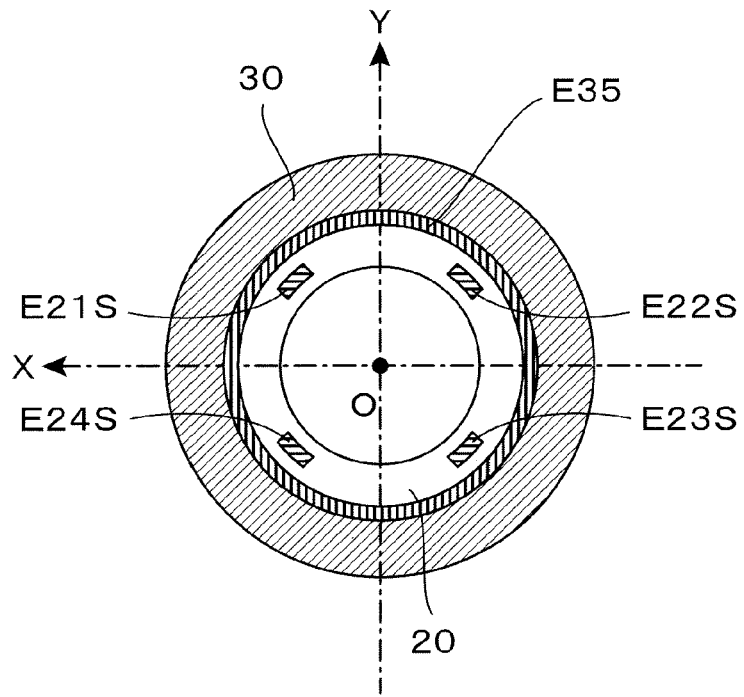
FIG. 29 is a sectional view along an XY plane showing a modification for which, in the torque sensor shown in FIG. 23, the four displacement electrodes E31L to E34L are replaced by a common conductive layer E35.

FIG. 29 is a sectional view along an XY plane showing a modification for which, in the torque sensor shown in FIG. 23, the four displacement electrodes E31L to E34L are replaced by a common conductive layer E35. The common conductive layer E35 is a conductive layer formed so as to cover the entire inner peripheral surface of the annular deformation body 30, and the common conductive layer E35 can be formed by, for example, a metal film formed by vapor deposition or plating on the inner peripheral surface of the annular deformation body 30. In this case, of the common conductive layer E35 spreading over the entire inner peripheral surface, partial regions opposed to the individual fixed electrodes E21S to E24S fulfill functions as the displacement electrodes E31L to E34L, respectively. The displacement electrodes E31L to E34L are brought into a mutually short-circuited state, but there is no problem in operation of the detector circuit shown in FIG. 21.

Figure 30:
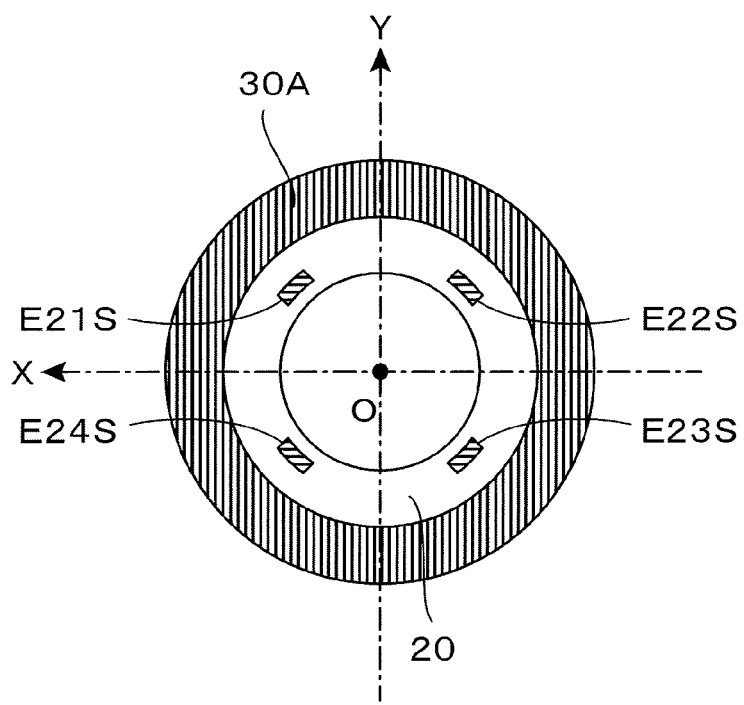
FIG. 30 is a sectional view along an XY plane showing a modification for which, in the torque sensor shown in FIG. 29, an annular deformation body 30A made of a conductive material is used to thereby use an inner peripheral surface of the annular deformation body 30A as a common conductive layer.

FIG. 30 is a sectional view along an XY plane showing a modification for which, in the torque sensor shown in FIG. 29, an annular deformation body 30A made of a conductive material is used to thereby use an inner peripheral surface of the annular deformation body 30A as a common conductive layer. For example, if the annular deformation body 30A constructed by a conductive elastic material such as metal is prepared, the inner peripheral surface itself of the annular deformation body 30A functions as the common conductive layer E35 shown in FIG. 29. Therefore, substantially, it is no longer necessary to perform a step of forming any electrodes on the annular deformation body, and the manufacturing process is considerably simplified.

In the above, a description has been given of an example in which the displacement electrodes are provided as a common electrode, but of course, the fixed electrodes can be provided as a common electrode. For example, in the torque sensor shown in FIG. 19, a cylindrical common fixed electrode made of a conductive material may be provided in place of the four fixed electrodes E21 to E24. In this case, respective parts (parts opposed to the displacement electrodes E31 to E34) of the cylindrical electrode function as the fixed electrodes E21 to E24, respectively.

<<<Section 8. Modification Using Two Annular Deformation Bodies (Part 1)>>>

Figure 31:
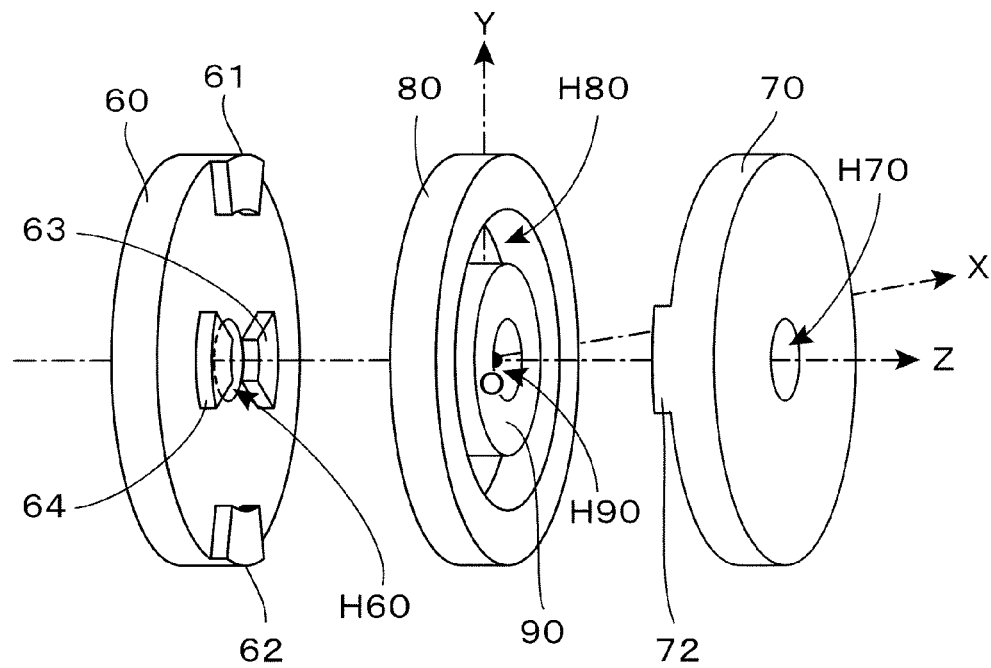
FIG. 31 is an exploded perspective view of a basic structural section of a torque sensor according to a modification of the present invention using two annular deformation bodies.

FIG. 31 is an exploded perspective view of a basic structural section of a torque sensor according to a modification of the present invention using two annular deformation bodies. As illustrated, the basic structural section is constructed by disposing two annular deformation bodies 80, 90 between a left side support body 60 and a right side support body 70 and joining these four structural elements to each other. Here, the Z-axis drawn in the horizontal direction of the figure corresponds to a rotation axis of torque to be detected, and the torque sensor fulfills a function of detecting torque about the rotation axis (about the Z-axis), which is exactly the same as the examples having been described so far.

The annular deformation body 80 disposed at the middle of the figure is made of a material that produces elastic deformation due to exertion of torque to be detected, and inside of the same, a through-opening portion H80 through which the rotation axis (Z-axis) is inserted is formed. In fact, the annular deformation body 80 is exactly the same structural element as the annular deformation body 30 shown in FIG. 1. On the other hand, the annular deformation body 90 is also made of a material that produces elastic deformation due to exertion of torque to be detected, and inside of the same, a through-opening portion H90 through which the rotation axis (Z-axis) is inserted is formed. The annular deformation body 90 is integrated within the through-opening portion H80. That is, the annular deformation body 90 is disposed at a concentric position inside of the annular deformation body 80, and both annular deformation bodies have the same thickness (dimension in the Z-axis direction). Therefore, here, the annular deformation body 80 is called an outer annular deformation body, and the annular deformation body 90 is called an inner annular deformation body.

On the other hand, the left side support body 60 disposed at the left side of FIG. 31 is a member for supporting left side surfaces of the outer annular deformation body 80 and the inner annular deformation body 90, and the right side support body 70 disposed at the right side of FIG. 31 is a member for supporting right side surfaces of the outer annular deformation body 80 and the inner annular deformation body 90. In the case of the example shown here, the left side support body 60 is an annular member formed with a through-opening portion H60 through which the rotation axis (Z-axis) is inserted, and the right side support body 70 is an annular member formed with a through-opening portion H70 through which the rotation axis (Z-axis) is inserted.

On a right side surface of the left side support body 60, four fan-shaped projecting portions 61 to 64 projecting rightward are provided. The projecting portions 61, 62 are exactly the same structural elements as the projecting portions 11, 12 formed on the left side support body 10 shown in FIG. 1, and top surfaces of these are joined to the left side surface of the outer annular deformation body 80. Also, top surfaces of the projecting portions 63, 64 are joined to the left side surface of the inner annular deformation body 90. On the other hand, on a left side surface of the right side support body 70, four fan-shaped projecting portions 71 to 74 projecting leftward are provided (only the projecting portion 72 appears in the figure). The projecting portions 71, 72 are exactly the same structural elements as the projecting portions 21, 22 formed on the right side support body 20 shown in FIG. 1, and top surfaces of these are joined to the right side surface of the outer annular deformation body 80. Also, top surfaces of the projecting portions 73, 74 are joined to the right side surface of the inner annular deformation body 90. A component for which the four projecting portions 61 to 64 are added to the left side support body 60 and a component for which the four projecting portions 71 to 74 are added to the right side support body 70 are physically exactly the same.

Here, the projecting portion 61 is joined to an upper part (part located in a positive Y-axis direction) of the outer annular deformation body 80, the projecting portion 62 is joined to a lower part (part located in a negative Y-axis direction) of the outer annular deformation body 80, the projecting portion 63 is joined to a far part (part located in a positive X-axis direction) of the inner annular deformation body 90, and the projecting portion 64 is joined to a near part (part located in a negative X-axis direction) of the inner annular deformation body 90. Also, the projecting portion 71 is joined to a far part (part located in a positive X-axis direction) of the outer annular deformation body 80, the projecting portion 72 is joined to a near part (part located in a negative X-axis direction) of the outer annular deformation body 80, the projecting portion 73 is joined to an upper part (part located in a positive Y-axis direction) of the inner annular deformation body 90, and the projecting portion 74 is joined to a lower part (part located in a negative Y-axis direction) of the inner annular deformation body 90.

Thus, the position of connection points with respect to the outer annular deformation body 80 is exactly the same as the position of connection points with respect to the annular deformation body 30 in the basic embodiment shown in FIG. 1. That is, the outer annular deformation body 80 is connected to the left side support body 60 at two points along the Y-axis by the projecting portions 61, 62, and connected to the right side support body 70 at two points along the X-axis by the projecting portions 71, 72. In contrast thereto, the position of connection points with respect to the inner annular deformation body 90 is the position shifted by 90 degrees. That is, the inner annular deformation body 90 is connected to the left side support body 60 at two points along the X-axis by the projecting portions 63, 64, and connected to the right side support body 70 at two points along the Y-axis by the projecting portions 73, 74.

Consequently, the basic structural section of the torque sensor shown in FIG. 31 is the basic structural section of the torque sensor shown in FIG. 1 to which the inner annular deformation body 90, inner left side connection members (projecting portions 63, 64) for connecting inner left side connection points on the left-hand side surface of the inner annular deformation body 90 and inner right side connection members (projecting portions 73, 74) for connecting inner right side connection points on the right-hand side surface of the inner annular deformation body 90 are added.

Figure 32:
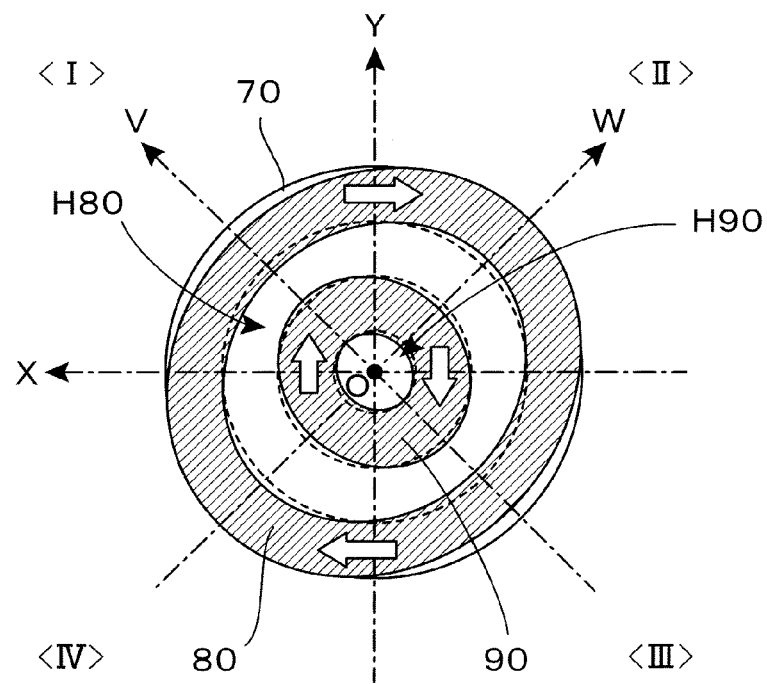
FIG. 32 is a sectional view along an XY plane showing a state when forward torque about the Z-axis is exerted with regard to the torque sensor shown in FIG. 31 (the broken lines show a state before deformation).

FIG. 32 is a sectional view along an XY plane showing a state when forward torque about the Z-axis is exerted with regard to the basic structural section of the torque sensor shown in FIG. 31. The outer annular deformation body 80 and the inner annular deformation body 90 are not directly joined, and are thus deformed into elliptical shapes separately and independently of each other when torque is exerted. Furthermore, the long axes and short axes of their respective ellipses are in an opposite relationship to each other. That is, as shown in FIG. 32, when forward torque about the Z-axis is exerted, the outer annular deformation body 80 is deformed into an ellipse having a short axis in the V-axis direction and having a long axis in the W-axis direction, while the inner annular deformation body 90 is deformed into an ellipse having a long axis in the V-axis direction and having a short axis in the W-axis direction.

The reason that there is a relationship, between the outer annular deformation body 80 and the inner annular deformation body 90, that the long axes and short axes of ellipses obtained by deformation are shifted by 90 degrees despite the torque being exerted in the same direction as shown by the outlined arrows in FIG. 32 is because, as described above, the position of the connection points is shifted by 90 degrees. Of course, it is not essential, between the outer annular deformation body 80 and the inner annular deformation body 90, to have a relationship that the long axis directions at the time of elliptical deformation are shifted by 90 degrees. Even when the long axis directions at the time of elliptical deformation are exactly the same, torque detection can be performed without any problems. However, the 90-degrees-shifted relationship allows carrying out a one-sided arrangement of four capacitive elements, as to be described later, and the space use efficiency can be improved. Moreover, in the case of adopting the embodiment to be described in Section 9 below, an effect of enhancing detection sensitivity is obtained.

Although in such a relationship that the long axes and short axes of ellipses are shifted by 90 degrees, the outer annular deformation body 80 and the inner annular deformation body 90 are both deformed into elliptical shapes by exertion of torque, and thus similar to the embodiment having been described so far, by providing capacitive elements at a long-axis position and a short-axis position, the direction and magnitude of the exerted torque can be detected based on the amount of fluctuations in the capacitance value of the capacitive elements. In actuality, the principle of detection based on deformation of the outer annular deformation body 80 is exactly the same as that of the embodiment having been described so far. For example, by respectively disposing capacitive elements on a positive V-axis, a negative V-axis, a positive W-axis, and a negative W-axis in the through-opening portion 1180, similar to the example shown in FIG. 19, torque detection can be performed by the detector circuit of FIG. 21.

Moreover, torque detection based on deformation of the inner annular deformation body 90 can also be performed based on exactly the same principle. For example, by respectively disposing capacitive elements on a positive V-axis, a negative V-axis, a positive W-axis, and a negative W-axis in the through-opening portion H90, likewise, torque detection can be performed by the detector circuit of FIG. 21. Alternatively, capacitive elements may be disposed on the outer peripheral surface side of the inner annular deformation body 90. In short, it suffices to further provide inner displacement electrodes that are fixed to an inner peripheral surface or outer peripheral surface of the inner annular deformation body 90 and produce displacement caused by elastic deformation of the inner annular deformation body 90 and inner fixed electrodes that are disposed at positions opposed to the inner displacement electrodes and fixed to the left side support body 60 or the right side support body 70.

Then, the detector circuit can output an electrical signal indicating torque about the rotation axis by using the amount of fluctuations in the capacitance value of the capacitive elements composed of inner displacement electrodes and inner fixed electrodes in addition to the amount of fluctuations in the capacitance value of the capacitive elements composed of outer displacement electrodes and outer fixed electrodes.

Thus, using both of the result of torque detection based on deformation of the outer annular deformation body 80 and the result of torque detection based on deformation of the inner annular deformation body 90 allows torque detection at a higher accuracy. Specifically, it suffices to obtain an average value of both detection results after performing a process (correction to multiply a coefficient according to the detection sensitivity) to match the scaling thereof.

By thus adopting a configuration of integrating the two annular deformation bodies 80, 90, separate detection results can be obtained from each of the individual annular deformation bodies 80, 90, so that the detection sensitivity and accuracy can be improved. Moreover, because the two annular deformation bodies 80, 90 are simultaneously twisted, the rigidity of the overall sensor structure is also improved.

In particular, as in the example to be described here, using circular annular structures as both annular deformation bodies so that both are deformed into elliptical shapes when torque is exerted and providing connection points shifted by 90 degrees from each other so that the long-axis direction of one ellipse serves as the short-axis direction of the other ellipse allows carrying out a one-sided arrangement of four capacitive elements, and the space use efficiency can be improved. In the following, this will be shown by drawings.

Figure 33:
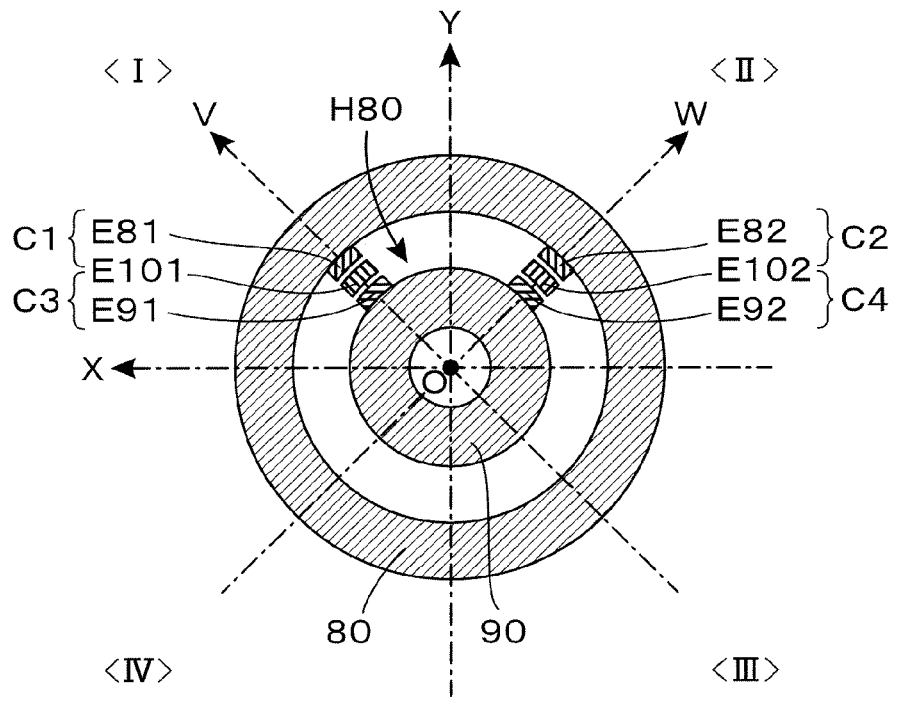
FIG. 33 is a sectional view along an XY plane of a torque sensor constructed by performing a specific electrode arrangement on the basic structural section shown in FIG. 31.

FIG. 33 is a sectional view along an XY plane of a torque sensor constructed by performing a specific electrode arrangement on the basic structural section shown in FIG. 31. As illustrated, on the inner peripheral surface of the outer annular deformation body 80, two outer displacement electrodes E81, E82 are formed, and on the outer peripheral surface of the inner annular deformation body 90, two inner displacement electrodes E91, E92 are formed. On the other hand, a fixed electrode E101 disposed between the electrodes E81, E91 and a fixed electrode E102 disposed between the electrodes E82, E92 are fixed electrodes fixed to the right side support body 70.

Here, the electrodes E81, E91, E101 are all disposed on a positive V-axis, and the fixed electrode E101 serves as a common fixed electrode that fulfills both a function as a fixed electrode with respect to the displacement electrode E81 and a function as a fixed electrode with respect to the displacement electrode E91. Accordingly, the electrodes E81, E101 compose a first capacitive, element C1, and the electrodes E91, E101 compose a third capacitive element C3.

Similarly, the electrodes E82, E92, E102 are all disposed on a positive W-axis, and the fixed electrode E102 serves as a common fixed electrode that fulfills both a function as a fixed electrode with respect to the displacement electrode E82 and a function as a fixed electrode with respect to the displacement electrode E92. Accordingly, the electrodes E82, E102 compose a second capacitive element C2, and the electrodes E92, E102 compose a fourth capacitive element C4.

Figure 34:
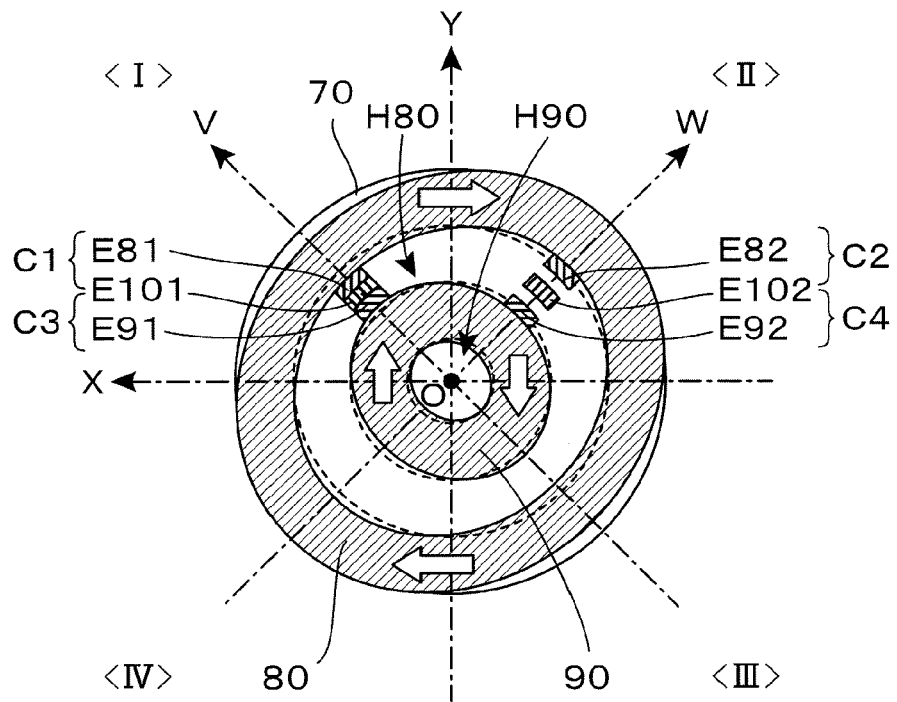
FIG. 34 is a sectional view along an XY plane showing a state when forward torque about the Z-axis is exerted with regard to the torque sensor shown in FIG. 33 (the broken lines show a state before deformation).

FIG. 34 is a sectional view along an XY plane showing a state when forward torque about the Z-axis is exerted with regard to the torque sensor shown in FIG. 33 (the broken lines show a state before deformation). As illustrated, the capacitance value increases in the capacitive elements C1, C3 as a result of a reduction in electrode interval, and the capacitance value decreases in the capacitive elements C2, C4 as a result of an increase in electrode interval. This is exactly the same operation as that of the torque sensor shown in FIG. 19 and FIG. 20, and torque about the Z-axis can be detected by using the detector circuit shown in FIG. 21. Such characteristics are obtained because the position of the connection points is shifted by 90 degrees with regard to the outer annular deformation body 80 and the inner annular deformation body 90 so that there is a relationship therebetween that the long axes and short axes of ellipses obtained by deformation are shifted by 90 degrees.

Consequently, similar to the torque sensor shown in FIG. 19, the torque sensor shown in FIG. 33 can perform difference detection using four capacitive elements, and thus has an advantage that a high detection accuracy can be obtained. Furthermore, in the case of the torque sensor shown in FIG. 33, because an arrangement in which the four capacitive elements are one-sided (to an upper half region of the figure, that is, a positive Y-axis region) can be carried out, there is also obtained an advantage that space use efficiency can be improved. That is, in a lower half region of the figure, because no electrodes are disposed in a gap portion between the outer annular deformation body 80 and the inner annular deformation body 90, its space can be used to pass wiring or dispose an additional component.

Thus, the torque sensor shown in FIG. 33 has an advantage of being able to secure a space to add functionality while maintaining a high detection accuracy similarly to the torque sensor shown in FIG. 19, and an advantage that the entire device can be downsized is obtained. However, in the torque sensor shown in FIG. 33, an output is obtained by the detector circuit shown in FIG. 21 also when disturbance components of forces Fx, Fy are exerted. Therefore, its use is limited to being in an environment where no disturbance components of forces Fx, Fy are exerted.

In the structure shown in FIG. 33, when it is not necessary to use the lower half space of the figure, it is also possible to dispose electrodes for detection also in this part so as to further enhance detection accuracy. Specifically, it suffices to dispose at positions in the lower half to be plane symmetric with respect to an XZ plane exactly the same capacitive elements C5 to C8 as the four capacitive elements C1 to C4 formed in the upper half, and perform detection by a total of eight capacitive elements. By taking an average of the detection result by the capacitive elements in the upper half and the detection result by the capacitive elements in the lower half, a more accurate detection value can be obtained.

Consequently, the modification to be described in this Section 8 is the torque sensor according to the basic embodiment described in Section 3, to which an inner annular deformation body 90 made of a material that produces elastic deformation due to exertion of torque to be detected, having a through-opening portion 1190 through which the Z-axis is inserted, and disposed on the XY plane about the origin O so as to be located inside of an outer annular deformation body 80 is added, in which a first inner left side connection point and a second inner left side connection point are set on a negative Z-axis-side side surface of the inner annular deformation body 90, a first inner right side connection point and a second inner right side connection point are set on a positive Z-axis-side side surface of the inner annular deformation body 90, and a first inner left side connection member (projecting portion 63) for connecting the first inner left side connection point to the left side support body 60, a second inner left side connection member (projecting portion 64) for connecting the second inner left side connection point to the left side support body 60, a first inner right side connection member (projecting portion 73) for connecting the first inner right side connection point to the right side support body 70, a second inner right side connection member (projecting portion 74) for connecting the second inner right side connection point to the right side support body 70, an inner displacement electrode that is fixed to an inner peripheral surface or outer peripheral surface of the inner annular deformation body 90, and produces displacement caused by elastic deformation of the inner annular deformation body 90, and an inner fixed electrode that is disposed at a position opposed to the inner displacement electrode, and fixed to the left side support body 60 or the right side support body 70 are further provided.

Furthermore, when orthogonal projection images are obtained by projecting both side surfaces of the inner annular deformation body 90 on the XY plane, the projection image of the first inner right side connection point is disposed on a positive Y-axis, the projection image of the second inner right side connection point is disposed on a negative Y-axis, the projection image of the first inner left side connection point is disposed on a positive X-axis, and the projection image of the second inner left side connection point is disposed on a negative X-axis, and the detector circuit outputs an electrical signal indicating torque about the rotating axis by further using the amount of fluctuation in the capacitance value of a capacitive element composed of the inner displacement electrode and the inner fixed electrode.

<<<Section 9. Modification Using Two Annular Deformation Bodies (Part 2)>>>

In Section 8, description has been given of a modification using two annular deformation bodies of the outer annular deformation body 80 and the inner annular deformation body 90 as shown in FIG. 31. Thus, the example shown in Section 8 uses two annular deformation bodies, but the principle of torque detection using the individual annular deformation bodies is exactly the same as that of the basic embodiment described so far. That is, in FIG. 32, the arrangement of electrodes to compose capacitive elements is not drawn, but with regard to the outer annular deformation body 80, a displacement electrode is fixed to its inner peripheral surface or outer peripheral surface, a fixed electrode to be opposed thereto is fixed to a left side support body or right side support body, and a capacitive element composed of the displacement electrode and the fixed electrode is formed. Similarly, also with regard to the inner annular deformation body 90, a displacement electrode is fixed to its inner peripheral surface or outer peripheral surface, a fixed electrode to be opposed thereto is fixed to a left side support body or right side support body, and a capacitive element composed of the displacement electrode and the fixed electrode is formed.

Thus, the examples having been described so far are all on the assumption of forming a capacitive element for detection composed of a displacement electrode fixed to the annular deformation body and a fixed electrode fixed to the side of the left side support body or right side support body. In contrast thereto, the modification to be described in this Section 9 has a feature in forming a capacitive element for detection composed of an outer displacement electrode fixed to the inner peripheral surface of the outer annular deformation body 80 and an inner displacement electrode fixed to the outer peripheral surface of the inner annular deformation body 90.

Figure 35:
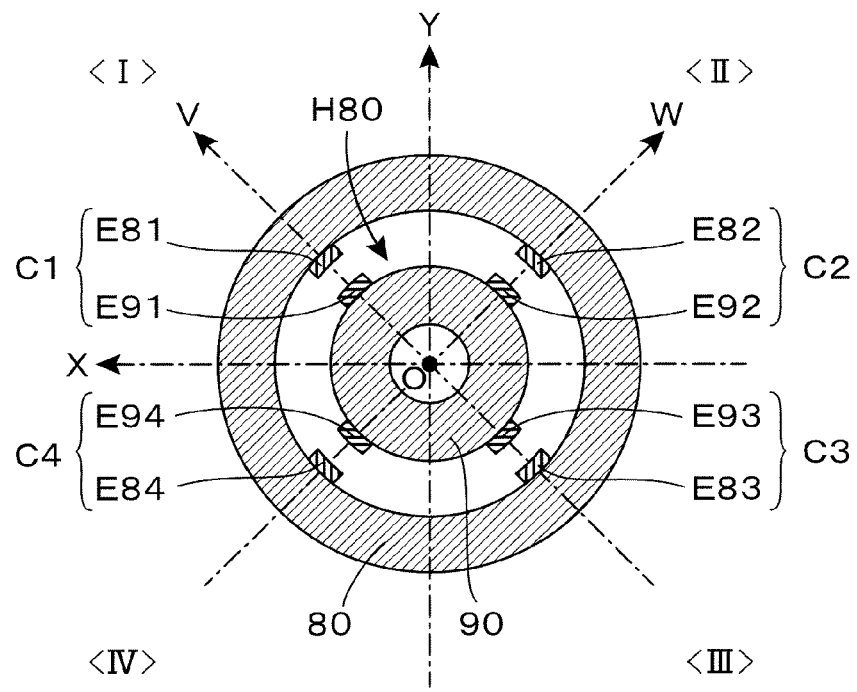
FIG. 35 is a sectional view along an XY plane of a torque sensor according to another modification of the present invention using two annular deformation bodies.

FIG. 35 is a sectional view taken along an XY plane of a torque sensor according to such an example. The structure of a basic structural section of the torque sensor is exactly the same as that (structure shown in FIG. 31) of the torque sensor described in Section 8. There is a difference from the torque sensor described in Section 8 in the arrangement of electrodes. That is, in the example to be described here, as shown in FIG. 35, four outer displacement electrodes E81 to E84 are formed on the inner peripheral surface of the outer annular deformation body 80, and in a manner opposed thereto, four inner displacement electrodes E91 to E94 are formed on the outer peripheral surface of the inner annular deformation body 90.

More specifically, on a positive V-axis, a first outer displacement electrode E81 and a first inner displacement electrode E91 are disposed, on a positive W-axis, a second outer displacement electrode E82 and a second inner displacement electrode E92 are disposed, on a negative V-axis, a third outer displacement electrode E83 and a third inner displacement electrode E93 are disposed, and on a negative W-axis, a fourth outer displacement electrode E84 and a fourth inner displacement electrode E94 are disposed.

Consequently, of an XY coordinate system, in the first quadrant I, a first capacitive element C1 composed of the first outer displacement electrode E81 and the first inner displacement electrode E91 is disposed, in the second quadrant II, a second capacitive element C2 composed of the second outer displacement electrode E82 and the second inner displacement electrode E92 is disposed, in the third quadrant III, a third capacitive element C3 composed of the third outer displacement electrode E83 and the third inner displacement electrode E93 is disposed, and in the fourth quadrant IV, a fourth capacitive element C4 composed of the fourth outer displacement electrode E84 and the fourth inner displacement electrode E94 is disposed.

Figure 36:
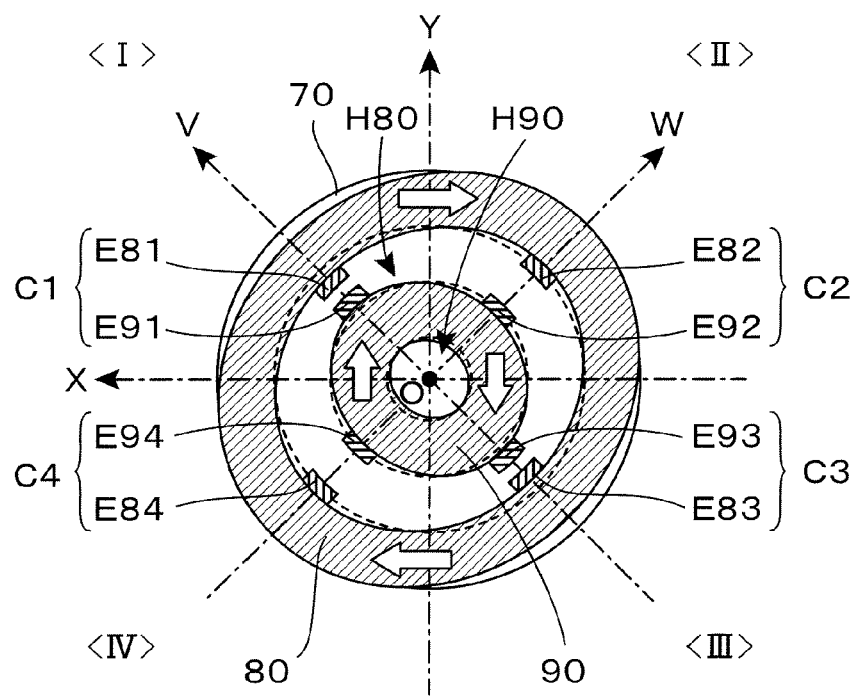
FIG. 36 is a sectional view along an XY plane showing a state when forward torque about the Z-axis is exerted with regard to the torque sensor shown in FIG. 35 (the broken lines show a state before deformation).

FIG. 36 is a sectional view along an XY plane showing a state when forward torque about the Z-axis is exerted with regard to this torque sensor. The mode of deformation itself of the outer annular deformation body 80 and the inner annular deformation body 90 is the same as that of the sensor (refer to FIG. 32) described in Section 8, but in the torque sensor shown in FIG. 36, each pair of opposed electrodes are both displacement electrodes, and both of the electrodes composing a capacitive element are displaced. Furthermore, both of each pair of opposed electrodes either move in a direction to approach each other or move in a direction to separate from each other. Therefore, the electrode interval changes larger than when one of the electrodes is provided as a fixed electrode, so that the detection sensitivity can be improved.

For example, in FIG. 36, when focusing on the first capacitive element C1 and the third capacitive element C3 disposed on the V-axis, the outer and inner displacement electrodes have moved in mutually approaching directions, that is, the outer displacement electrodes E81, E83 have moved to the inside, while the inner displacement electrodes E91, E93 have moved to the outside. Therefore, a reduction in electrode interval is larger than when one of the electrodes is provided as a fixed electrode, and the amount of increasing fluctuation in capacitance value is also larger. On the other hand, when focusing on the second capacitive element C2 and the fourth capacitive element C4 disposed on the W-axis, the outer and inner displacement electrodes have moved in mutually separating directions, that is, the outer displacement electrodes E82, E84 have moved to the outside, while the inner displacement electrodes E92, E94 have moved to the inside. Therefore, an increase in electrode interval is larger than when one of the electrodes is provided as a fixed electrode, and the amount of decreasing fluctuation in capacitance value is also larger.

Thus, in the case of the torque sensor to be described here, the amount of fluctuations in capacitance value is larger than that of the examples having been described so far, but the basic principle of torque detection is exactly the same as that of the examples having been described so far, and torque about the Z-axis can be detected by using a detector circuit as shown in the circuit diagram of FIG. 21.

Consequently, the torque sensor to be described in this Section 9 is a torque sensor for detecting torque about a Z-axis in an XYZ three-dimensional coordinate system, and its basic structural section is, as shown in FIG. 31, constructed by an outer annular deformation body 80 made of a material that produces elastic deformation due to exertion of torque to be detected, having a through-opening portion H80 through which the Z-axis is inserted, and disposed on an XY plane about an origin O, an inner annular deformation body 90 made of a material that produces elastic deformation due to exertion of torque to be detected, having a through-opening portion H90 through which the Z-axis is inserted, and disposed on the XY plane about the origin O and disposed within the through-opening portion H80 of the outer annular deformation body 80, a left side support body 60 disposed at a position adjacent to a negative Z-axis region side of the outer annular deformation body 80 and the inner annular deformation body 90, a right side support body 70 disposed at a position adjacent to a positive Z-axis region side of the outer annular deformation body 80 and the inner annular deformation body 90, and connection members for connecting the annular deformation bodies 80, 90 and the support bodies 60, 70.

Here, as shown in FIG. 31, on a negative Z-axis-side side surface of the outer annular deformation body 80, a first outer left side connection point (connection point of the projecting portion 61) and a second outer left side connection point (connection point of the projecting portion 62) are provided, on a positive Z-axis-side side surface of the outer annular deformation body 80, a first outer right side connection point (connection point of the projecting portion 71) and a second outer right side connection point (connection point of the projecting portion 72) are provided, on a negative Z-axis-side side surface of the inner annular deformation body 90, a first inner left side connection point (connection point of the projecting portion 63) and a second inner left side connection point (connection point of the projecting portion 64) are provided, and on a positive Z-axis-side side surface of the inner annular deformation body 90, a first inner right side connection point (connection point of the projecting portion 73) and a second inner right side connection point (connection point of the projecting portion 74) are provided.

Further, the outer annular deformation body 80 is supported from the left and right sides by a first outer left side connection member (projecting portion 61) for connecting the first outer left side connection point to the left side support body 60, a second outer left side connection member (projecting portion 62) for connecting the second outer left side connection point to the left side support body 60, a first outer right side connection member (projecting portion 71) for connecting the first outer right side connection point to the right side support body 70, and a second outer right side connection member (projecting portion 72) for connecting the second outer right side connection point to the right side support body 70.

Moreover, the inner annular deformation body 90 is supported from the left and right sides by a first inner left side connection member (projecting portion 63) for connecting the first inner left side connection point to the left side support body 60, a second inner left side connection member (projecting portion 64) for connecting the second inner left side connection point to the left side support body 60, a first inner right side connection member (projecting portion 73) for connecting the first inner right side connection point to the right side support body 70, and a second inner right side connection member (projecting portion 74) for connecting the second inner right side connection point to the right side support body 70.

Here, the connection points are disposed so that, when orthogonal projection images are obtained by projecting both side surfaces of the outer annular deformation body 80 and the inner annular deformation body 90 on the XY plane, the projection image of the first outer right side connection point is located on a positive X-axis, the projection image of the second outer right side connection point is located on a negative X-axis, the projection image of the first outer left side connection point is located on a positive Y-axis, the projection image of the second outer left side connection point is located on a negative Y-axis, the projection image of the first inner right side connection point is located on a positive Y-axis, the projection image of the second inner right side connection point is located on a negative Y-axis, the projection image of the first inner left side connection point is located on a positive X-axis, and the projection image of the second inner left side connection point is located on a negative X-axis.

An actual torque sensor is constructed by adding electrodes for detection and a detector circuit to such a basic structural section. That is, an outer displacement electrode that is fixed to an inner peripheral surface of the outer annular deformation body 80, and produces displacement caused by elastic deformation of the outer annular deformation body 80, an inner displacement electrode that is fixed at a position opposed to the outer displacement electrode in an outer peripheral surface of the inner annular deformation body 90, and produces displacement caused by elastic deformation of the inner annular deformation body 90, and a detector circuit for outputting an electrical signal indicating torque about the Z-axis exerted on the left side support body 60 with the right side support body 70 loaded, based on the amount of fluctuation in the capacitance value of a capacitive element composed of these mutually opposed electrodes.

In principle, if there is at least one capacitive element out of the four capacitive elements shown in FIG. 35, torque detection can be performed. However, practically, it is preferable to perform difference detection in order to perform stable torque detection in which common-mode noise and zero-point drift are suppressed. For that purpose, it suffices to provide at least one capacitive element disposed on the V-axis and one capacitive element disposed on the W-axis out of the four capacitive elements shown in FIG. 35.

That is, when a V-axis and a W-axis that pass through the origin O and create 45 degrees with respect to the X-axis and Y-axis are defined on the XY plane, it suffices to provide a first outer displacement electrode and a first inner displacement electrode disposed on the V-axis and a second outer displacement electrode and a second inner displacement electrode disposed on the W-axis, and that the detector circuit outputs an electrical signal corresponding to a difference between the capacitance value of a first capacitive element composed of the first outer displacement electrode and the first inner displacement electrode and the capacitance value of a second capacitive element composed of the second outer displacement electrode and the second inner displacement electrode as an electrical signal indicating exerted torque.

Of course, for performing detection at a higher accuracy, it is preferable to use all of the four capacitive elements shown in FIG. 35. In this case, when signed V- and W-axes that pass through the origin O and create 45 degrees with respect to the X-axis and Y-axis are defined on the XY plane, it suffices to provide a first outer displacement electrode E81 and a first inner displacement electrode E91 disposed on the positive V-axis, a second outer displacement electrode E82 and a second inner displacement electrode E92 disposed on the positive W-axis, a third outer displacement electrode E83 and a third inner displacement electrode E93 disposed on the negative V-axis, and a fourth outer displacement electrode E84 and a fourth inner displacement electrode E94 disposed on the negative W-axis, and that the detector circuit outputs an electrical signal corresponding to a difference between "a sum of the capacitance value of a first capacitive element C1 composed of the first outer displacement electrode E81 and the first inner displacement electrode E91 and the capacitance value of a third capacitive element C3 composed of the third outer displacement electrode E83 and the third inner displacement electrode E93" and "a sum of the capacitance value of a second capacitive element C2 composed of the second outer displacement electrode E82 and the second inner displacement electrode E92 and the capacitance value of a fourth capacitive element C4 composed of the fourth outer displacement electrode E84 and the fourth inner displacement electrode E94" as an electrical signal indicating exerted torque.

Thus, when the configuration of integrating two annular deformation bodies disposed at the outside and inside is adopted, in place of a capacitive element composed of a displacement electrode and a fixed electrode, a capacitive element composed of an outer displacement electrode formed on the inner peripheral surface of the outer annular deformation body 80 and an inner displacement electrode formed on the outer peripheral surface of the inner annular deformation body 90 can be formed. Further, as in the illustrated example, by using circular annular structures as both annular deformation bodies so that both are deformed into elliptical shapes when torque is exerted and providing connection points shifted by 90 degrees from each other so that the long-axis direction of one ellipse serves as the short-axis direction of the other ellipse, the amount of variation in the electrode interval between the outer displacement electrode and the inner displacement electrode can be set large, and the detection sensitivity can be further improved.

However, it is not always essential for performing torque detection to provide connection points shifted by 90 degrees from each other so that, when both annular deformation bodies are deformed, the long-axis direction of one ellipse serves as the short-axis direction of the other ellipse. Even if the long-axis directions of ellipses after deformation are the same, because the distance between the outer displacement electrode and the inner displacement electrode in a perfect circle state with no load is different from that in an elliptical state after deformation, torque can still be detected as the amount of fluctuation in the capacitance value of the capacitive element. However, for further enhancing sensitivity, it is preferable to provide connection points shifted by 90 degrees from each other so that the long-axis direction of one ellipse serves as the short-axis direction of the other ellipse, as in the embodiment shown here.

Consequently, the technical idea according to the example described in this Section 9 is an invention relating to a torque sensor for detecting torque about a predetermined rotation axis, and is an invention of a sensor having a basic structural section constructed by an outer annular deformation body 80 made of a material that produces elastic deformation due to exertion of torque to be detected and having a through-opening portion H80 through which the rotation axis Z is inserted, an inner annular deformation body 90 made of a material that produces elastic deformation due to exertion of torque to be detected, having a through-opening portion H90 through which the rotation axis Z is inserted, and disposed inside of the outer annular deformation body 80, a left side support body 60 disposed at a position adjacent to a left side of the outer annular deformation body 80 and the inner annular deformation body 90, when viewed in such a reference observation direction that the rotation axis Z creates a horizontal line extending left and right, a right side support body 70 disposed at a position adjacent to a right side of the outer annular deformation body 80 and the inner annular deformation body 90, when viewed in the reference observation direction, and connection members.

Here, the connection members are composed of an outer left side connection member for connecting an outer left side connection point on a left-hand side surface, opposed to the left side support body 60, of the outer annular deformation body 80 to the left side support body 60, an outer right side connection member for connecting an outer right side connection point on a right-hand side surface, opposed to the right side support body 70, of the outer annular deformation body 80 to the right side support body 70, an inner left side connection member for connecting an inner left side connection point on a left-hand side surface, opposed to the left side support body 60, of the inner annular deformation body 90 to the left side support body 60, and an inner right side connection member for connecting an inner right side connection point on a right-hand side surface, opposed to the right side support body 70, of the inner annular deformation body 90 to the right side support body 70.

Then, by adding, to the basic structural section, an outer displacement electrode that is fixed to an inner peripheral surface of the outer annular deformation body 80 and produces displacement caused by elastic deformation of the outer annular deformation body 80, an inner displacement electrode that is fixed to an outer peripheral surface of the inner annular deformation body 90 and produces displacement caused by elastic deformation of the inner annular deformation body 90, and a detector circuit for outputting an electrical signal indicating torque about the rotation axis Z exerted on the left side support body 60 with the right side support body 70 loaded, based on the amount of fluctuation in the capacitance value of a capacitive element composed of the outer displacement electrode and the inner displacement electrode, a torque sensor can be realized.

Here, it is necessary in order to cause deformation in the annular deformation bodies 80, 90 that, with respect to a plane of projection orthogonal to the rotation axis Z, an orthogonal projection image of the outer left side connection point and an orthogonal projection image of the outer right side connection point are formed at different positions, and an orthogonal projection image of the inner left side connection point and an orthogonal projection image of the inner right side connection point are formed at different positions.

Figure 37:
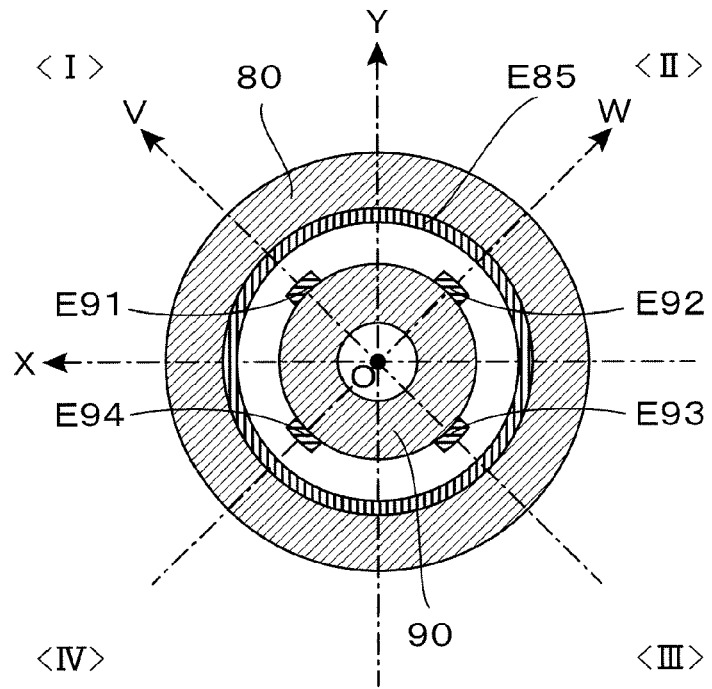
FIG. 37 is a sectional view along an XY plane showing a modification for which, in the torque sensor shown in FIG. 35, the four outer displacement electrodes E81 to E84 are replaced by a common conductive layer E85.

Also to the example to be described in this Section 9, the "modification using common conductive layer" described in Section 7 can be applied. FIG. 37 is a sectional view along an XY plane showing a modification for which, in the torque sensor shown in FIG. 35, the four outer displacement electrodes E81 to E84 are replaced by a common conductive layer E85. Thus, even when the outer displacement electrodes E81 to E84 are constructed by the common conductive layer E85 formed on the inner peripheral surface of the outer annular deformation body 80, the detection system is electrically the same, and torque detection can be performed by the same principle as that of the examples described so far. Of course, the outer displacement electrodes may be kept as the four independent electrodes E81 to E84, while the inner displacement electrodes E91 to E94 may be constructed by a common conductive layer formed on the outer peripheral surface of the inner annular deformation body 90.

Figure 38:
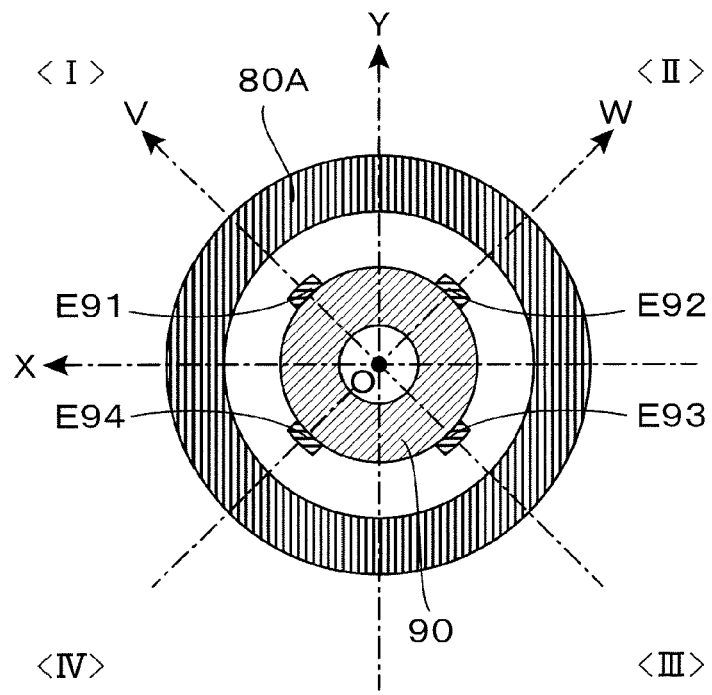
FIG. 38 is a sectional view along an XY plane showing a modification for which, in the torque sensor shown in FIG. 37, an annular deformation body 80A made of a conductive material is used to thereby use an inner peripheral surface of the annular deformation body 80A as a common conductive layer.

On the other hand, FIG. 38 is a sectional view along an XY plane showing a modification for which, in the torque sensor shown in FIG. 37, an annular deformation body 80A made of a conductive material is used to thereby use an inner peripheral surface of the annular deformation body 80A as a common conductive layer. Because the outer annular deformation body 80A is constructed by a conductive elastic material, its inner peripheral surface fulfills a function equivalent to the common conductive layer E85 shown in FIG. 37. Of course, the outer displacement electrodes may be kept as the four independent electrodes E81 to E84, while the inner annular deformation body 90 may be constructed by a conductive elastic material so as to use the outer peripheral surface itself of the inner annular deformation body 90 as a common conductive layer to serve as a substitute for the four inner displacement electrodes.

<<<Section 10. Modification Using Two Annular Deformation Bodies (Part 3)>>>

Figure 39:
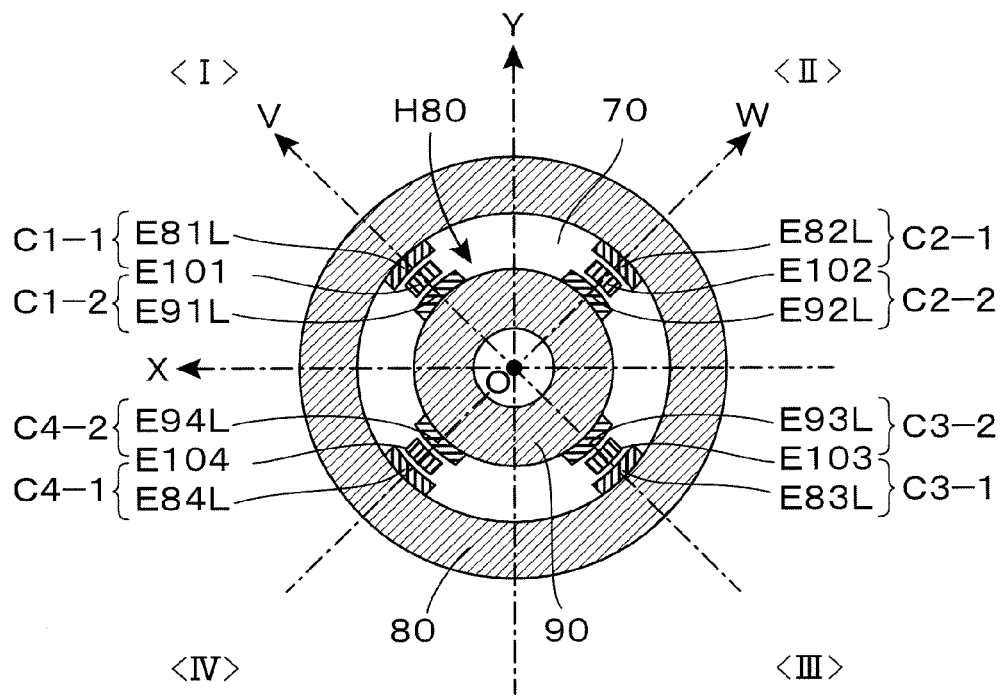
FIG. 39 is a sectional view along an XY plane of a torque sensor according to still another modification of the present invention using two annular deformation bodies.

FIG. 39 is a sectional view along an XY plane of a torque sensor according to still another modification of the present invention using two annular deformation bodies. This modification is an example in which one of the electrodes composing a capacitive element is a displacement electrode and the other electrode is a fixed electrode, and is, in this point, similar to the modification described in Section 8. In actuality, the basic structural section of the torque sensor according to this modification is exactly the same as that of the modification described in Section 8, and its exploded perspective view is as shown in FIG. 31. But, there is a slight difference from the modification described in Section 8 in the composition and arrangement of electrodes.

As shown in FIG. 39, at intersecting parts with the V-axis and W-axis in the inner peripheral surface of the outer annular deformation body 80, large-area outer displacement electrodes E81L, E82L, E83L, E84L are fixed, and at intersecting parts with the V-axis and W-axis in the outer peripheral surface of the inner annular deformation body 90, large-area inner displacement electrodes E91L, E92L, E93L, E94L are fixed. Moreover, at intermediate positions of these, four fixed electrodes E101, E102, E103, E104 fixed to the right side support body 70 are provided. These four fixed electrodes E101, E102, E103, E104 function as opposing electrodes to be opposed to the large-area outer displacement electrodes E81L, E82L, E83L, E84L and as opposing electrodes to be opposed to the large-area inner displacement electrodes E91L, E92L, E93L, E94L.

Here, for convenience of description, a capacitive element composed of the displacement electrode E81L and the fixed electrode E101 is provided as C1-1, while a capacitive element composed of the displacement electrode E91L and the fixed electrode E101 is provided as C1-2. A capacitive element composed of the displacement electrode E82L and the fixed electrode E102 is provided as C2-1, while a capacitive element composed of the displacement electrode E92L and the fixed electrode E102 is provided as C2-2. Similarly, a capacitive element composed of the displacement electrode E83L and the fixed electrode E103 is provided as C3-1, while a capacitive element composed of the displacement electrode E93L and the fixed electrode E103 is provided as C3-2, and a capacitive element composed of the displacement electrode E84L and the fixed electrode E104 is provided as C4-1, while a capacitive element composed of the displacement electrode E94L and the fixed electrode E104 is provided as C4-2. Consequently, a total of eight capacitive elements are provided.

The reason that the large-area outer displacement electrodes E81L, E82L, E83L, E84L and the large-area inner displacement electrodes E91L, E92L, E93L, E94L are respectively called "large-area electrodes" is because these are electrodes larger in area than the fixed electrodes E101, E102, E103, E104 interposed at intermediate positions. That is, the relationship between the large-area displacement electrodes E81L to E84L, E91L to E94L and the fixed electrodes E101 to E104 is the same as the relationship between the large-area electrodes EL and the small-area electrodes ES shown in FIGS. 22A and 22B, and the effective opposing area of each pair of electrodes composing a capacitive element does not change even when the relative positions of the large-area displacement electrodes E81L to E84L, E91L to E94L to the fixed electrodes E101 to E104 change. Therefore, changes in the capacitance value of the eight capacitive elements occur only due to changes in the interval of both opposed electrodes.

Figure 40:
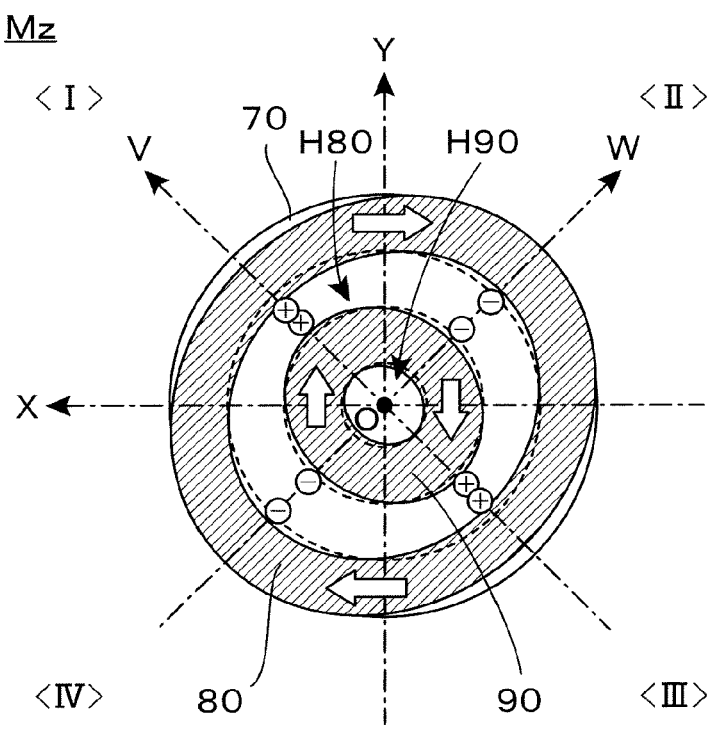
FIG. 40 is a sectional view along an XY plane showing a state when a forward torque (moment +Mz) about the Z-axis is exerted on the annular deformation bodies 80, 90, with a right side support body 70 loaded (the broken lines show a state before deformation, electrodes are not shown, and the positive or negative sign indicates an increase or decrease in the capacitance value of a capacitive element at that position).

Now, what kinds of changes occur in the capacitance value of the eight capacitive elements when six components are exerted on the torque sensor shown in FIG. 39 will be studied. FIG. 40 is a sectional view along an XY plane showing a state when a forward moment Mz about the Z-axis is exerted with regard to the torque sensor shown in FIG. 39. This forward moment Mz about the Z-axis is the very torque to be detected in the torque sensor. In FIG. 40, the electrodes are not shown to avoid complication of the figure. Instead thereof, a sign of "+" or "−" is placed at each of the disposing positions of the eight capacitive elements shown in FIG. 39. This sign indicates an increase or decrease in the capacitance value of the capacitive element disposed at that position. That is, the sign "+" indicates that the capacitance value increases, and the sign "−" indicates that the capacitance value decreases.

As shown in FIG. 40, when a forward moment Mz about the Z-axis is exerted on the annular deformation bodies 80, 90 from the left side support body 60, with the right side support body 70 loaded, the outer annular deformation body 80 is deformed into an ellipse having a long axis along the W-axis, and the inner annular deformation body 90 is deformed into an ellipse having a long axis along the V-axis. As a result, in all of the four capacitive elements C1-1, C1-2, C3-1, C3-2 disposed on the V-axis, the capacitance value increases as a result of a reduction in electrode interval, while in all of the four capacitive elements C2-1, C2-2, C4-1, C4-2 disposed on the W-axis, the capacitance value decreases as a result of an increase in electrode interval.

Figure 41:
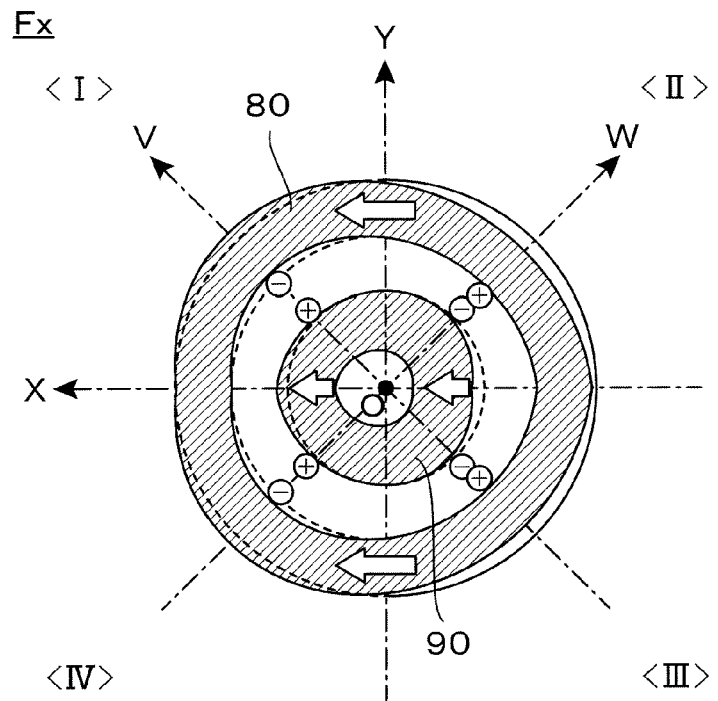
FIG. 41 is a sectional view along an XY plane showing a state when a force +Fx in a positive X-axis direction is exerted on the annular deformation bodies 80, 90, with the right side support body 70 loaded, with regard to the torque sensor shown in FIG. 39 (the broken lines show a state before deformation, electrodes are not shown, and the positive or negative sign indicates an increase or decrease in the capacitance value of a capacitive element at that position).

On the other hand, FIG. 41 is a sectional view along an XY plane showing a state when a force +Fx in a positive X-axis direction is exerted on the annular deformation bodies 80, 90 from a left side support body 60, with the right side support body 70 loaded, with regard to the torque sensor shown in FIG. 39. Such a mode of deformation occurs because a force +Fx from the left side support body 60 is applied to the outer annular deformation body 80 at both connection points on the Y-axis, with both connection points on the X-axis supported on the right side support body 70, while to the inner annular deformation body 90, a force +Fx from the left side support body 60 is applied at both connection points on the X-axis, with both connection points on the Y-axis supported on the right side support body 70.

Consequently, both in the outer annular deformation body 80 and the inner annular deformation body 90, the arc part located in the first quadrant I and the fourth quadrant IV expands to the outside, and the arc part located in the second quadrant II and the third quadrant III is caused to contract to the inside. As a result, in all of the four capacitive elements C1-1, C2-2, C3-2, C4-1, the capacitance value decreases as a result of an increase in the electrode interval, while in all of the four other capacitive elements C1-2, C2-1, C3-1, C4-2, the capacitance value increases as a result of a reduction in electrode interval.

Figure 42:
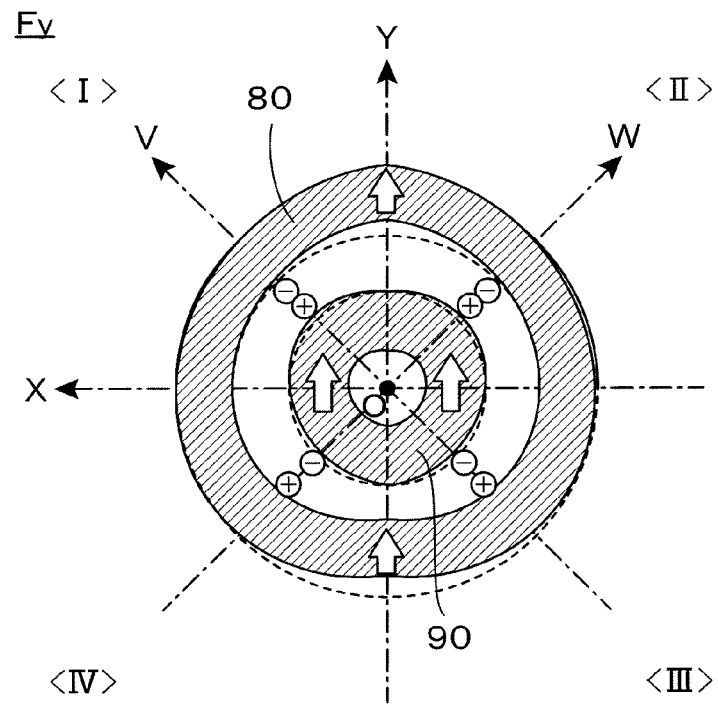
FIG. 42 is a sectional view along an XY plane showing a state when a force +Fy in a positive Y-axis direction is exerted on the annular deformation bodies 80, 90, with the right side support body 70 loaded, with regard to the torque sensor shown in FIG. 39 (the broken lines show a state before deformation, electrodes are not shown, and the positive or negative sign indicates an increase or decrease in the capacitance value of a capacitive element at that position).

FIG. 42 is a sectional view along an XY plane showing a state when a force +Fy in a positive Y-axis direction is exerted on the annular deformation bodies 80, 90 from the left side support body 60, with a right side support body 70 loaded, with regard to the torque sensor shown in FIG. 39. Such a mode of deformation occurs because a force +Fy from the left side support body 60 is applied to the outer annular deformation body 80 at both connection points on the Y-axis, with both connection points on the X-axis supported on the right side support body 70, while to the inner annular deformation body 90, a force +Fy from the left side support body 60 is applied at both connection points on the X-axis, with both connection points on the Y-axis supported on the right side support body 70.

Consequently, both in the outer annular deformation body 80 and the inner annular deformation body 90, the arc part located in the first quadrant I and the second quadrant II expands to the outside, and the arc part located in the third quadrant III and the fourth quadrant IV is caused to contract to the inside. As a result, in all of the four capacitive elements C1-1, C2-1, C3-2, C4-2, the capacitance value decreases as a result of an increase in electrode interval, while in all of the four other capacitive elements C1-2, C2-2, C3-1, C4-1, the capacitance value increases as a result of a reduction in electrode interval.

Figures 43, 44:
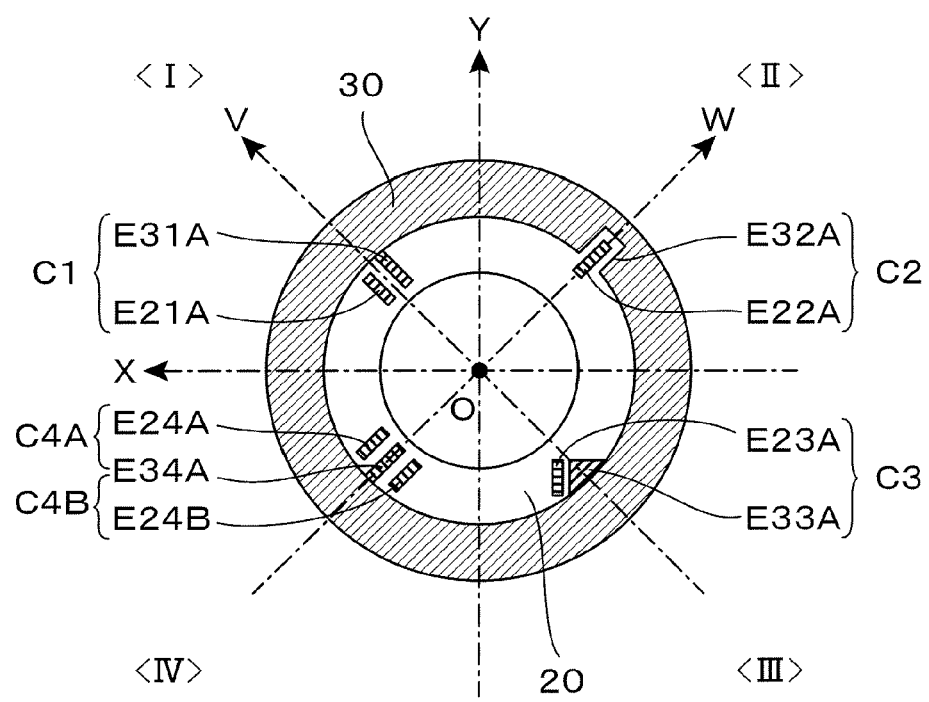
FIG. 43 is a table showing the mode of changes in the capacitance value of the eight capacitive elements when forces in the coordinate axis directions and moments about the coordinate axes are exerted on the annular deformation bodies 80, 90, with the right side support body 70 loaded, with regard to the torque sensor shown in FIG. 39.
FIG. 44 is a sectional view along an XY plane showing a still another electrode configuration of a torque sensor according to the present invention.

FIG. 43 is a table showing the mode of changes in the capacitance value of the eight capacitive elements when forces in the coordinate axis directions and moments about the coordinate axes are exerted on the annular deformation bodies 80, 90 from the left side support body 60, with the right side support body 70 loaded, with regard to the torque sensor shown in FIG. 39. Here, the results "+," "−" in the cells of Mz, Fx, and Fy correspond to the results shown in FIG. 40 to FIG. 42. Moreover, the reason that all Fz cells show 0 is because, when a force Fz in the Z-axis direction is exerted, the annular deformation bodies 80, 90 are displaced in the Z-axis direction, but no change occurs in the interval of opposed electrodes. Moreover, the reason that all Mx and My cells show 0 is because the interval of a pair of electrodes composing a capacitive element is reduced in a part and is increased in another part, so that no change in capacitance value occurs in total.

When the results shown in the table of FIG. 43 are taken into consideration, a moment Mz (torque to be detected) about the Z-axis can be determined, if the capacitance value of each capacitive element is expressed by the same symbol as that of the capacitive element, by a difference operation based on the following expression:

$$Mz = ((C1\text{-}1) + (C1\text{-}2) + (C3\text{-}1) + (C3\text{-}2)) - ((C2\text{-}1) + (C2\text{-}2) + (C4\text{-}1) + (C4\text{-}2))$$

Furthermore, if the shapes and arrangement of electrodes composing the capacitive elements maintain symmetry with respect to an XZ plane and a YZ plane, fluctuations in the capacitance value of the capacitive elements produced by exertion of a force Fx or a force Fy can be canceled out by the above-described difference operation, so that even when there is a force Fx or a force Fy exerted, the detection value of a moment Mz about the Z-axis obtained by the above-described difference operation is an accurate value without interference of other axis components (because all Fz, Mx, and My cells show 0, these components originally cause no interference).

Further, when the results shown in the table of FIG. 43 are taken into consideration, detection of not only a moment Mz about the Z-axis but forces Fx, Fy can also be performed. That is, the force Fx can be determined by a difference operation based on the following expression:

$$Fx=((C1\text{-}2)+(C2\text{-}1)+(C3\text{-}1)+(C4\text{-}2))-((C1\text{-}1)+(C2\text{-}2)+(C3\text{-}2)+(C4\text{-}1))$$

The force Fy can be determined by a difference operation based on the following expression:

$$Fy=((C1\text{-}2)+(C2\text{-}2)+(C3\text{-}1)+(C4\text{-}1))-((C1\text{-}1)+(C2\text{-}1)+(C3\text{-}2)+(C4\text{-}2))$$

In actuality, as shown in the detector circuit of FIG. 21, the capacitance values are converted by the C/V converters to the voltage values, and these voltage values are used to perform operations.

Thus, the sensor according to the example shown in FIG. 39 can fulfill a function as a torque sensor for detecting torque about the Z-axis as well as fulfill a function as a force sensor for detecting a force Fx in the X-axis direction and a force Fy in the Y-axis direction. However, with regard to detection of the forces Fx, Fy, even if the shapes and arrangement of electrodes composing the capacitive elements maintain symmetry with respect to an XZ plane and a YZ plane, with interference of other axis components, the absolute value of an increment in capacitance value and the absolute value of a decrement are not always equal in the above-described difference operation expressions, so that the other axis components are detected as an error.

<<<Section 11. Other Modifications>>>

Finally, still other modifications of the present invention will be enumerated.

(1) In the aforementioned examples, an example using as an annular deformation body a member that shows a circular annular shape in an unloaded state where no torque is exerted has been mentioned, but the annular deformation body to be used for a torque sensor according to the present invention is not necessarily in a circular annular shape. For example, an octagonal annular deformation body can also be used. But, practically, it is preferable to use a circular annular-shaped annular deformation body. Moreover, the shape of the left side support body and right side support body can be any shape as long as these can support the annular deformation body from the left and right sides. But, practically, it is preferable to use a left side support body and a right side support body having the same shape as the outer shape of the annular deformation body because the overall shape of the basic structural section can be simplified.

(2) In the aforementioned examples, a structure of setting connection points at two sites of a left side surface of an annular deformation body and connecting the connection points to a left side support body, and setting connecting points at two sites of a right side surface of the annular deformation body and connecting the connection points to a right side support body has been adopted. But the connection points to each of the left and right support bodies are not necessarily at two sites, and may be provided at three sites or more. Alternatively, a structure of connecting at one site each on the left and right sides can also be adopted. But, because it is necessary to deform the annular deformation body in part by exertion of torque, it is necessary to set the left and right connection points at different positions. More precisely, it is necessary that an orthogonal projection image of a left side connection point and an orthogonal projection image of a right side connection point with respect to a plane of projection orthogonal to the rotation axis are formed at different positions.

(3) In the aforementioned examples, a structure of using, as a left side connection member to be connected to the connection point on the left side surface of the annular deformation body, a projecting portion projecting rightward from the right side surface of the left side support body, using, as a right side connection member to be connected to the connection point on the right side surface of the annular deformation body, a projecting portion projecting leftward from the left side surface of the right side support body, and joining the top surfaces of the projecting portions to the connection points of the annular deformation body has been adopted. However, it is not always necessary to use a projecting portion projecting from a side surface of a support body for each connection member, but any member may be used as a connection member as long as it has a function of connecting the connection point of the annular deformation body to each support body.

(4) In the basic structural section described in Section 1, on the left-hand side surface of the annular deformation body 30, the first left side connection point P11 and the second left side connection point P12 are set, at the position of the first left side connection point P11, the first left side connection member (projecting portion 11) for connection to the left side support body 10 is joined, and at the position of the second left side connection point P12, the second left side connection member (projecting portion 12) for connection to the left side support body 10 is joined. Similarly, on the right-hand side surface of the annular deformation body 30, the first right side connection point P21 and the second right side connection point P22 are set, at the position of the first right side connection point P21, the first right side connection member (projecting portion 21) for connection to the right side support body 20 is joined, and at the position of the second right side connection point P22, the second right side connection member (projecting portion 22) for connection to the right side support body 20 is joined.

Further, as shown in FIG. 7, when two mutually orthogonal straight lines (that is, the X-axis and Y-axis) to pass through a projected point (that is, the origin O) of the rotation axis (Z-axis) are drawn on an XY plane used as a plane of projection, orthogonal projection images of the first left side connection point P11 and the second left side connection point P12 are disposed on the first straight line (Y-axis), and orthogonal projection images of the first right side connection point P21 and the second right side connection point P22 are disposed on the second straight line (X-axis). When such an arrangement is adopted, the annular deformation body 30 can be deformed into an ellipse with axial symmetry, so that a detection value with axial symmetry can be obtained.

However, it is not always necessary to locate the four connection points P11 to P22 on the X-axis or Y-axis accurately. That is, when orthogonal projection images of the annular deformation body 30 are obtained on an XY plane, if the orthogonal projection images of the connection points are disposed on an annular path along the outline of the annular deformation body 30 in an order of the first left side connection point P11, the first right side connection point P21, the second left side connection point P12, and the second right side connection point P22, that is, so that the left side connection points and the right side connection points are disposed alternately along the annular path, respective portions of the annular deformation body 30 can be deformed by exertion of torque.

(5) In the torque sensor according to the present invention, the relationship between the magnitude of exerted torque and the amount of displacement of the respective portions of the annular deformation body 30 is not always a linear relationship. Therefore, when it is necessary to obtain a detection value accurately proportional to the magnitude of exerted torque, it suffices to prepare a correction table such as to convert to a linear detection value a voltage value output to, for example, the output terminal T1 of the detector circuit shown in FIG. 15 or the output terminal T2 of the detector circuit shown in FIG. 21 so that a linear detection value converted by use of the correction table is output.

(6) In the detector circuit shown in FIG. 15 and the detector circuit shown in FIG. 21, an operation unit for analog voltage is used, but of course, an analog voltage value V converted by a C/V converter may be converted into a digital signal by using an A/D converter so as to determine a detection value by a digital operation.

(7) In the aforementioned embodiment, a description has been given of an example using electrodes having shapes and an arrangement along the inner peripheral surface or outer peripheral surface of the annular deformation body 30, 80, 90 as a fixed electrode and a displacement electrode composing a capacitive element so that radial displacement of the annular deformation body 30, 80, 90 can be efficiently detected. However, if a moment (torque) about the Z-axis and a force Fx in the X-axis direction or a force Fy in the Y-axis direction are exerted on the basic structural section of the torque sensor according to the present invention, as can be understood also from the modes of deformation shown in FIG. 40 to FIG. 42, the annular deformation body is displaced also in the tangential direction (circumferential direction). Therefore, the fixed electrode and displacement electrode composing a capacitive element are not necessarily provided as electrodes having shapes and an arrangement along the inner peripheral surface or outer peripheral surface of the annular deformation body, and may be provided as electrodes having shapes and an arrangement suitable for detection of displacement in the tangential direction (circumferential direction) of the annular deformation body.

FIG. 44 is a sectional view along an XY plane showing a still another electrode configuration of a torque sensor according to the present invention. Here, for convenience of description, an example in which various modes of electrodes are used for the same torque sensor is shown. For example, in the first quadrant I, an example of a capacitive element C1 composed of a displacement electrode E31A and a fixed electrode E21A along the radial direction of the annular deformation body 30 is shown. Moreover, in the second quadrant II, an example of a capacitive element C2 composed of a fixed electrode E22A along the radial direction of the annular deformation body 30 and a wall surface E32A of a groove portion cut in the inner peripheral surface of the annular deformation body 30 is shown. In this case, it is necessary to prepare the annular deformation body 30 itself made of a conductive material or to form a conductive film on the wall surface E32A of the groove portion.

Moreover, in the third quadrant III, an example in which a protrusion having a triangular section is provided on the inner peripheral surface of the annular deformation body 30 as a displacement electrode E33A, a fixed electrode E23A is disposed at a position opposed to an inclined surface of the projection, and a capacitive element C3 composed of both electrodes is provided is shown. Further, in the fourth quadrant IV, an example in which provided is a displacement electrode E34A along the radial direction of the annular deformation body 30 and provided are fixed electrodes E24A, E24B on both sides of the displacement electrode E34A, respectively, is shown. In this case, the displacement electrode E34A and the fixed electrode E24A compose a first capacitive element C4A, and the displacement electrode E34A and the fixed electrode E24B compose a second capacitive element C4B.

It can be said that the capacitive elements C1 to C4B shown in FIG. 44 are all capacitive elements suitable for detection of displacement in the tangential direction (circumferential direction) of the annular deformation body 30. Of course, also for the embodiment using the outer annular deformation body 80 and the inner annular deformation body 90, a capacitive element suitable for detection of displacement in the tangential direction (circumferential direction) as exemplified in FIG. 44 can be used. Moreover, the sensor shown in FIG. 44 can detect not only torque but also forces Fx, Fy. In FIG. 44, for convenience of description, an example in which four different types of capacitive elements are disposed in the quadrants is shown, however, of course, the same type of capacitive elements may be disposed at four sites, and an appropriate combination of various types of capacitive elements may be disposed at four sites.

INDUSTRIAL APPLICABILITY

A torque sensor according to the present invention can be used for measuring torque in a variety of industrial equipment by taking advantage of being small sized and having high rigidity and a simple structure. In particular, in industrial equipment for performing automatic assembly by use of a robot arm, it is optimal for use to be integrated into a joint part of the arm, monitoring a force generated at a tip portion of the arm, and controlling the same.

The invention claimed is:
1. A torque sensor for detecting torque about a predetermined rotation axis, comprising:
an annular deformation body made of a material that produces elastic deformation due to exertion of torque to be detected, having a through-opening portion through which the rotation axis is inserted;
a left side support body disposed at a position adjacent to a left side of the annular deformation body, when viewed in such a reference observation direction that the rotation axis creates a horizontal line extending left and right;
a right side support body disposed at a position adjacent to a right side of the annular deformation body, when viewed in the reference observation direction;
a left side connection member for connecting a left side connection point on a left-hand side surface of the annular deformation body to the left side support body;
a right side connection member for connecting a right side connection point on a right-hand side surface of the annular deformation body to the right side support body;
a displacement electrode fixed to an inner peripheral surface or an outer peripheral surface of the annular deformation body, for producing displacement caused by elastic deformation of the annular deformation body;

a fixed electrode disposed at a position opposed to the displacement electrode, fixed to the left side support body or the right side support body; and a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein an orthogonal projection image of the left side connection point and an orthogonal projection image of the right side connection point with respect to a plane of projection orthogonal to the rotation axis are formed at different positions;

the displacement electrode is constructed by a conductive layer formed on an inner peripheral surface of the annular deformation body; and the fixed electrode is constructed by a conductive plate disposed at a position opposed to the conductive layer and projecting in a direction along the rotation axis from the left side support body or the right side support body.

2. A torque sensor for detecting torque about a predetermined rotation axis, comprising:

an annular deformation body made of a material that produces elastic deformation due to exertion of torque to be detected, having a through-opening portion through which the rotation axis is inserted;

a left side support body disposed at a position adjacent to a left side of the annular deformation body, when viewed in such a reference observation direction that the rotation axis creates a horizontal line extending left and right;

a right side support body disposed at a position adjacent to a right side of the annular deformation body, when viewed in the reference observation direction;

a left side connection member for connecting a left side connection point on a left-hand side surface of the annular deformation body to the left side support body;

a right side connection member for connecting a right side connection point on a right-hand side surface of the annular deformation body to the right side support body;

a displacement electrode fixed to an inner peripheral surface or an outer peripheral surface of the annular deformation body, for producing displacement caused by elastic deformation of the annular deformation body;

a fixed electrode disposed at a position opposed to the displacement electrode, fixed to the left side support body or the right side support body; and a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein an orthogonal projection image of the left side connection point and an orthogonal projection image of the right side connection point with respect to a plane of projection orthogonal to the rotation axis are formed at different positions;

said torque sensor includes a first displacement electrode fixed to, out of respective parts of the annular deformation body, a first part that is displaced in a direction to approach the rotation axis when torque in a predetermined rotating direction is exerted, a second displacement electrode fixed to a second part that is displaced in a direction to separate from the rotation axis when torque in the predetermined rotating direction is exerted, a first fixed electrode disposed at a position opposed to the first displacement electrode, and a second fixed electrode disposed at a position opposed to the second displacement electrode; and the detector circuit outputs an electrical signal corresponding to a difference between a capacitance value of a first capacitive element composed of the first displacement electrode and the first fixed electrode and a capacitance value of a second capacitive element composed of the second displacement electrode and the second fixed electrode as an electrical signal indicating exerted torque.

3. The torque sensor according to claim 2, wherein mutually opposed displacement electrodes and fixed electrodes are disposed offset from each other so that, when torque in a predetermined rotating direction is exerted, an effective opposing area of a pair of electrodes composing a capacitive element an electrode interval of which is reduced is increased, and an effective opposing area of a pair of electrodes composing a capacitive element an electrode interval of which is increased is reduced.

4. A torque sensor for detecting torque about a predetermined rotation axis, comprising:

an annular deformation body made of a material that produces elastic deformation due to exertion of torque to be detected, having a through-opening portion through which the rotation axis is inserted;

a left side support body disposed at a position adjacent to a left side of the annular deformation body, when viewed in such a reference observation direction that the rotation axis creates a horizontal line extending left and right;

a right side support body disposed at a position adjacent to a right side of the annular deformation body, when viewed in the reference observation direction;

a left side connection member for connecting a left side connection point on a left-hand side surface of the annular deformation body to the left side support body;

a right side connection member for connecting a right side connection point on a right-hand side surface of the annular deformation body to the right side support body;

a displacement electrode fixed to an inner peripheral surface or an outer peripheral surface of the annular deformation body, for producing displacement caused by elastic deformation of the annular deformation body;

a fixed electrode disposed at a position opposed to the displacement electrode, fixed to the left side support body or the right side support body; and a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein an orthogonal projection image of the left side connection point and an orthogonal projection image of the right side connection point with respect to a plane of projection orthogonal to the rotation axis are formed at different positions; and an area of one of fixed electrode and displacement electrode is set larger than that of the other so that, even when a relative position of the displacement electrode to the fixed electrode changes as a result of exertion of torque in a predetermined rotating direction, an effective opposing area of a pair of electrodes composing a capacitive element does not change.

5. A torque sensor for detecting torque about a predetermined rotation axis, comprising:
an annular deformation body made of a material that produces elastic deformation due to exertion of torque to be detected, having a through-opening portion through which the rotation axis is inserted;
a left side support body disposed at a position adjacent to a left side of the annular deformation body, when viewed in such a reference observation direction that the rotation axis creates a horizontal line extending left and right;
a right side support body disposed at a position adjacent to a right side of the annular deformation body, when viewed in the reference observation direction;
a left side connection member for connecting a left side connection point on a left-hand side surface of the annular deformation body to the left side support body;
a right side connection member for connecting a right side connection point on a right-hand side surface of the annular deformation body to the right side support body;
a displacement electrode fixed to an inner peripheral surface or an outer peripheral surface of the annular deformation body, for producing displacement caused by elastic deformation of the annular deformation body;
a fixed electrode disposed at a position opposed to the displacement electrode, fixed to the left side support body or the right side support body; and
a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein
an orthogonal projection image of the left side connection point and an orthogonal projection image of the right side connection point with respect to a plane of projection orthogonal to the rotation axis are formed at different positions; and
said torque sensor further comprises:
an inner annular deformation body made of a material that produces elastic deformation due to exertion of torque to be detected, having a through-opening portion through which the rotation axis is inserted, disposed inside of the annular deformation body;
an inner left side connection member for connecting an inner left side connection point on a left-hand side surface of the inner annular deformation body to the left side support body;
an inner right side connection member for connecting an inner right side connection point on a right-hand side surface of the inner annular deformation body to the right side support body;
an inner displacement electrode fixed to an inner peripheral surface or an outer peripheral surface of the inner annular deformation body, for producing displacement caused by elastic deformation of the inner annular deformation body; and
an inner fixed electrode disposed at a position opposed to the inner displacement electrode, fixed to the left side support body or the right side support body, wherein
an orthogonal projection image of the inner left side connection point and an orthogonal projection image of the inner right side connection point with respect to a plane of projection orthogonal to the rotation axis are formed at different positions; and the detector circuit outputs an electrical signal indicating torque about the rotation axis by further using an amount of fluctuation in capacitance value of a capacitive element composed of the inner displacement electrode and the inner fixed electrode.

6. A torque sensor for detecting torque about a predetermined rotation axis, comprising:
an annular deformation body made of a material that produces elastic deformation due to exertion of torque to be detected, having a through-opening portion through which the rotation axis is inserted;
a left side support body disposed at a position adjacent to a left side of the annular deformation body, when viewed in such a reference observation direction that the rotation axis creates a horizontal line extending left and right;
a right side support body disposed at a position adjacent to a right side of the annular deformation body, when viewed in the reference observation direction;
a left side connection member for connecting a left side connection point on a left-hand side surface of the annular deformation body to the left side support body;
a right side connection member for connecting a right side connection point on a right-hand side surface of the annular deformation body to the right side support body;
a displacement electrode fixed to an inner peripheral surface or an outer peripheral surface of the annular deformation body, for producing displacement caused by elastic deformation of the annular deformation body;
a fixed electrode disposed at a position opposed to the displacement electrode, fixed to the left side support body or the right side support body; and
a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein
an orthogonal projection image of the left side connection point and an orthogonal projection image of the right side connection point with respect to a plane of projection orthogonal to the rotation axis are formed at different positions;
for detecting torque about a Z-axis in an XYZ three-dimensional coordinate system, the annular deformation body is disposed on an XY plane about an origin O, the left side support body is disposed in a negative Z-axis region, and the right side support body is disposed in a positive Z-axis region;
a first left side connection point and a second left side connection point are provided on a negative Z-axis-side side surface of the annular deformation body;
the left side connection member includes a first left side connection member for connecting the first left side connection point to the left side support body and a second left side connection member for connecting the second left side connection point to the left side support body;
a first right side connection point and a second right side connection point are provided on a positive Z-axis-side side surface of the annular deformation body;
the right side connection member includes a first right side connection member for connecting the first right side connection point to the right side support body and a second right side connection member for connecting the second right side connection point to the right side support body;

when orthogonal projection images are obtained by projecting both side surfaces of the annular deformation body on the XY plane, a projection image of the first right side connection point is disposed on a positive X-axis, a projection image of the second right side connection point is disposed on a negative X-axis, a projection image of the first left side connection point is disposed on a positive Y-axis, and a projection image of the second left side connection point is disposed on a negative Y-axis;

the annular deformation body is made of a circular annular member that is obtained by forming, in a central portion of a disk disposed about the Z-axis as a central axis, a through-opening portion being in a shape of a concentric disk having a smaller diameter; and said torque sensor includes, when a V-axis and a W-axis that pass though the origin O and create 45 degrees with respect to the X-axis and Y-axis are defined on the XY plane, a first displacement electrode and a first fixed electrode disposed on the V-axis and a second displacement electrode and a second fixed electrode disposed on the W-axis, wherein the detector circuit outputs an electrical signal corresponding to a difference between a capacitance value of a first capacitive element composed of the first displacement electrode and the first fixed electrode and a capacitance value of a second capacitive element composed of the second displacement electrode and the second fixed electrode as an electrical signal indicating exerted torque.

7. The torque sensor according to claim 6, wherein when an outline of an orthogonal projection image of the annular deformation body onto the XY plane changes from a circle to an ellipse due to exertion of torque in a predetermined rotating direction, the V-axis is set in a short-axis direction of the ellipse, and the W-axis is set in a long-axis direction thereof, and with no torque exerted, a position of the first fixed electrode is shifted by a predetermined offset amount in the predetermined rotating direction relative to a position of the first displacement electrode, and a position of the second fixed electrode is shifted by a predetermined offset amount in a direction opposite to the predetermined rotating direction relative to a position of the second displacement electrode.

8. A torque sensor for detecting torque about a predetermined rotation axis, comprising:

an annular deformation body made of a material that produces elastic deformation due to exertion of torque to be detected, having a through-opening portion through which the rotation axis is inserted;

a left side support body disposed at a position adjacent to a left side of the annular deformation body, when viewed in such a reference observation direction that the rotation axis creates a horizontal line extending left and right;

a right side support body disposed at a position adjacent to a right side of the annular deformation body, when viewed in the reference observation direction;

a left side connection member for connecting a left side connection point on a left-hand side surface of the annular deformation body to the left side support body;

a right side connection member for connecting a right side connection point on a right-hand side surface of the annular deformation body to the right side support body;

a displacement electrode fixed to an inner peripheral surface or an outer peripheral surface of the annular deformation body, for producing displacement caused by elastic deformation of the annular deformation body;

a fixed electrode disposed at a position opposed to the displacement electrode, fixed to the left side support body or the right side support body; and a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein an orthogonal projection image of the left side connection point and an orthogonal projection image of the right side connection point with respect to a plane of projection orthogonal to the rotation axis are formed at different positions;

for detecting torque about a Z-axis in an XYZ three-dimensional coordinate system, the annular deformation body is disposed on an XY plane about an origin O, the left side support body is disposed in a negative Z-axis region, and the right side support body is disposed in a positive Z-axis region;

a first left side connection point and a second left side connection point are provided on a negative Z-axis-side side surface of the annular deformation body;

the left side connection member includes a first left side connection member for connecting the first left side connection point to the left side support body and a second left side connection member for connecting the second left side connection point to the left side support body;

a first right side connection point and a second right side connection point are provided on a positive Z-axis-side side surface of the annular deformation body;

the right side connection member includes a first right side connection member for connecting the first right side connection point to the right side support body and a second right side connection member for connecting the second right side connection point to the right side support body;

when orthogonal projection images are obtained by projecting both side surfaces of the annular deformation body on the XY plane, a projection image of the first right side connection point is disposed on a positive X-axis, a projection image of the second right side connection point is disposed on a negative X-axis, a projection image of the first left side connection point is disposed on a positive Y-axis, and a projection image of the second left side connection point is disposed on a negative Y-axis;

the annular deformation body is made of a circular annular member that is obtained by forming, in a central portion of a disk disposed about the Z-axis as a central axis, a through-opening portion being in a shape of a concentric disk having a smaller diameter; and said torque sensor includes, when signed V- and W-axes that pass through the origin O and create 45 degrees with respect to the X-axis and Y-axis are defined on the XY plane, a first displacement electrode and a first fixed electrode disposed on the positive V-axis, a second displacement electrode and a second fixed electrode disposed on the positive W-axis, a third displacement electrode and a third fixed electrode disposed on the negative V-axis, and a fourth displacement electrode and a fourth fixed electrode disposed on the negative W-axis, wherein the detector circuit outputs an electrical signal corresponding to a difference between "a sum of a capacitance value of a first capacitive element composed of the first displacement electrode and the first fixed electrode and a capacitance value of a third capacitive element composed of the third displacement electrode and the third fixed electrode" and "a sum of a capacitance value of a second capacitive element composed of the second displacement electrode and the second fixed electrode and a capacitance value of a fourth capacitive element composed of the fourth displacement electrode and the fourth fixed electrode" as an electrical signal indicating exerted torque.

9. The torque sensor according to claim 8, wherein
when an outline of an orthogonal projection image of the annular deformation body onto the XY plane changes from a circle to an ellipse due to exertion of torque in a predetermined rotating direction, the V-axis is set in a short-axis direction of the ellipse, and the W-axis is set in a long-axis direction thereof, and
with no torque exerted, a position of the first fixed electrode is shifted by a predetermined offset amount in the predetermined rotating direction relative to a position of the first displacement electrode, a position of the second fixed electrode is shifted by a predetermined offset amount in a direction opposite to the predetermined rotating direction relative to a position of the second displacement electrode, a position of the third fixed electrode is shifted by a predetermined offset amount in the predetermined rotating direction relative to a position of the third displacement electrode, and a position of the fourth fixed electrode is shifted by a predetermined offset amount in a direction opposite to the predetermined rotating direction relative to a position of the fourth displacement electrode.

10. The torque sensor according to claim 6, wherein
an area of one of the fixed electrode and displacement electrode is set larger than that of the other so that, even when a relative position of the displacement electrode to the fixed electrode changes as a result of exertion of torque in a predetermined rotating direction, an effective opposing area of a pair of electrodes composing a capacitive element does not change.

11. The torque sensor according to claim 10, wherein
displacement electrodes are constructed by a common conductive layer formed on an inner peripheral surface of the annular deformation body.

12. The torque sensor according to claim 11, wherein
the annular deformation body is constructed by a conductive elastic material so as to use an inner peripheral surface itself of the annular deformation body as a common conductive layer.

13. A torque sensor for detecting torque about a predetermined rotation axis, comprising:
an annular deformation body made of a material that produces elastic deformation due to exertion of torque to be detected, having a through-opening portion through which the rotation axis is inserted;
a left side support body disposed at a position adjacent to a left side of the annular deformation body, when viewed in such a reference observation direction that the rotation axis creates a horizontal line extending left and right;
a right side support body disposed at a position adjacent to a right side of the annular deformation body, when viewed in the reference observation direction;
a left side connection member for connecting a left side connection point on a left-hand side surface of the annular deformation body to the left side support body;
a right side connection member for connecting a right side connection point on a right-hand side surface of the annular deformation body to the right side support body;
a displacement electrode fixed to an inner peripheral surface or an outer peripheral surface of the annular deformation body, for producing displacement caused by elastic deformation of the annular deformation body;
a fixed electrode disposed at a position opposed to the displacement electrode, fixed to the left side support body or the right side support body; and
a detector circuit for outputting an electrical signal indicating torque about the rotation axis exerted on one of the right side support body and the left side support body with the other loaded, based on an amount of fluctuation in capacitance value of a capacitive element composed of the displacement electrode and the fixed electrode; wherein
an orthogonal projection image of the left side connection point and an orthogonal projection image of the right side connection point with respect to a plane of projection orthogonal to the rotation axis are formed at different positions;
for detecting torque about a Z-axis in an XYZ three-dimensional coordinate system, the annular deformation body is disposed on an XY plane about an origin O, the left side support body is disposed in a negative Z-axis region, and the right side support body is disposed in a positive Z-axis region;
a first left side connection point and a second left side connection point are provided on a negative Z-axis-side side surface of the annular deformation body;
the left side connection member includes a first left side connection member for connecting the first left side connection point to the left side support body and a second left side connection member for connecting the second left side connection point to the left side support body;
a first right side connection point and a second right side connection point are provided on a positive Z-axis-side side surface of the annular deformation body;
the right side connection member includes a first right side connection member for connecting the first right side connection point to the right side support body and a second right side connection member for connecting the second right side connection point to the right side support body; and
when orthogonal projection images are obtained by projecting both side surfaces of the annular deformation body on the XY plane, a projection image of the first right side connection point is disposed on a positive X-axis, a projection image of the second right side connection point is disposed on a negative X-axis, a projection image of the first left side connection point is disposed on a positive Y-axis, and a projection image of the second left side connection point is disposed on a negative Y-axis;
said torque sensor further comprises an inner annular deformation body made of a material that produces elastic deformation due to exertion of torque to be detected, having a through-opening portion through which the Z-axis is inserted, disposed on the XY plane about the origin O so as to be located inside of the annular deformation body;

a first inner left side connection point and a second inner left side connection point being provided on a negative Z-axis-side side surface of the inner annular deformation body; and a first inner right side connection point and a second inner right side connection point being provided on a positive Z-axis-side side surface of the inner annular deformation body, and further comprising:

a first inner left side connection member for connecting the first inner left side connection point to the left side support body, a second inner left side connection member for connecting the second inner left side connection point to the left side support body, a first inner right side connection member for connecting the first inner right side connection point to the right side support body, a second inner right side connection member for connecting the second inner right side connection point to the right side support body;

an inner displacement electrode fixed to an inner peripheral surface or an outer peripheral surface of the inner annular deformation body, for producing displacement caused by elastic deformation of the inner annular deformation body; and an inner fixed electrode disposed at a position opposed to the inner displacement electrode, fixed to the left side support body or the right side support body; wherein when orthogonal projection images are obtained by projecting both side surfaces of the inner annular deformation body on the XY plane, a projection image of the first inner right side connection point is disposed on a positive Y-axis, a projection image of the second inner right side connection point is disposed on a negative Y-axis, a projection image of the first inner left side connection point is disposed on a positive X-axis, and a projection image of the second inner left side connection point is disposed on a negative X-axis; and the detector circuit outputs an electrical signal indicating torque about the rotation axis by further using an amount of fluctuation in capacitance value of a capacitive element composed of the inner displacement electrode and the inner fixed electrode.

14. The torque sensor according to claim 1, wherein a first left side connection point and a second left side connection point are provided on the left-hand side surface of the annular deformation body;

the left side connection member includes a first left side connection member for connecting the first left side connection point to the left side support body and a second left side connection member for connecting the second left side connection point to the left side support body;

a first right side connection point and a second right side connection point are provided on the right-hand side surface of the annular deformation body;

the right side connection member includes a first right side connection member for connecting the first right side connection point to the right side support body and a second right side connection member for connecting the second right side connection point to the right side support body; and when orthogonal projection images are obtained by projecting the annular deformation body on a plane of projection orthogonal to the rotation axis, the orthogonal projection images of the connection points are disposed on an annular path along an outline of the annular deformation body in an order of the first left side connection point, the first right side connection point, the second left side connection point, and the second right side connection point.

15. The torque sensor according to claim 14, wherein when two mutually orthogonal straight lines to pass through a projection point of the rotation axis are drawn on the plane of projection orthogonal to the rotation axis, the orthogonal projection images of the first left side connection point and the second left side connection point are disposed on a first straight line, and the orthogonal projection images of the first right side connection point and the second right side connection point are disposed on a second straight line.

16. The torque sensor according to claim 1, wherein as the left side support body and the right side support body, annular structures each having a through-opening portion at a center portion are used, and an insertion hole that penetrates through the through-opening portions of the left side support body, the annular deformation body, and the right side support body is secured along the rotation axis.

17. The torque sensor according to claim 1, wherein the annular deformation body is made of a circular annular member that is obtained by forming, in a central portion of a disk disposed about the rotation axis as a central axis, a through-opening portion being in a shape of a concentric disk having a smaller diameter.

18. The torque sensor according to claim 1, wherein the left side support body and the right side support body are made of circular annular members each of which is obtained by forming, in a central portion of a disk disposed about the rotation axis as a central axis, a through-opening portion being in a shape of a concentric disk having a smaller diameter.

19. A torque sensor for detecting torque about a predetermined rotation axis, comprising:

an outer annular deformation body made of a material that produces elastic deformation due to exertion of torque to be detected, having a through-opening portion through which the rotation axis is inserted;

an inner annular deformation body made of a material that produces elastic deformation due to exertion of torque to be detected, having a through-opening portion through which the rotation axis is inserted, disposed inside of the outer annular deformation body;

a left side support body disposed at a position adjacent to a left side of the outer annular deformation body and the inner annular deformation body, when viewed in such a reference observation direction that the rotation axis creates a horizontal line extending left and right;

a right side support body disposed at a position adjacent to a right side of the outer annular deformation body and the inner annular deformation body, when viewed in the reference observation direction;

an outer left side connection member for connecting an outer left side connection point on a left-hand side surface of the outer annular deformation body to the left side support body;

an outer right side connection member for connecting an outer right side connection point on a right-hand side surface of the outer annular deformation body to the right side support body;

an inner left side connection member for connecting an inner left side connection point on a left-hand side surface of the inner annular deformation body to the left side support body;

an inner right side connection member for connecting an inner right side connection point on a right-hand side surface of the inner annular deformation body to the right side support body;

an outer displacement electrode fixed to an inner peripheral surface of the outer annular deformation body, for producing displacement caused by elastic deformation of the outer annular deformation body;

an inner displacement electrode fixed to an outer peripheral surface of the inner annular deformation body so as to be opposed to the outer displacement electrode, for producing displacement caused by elastic deformation of the inner annular deformation body; and a detector circuit for outputting an electrical signal indicating torque about the rotation axis exerted on one of the right side support body and the left side support body with the other loaded, based on an amount of fluctuation in capacitance value of a capacitive element composed of the outer displacement electrode and the inner displacement electrode, wherein with respect to a plane of projection orthogonal to the rotation axis, an orthogonal projection image of the outer left side connection point and an orthogonal projection image of the outer right side connection point are formed at different positions, and an orthogonal projection image of the inner left side connection point and an orthogonal projection image of the inner right side connection point are formed at different positions.

20. A torque sensor for detecting torque about a Z-axis in an XYZ three-dimensional coordinate system, comprising:

an outer annular deformation body made of a material that produces elastic deformation due to exertion of torque to be detected, having a through-opening portion through which the Z-axis is inserted, disposed on an XY plane about an origin O;

an inner annular deformation body made of a material that produces elastic deformation due to exertion of torque to be detected, having a through-opening portion through which the Z-axis is inserted, disposed on the XY plane about the origin O and disposed within the through-opening portion of the outer annular deformation body;

a left side support body disposed at a position adjacent to a negative Z-axis region side of the outer annular deformation body and the inner annular deformation body; and a right side support body disposed at a position adjacent to a positive Z-axis region side of the outer annular deformation body and the inner annular deformation body, a first outer left side connection point and a second outer left side connection point being provided on a negative Z-axis-side side surface of the outer annular deformation body, and a first outer right side connection point and a second outer right side connection point being provided on a positive Z-axis-side side surface of the outer annular deformation body, a first inner left side connection point and a second inner left side connection point being provided on a negative Z-axis-side side surface of the inner annular deformation body, and a first inner right side connection point and a second inner right side connection point being provided on a positive Z-axis-side side surface of the inner annular deformation body, and further comprising:

a first outer left side connection member for connecting the first outer left side connection point to the left side support body, a second outer left side connection member for connecting the second outer left side connection point to the left side support body, a first outer right side connection member for connecting the first outer right side connection point to the right side support body, a second outer right side connection member for connecting the second outer right side connection point to the right side support body;

a first inner left side connection member for connecting the first inner left side connection point to the left side support body, a second inner left side connection member for connecting the second inner left side connection point to the left side support body, a first inner right side connection member for connecting the first inner right side connection point to the right side support body, a second inner right side connection member for connecting the second inner right side connection point to the right side support body;

an outer displacement electrode fixed to an inner peripheral surface of the outer annular deformation body, for producing displacement caused by elastic deformation of the outer annular deformation body;

an inner displacement electrode fixed at a position opposed to the outer displacement electrode in an outer peripheral surface of the inner annular deformation body, for producing displacement caused by elastic deformation of the inner annular deformation body; and a detector circuit for outputting an electrical signal indicating torque about the Z-axis exerted on one of the right side support body and the left side support body with the other loaded, based on an amount of fluctuation in capacitance value of a capacitive element composed of the outer displacement electrode and the inner displacement electrode, wherein when orthogonal projection images are obtained by projecting both side surfaces of the outer annular deformation body and the inner annular deformation body on the XY plane, a projection image of the first outer right side connection point is disposed on a positive X-axis, a projection image of the second outer right side connection point is disposed on a negative X-axis, a projection image of the first outer left side connection point is disposed on a positive Y-axis, a projection image of the second outer left side connection point is disposed on a negative Y-axis, a projection image of the first inner right side connection point is disposed on a positive Y-axis, a projection image of the second inner right side connection point is disposed on a negative Y-axis, a projection image of the first inner left side connection point is disposed on a positive X-axis, and a projection image of the second inner left side connection point is disposed on a negative X-axis.

21. The torque sensor according to claim 20, wherein the outer annular deformation body and the inner annular deformation body are made of circular annular members each of which is obtained by forming, in a central portion of a disk disposed about the Z-axis as a central axis, a through-opening portion being in a shape of a concentric disk having a smaller diameter.

22. The torque sensor according to claim 21, wherein as the left side support body and the right side support body, annular structures each having a through-opening portion at a center portion are used, and an insertion hole that penetrates through through-opening portions of the left side support body, the inner annular deformation body, and the right side support body is secured along the Z-axis.

23. The torque sensor according to claim 21, including, when a V-axis and a W-axis that pass though the origin O and create 45 degrees with respect to the X-axis and Y-axis are defined on the XY plane, a first outer displacement electrode and a first inner displacement electrode disposed on the V-axis and a second outer displacement electrode and a second inner displacement electrode disposed on the W-axis, wherein the detector circuit outputs an electrical signal corresponding to a difference between a capacitance value of a first capacitive element composed of the first outer displacement electrode and the first inner displacement electrode and a capacitance value of a second capacitive element composed of the second outer displacement electrode and the second inner displacement electrode as an electrical signal indicating exerted torque.

24. The torque sensor according to claim 21, including, when signed V- and W-axes that pass through the origin O and create 45 degrees with respect to the X-axis and Y-axis are defined on the XY plane, a first outer displacement electrode and a first inner displacement electrode disposed on the positive V-axis, a second outer displacement electrode and a second inner displacement electrode disposed on the positive W-axis, a third outer displacement electrode and a third inner displacement electrode disposed on the negative V-axis, and a fourth outer displacement electrode and a fourth inner displacement electrode disposed on the negative W-axis, wherein the detector circuit outputs an electrical signal corresponding to a difference between "a sum of a capacitance value of a first capacitive element composed of the first outer displacement electrode and the first inner displacement electrode and a capacitance value of a third capacitive element composed of the third outer displacement electrode and the third inner displacement electrode" and "a sum of a capacitance value of a second capacitive element composed of the second outer displacement electrode and the second inner displacement electrode and a capacitance value of a fourth capacitive element composed of the fourth outer displacement electrode and the fourth inner displacement electrode" as an electrical signal indicating exerted torque.

25. The torque sensor according to claim 23, wherein
outer displacement electrodes are constructed by a common conductive layer formed on the inner peripheral surface of the outer annular deformation body, or inner displacement electrodes are constructed by a common conductive layer formed on the outer peripheral surface of the inner annular deformation body.

26. The torque sensor according to claim 25, wherein
the outer annular deformation body is constructed by a conductive elastic material so as to use the inner peripheral surface itself of the outer annular deformation body as the common conductive layer, or the inner annular deformation body is constructed by a conductive elastic material so as to use the outer peripheral surface itself of the inner annular deformation body as the common conductive layer.

27. The torque sensor according to claim 1, wherein
the left side connection member is constructed by a projecting portion projecting rightward from a right side surface of the left side support body, the right side connection member is constructed by a projecting portion projecting leftward from a left side surface of the right side support body, and top surfaces of the projecting portions are joined to the connection points of the annular deformation body.

* * * * *